(12) United States Patent
Yamagiwa et al.

(10) Patent No.: US 7,780,190 B2
(45) Date of Patent: Aug. 24, 2010

(54) REAR STRUCTURE OF VEHICLE PROVIDED WITH CURTAIN AIR BAG APPARATUS

(75) Inventors: Tsuyoshi Yamagiwa, Fuchu-cho (JP);
Shouichirou Hidaka, Fuchu-cho (JP);
Hiroaki Nakao, Fuchu-cho (JP);
Motoharu Hirata, Fuchu-cho (JP);
Tsutomu Watanabe, Fuchu-cho (JP);
Hideharu Saiki, Fuchu-cho (JP);
Tetsuya Umeki, Fuchu-cho (JP)

(73) Assignee: Mazda Motor Corporation (JP)

( * ) Notice: Subject to any disclaimer, the term of this patent is extended or adjusted under 35 U.S.C. 154(b) by 399 days.

(21) Appl. No.: 11/714,907

(22) Filed: Mar. 7, 2007

(65) Prior Publication Data

US 2007/0210561 A1 Sep. 13, 2007

(30) Foreign Application Priority Data

| Mar. 7, 2006 | (JP) | 2006-061669 |
| Mar. 7, 2006 | (JP) | 2006-061670 |
| Mar. 16, 2006 | (JP) | 2006-072265 |
| Mar. 17, 2006 | (JP) | 2006-074224 |

(51) Int. Cl.
*B60R 21/213* (2006.01)

(52) U.S. Cl. .................. 280/730.2; 280/728.2

(58) Field of Classification Search ............. 280/728.2, 280/730.1, 730.2; 296/1.08, 214
See application file for complete search history.

(56) References Cited

U.S. PATENT DOCUMENTS

| 6,142,506 | A * | 11/2000 | Patel et al. | 280/728.2 |
| 6,179,324 | B1 * | 1/2001 | White et al. | 280/730.2 |
| 6,375,214 | B1 * | 4/2002 | Nishikaji | 280/728.2 |
| 6,439,598 | B1 * | 8/2002 | Braun et al. | 280/728.2 |
| 6,485,048 | B2 * | 11/2002 | Tajima et al. | 280/728.2 |
| 6,517,104 | B1 * | 2/2003 | Patel | 280/730.2 |
| 6,520,533 | B2 * | 2/2003 | Tanase et al. | 280/730.2 |

(Continued)

FOREIGN PATENT DOCUMENTS

JP 2004-189099 7/2004

(Continued)

OTHER PUBLICATIONS

European Search Report, EP07004593, Dated Jun. 12, 2007.

*Primary Examiner*—Paul N Dickson
*Assistant Examiner*—Laura Freedman
(74) *Attorney, Agent, or Firm*—Studebaker & Brackett PC; Donald R. Studebaker

(57) ABSTRACT

A middle pillar trim and a rear pillar trim positioned to the front and rear of a side window glass are each harder than a roof trim. A curtain air bag fixed to a rear pillar is deployed in a vehicle cabin while a predetermined end edge of the front of the rear pillar trim in the widthwise direction of a vehicle is deformed toward the front. The separation distance of the curtain air bag in a stored state from the side window glass in the widthwise direction of the vehicle is L1 (L2) in the portion of the curtain air bag along the rear edge of the side window glass, and L4 in the portion of the curtain air bag at the upper edge of the side window glass near the middle pillar trim, and the separation distance L1(L2) is smaller than the separation distance L4.

24 Claims, 31 Drawing Sheets

U.S. PATENT DOCUMENTS

| | | | |
|---|---|---|---|
| 6,565,116 B1 * | 5/2003 | Tajima et al. | 280/730.2 |
| 6,883,828 B2 * | 4/2005 | Ohki | 280/730.2 |
| 6,971,677 B2 * | 12/2005 | Niimi | 280/801.1 |
| 7,520,527 B2 * | 4/2009 | Yamagiwa et al. | 280/730.2 |
| 2002/0017775 A1 * | 2/2002 | Tanase et al. | 280/730.2 |
| 2002/0175504 A1 * | 11/2002 | Tanase et al. | 280/730.2 |
| 2004/0150198 A1 | 8/2004 | Totsuka et al. | |
| 2004/0178609 A1 * | 9/2004 | Totsuka et al. | 280/730.2 |
| 2004/0256843 A1 | 12/2004 | Totani et al. | |
| 2005/0046160 A1 * | 3/2005 | Totani et al. | 280/730.2 |
| 2007/0222192 A1 * | 9/2007 | Yamagiwa et al. | 280/730.2 |
| 2007/0228700 A1 * | 10/2007 | Yamagiwa et al. | 280/730.2 |
| 2008/0073889 A1 * | 3/2008 | Nakao et al. | 280/730.2 |

FOREIGN PATENT DOCUMENTS

JP 2004-314655 11/2004

* cited by examiner

FIG.3
(a)
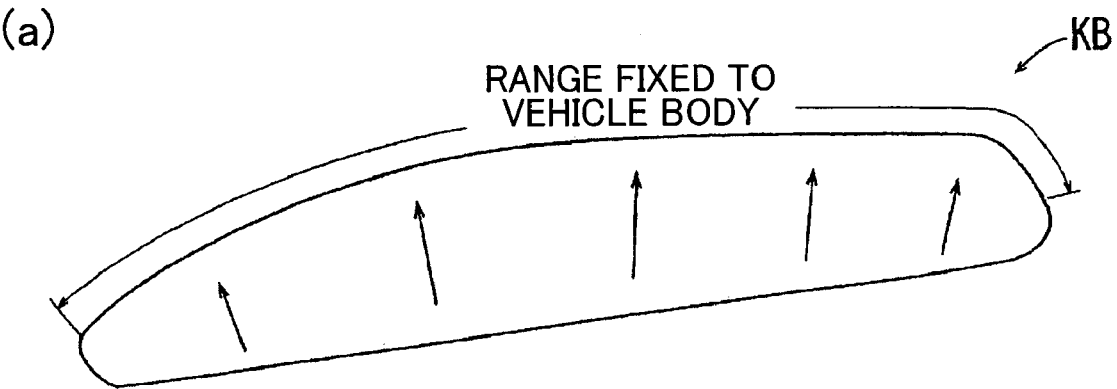
(b)
(c)
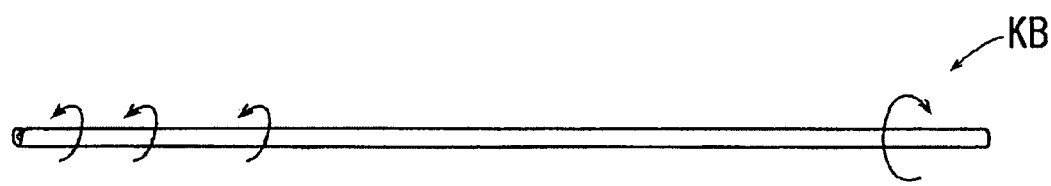
(d)
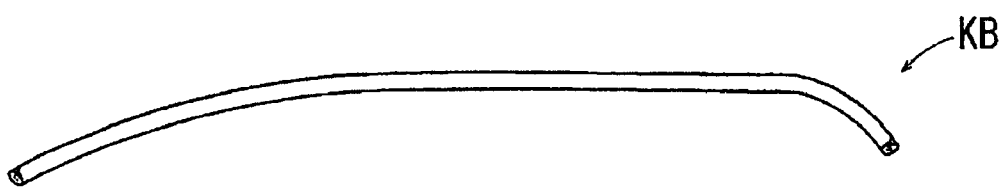

REAR STRUCTURE OF VEHICLE PROVIDED WITH CURTAIN AIR BAG APPARATUS

BACKGROUND OF THE INVENTION

1. Field of the Invention

The present invention relates to a rear structure of a vehicle provided with a curtain air bag apparatus.

2. Background Art

In vehicles, and particularly in automobiles, an air bag apparatus is ordinarily provided in order to protect a passenger when, for example, the vehicle rolls or is involved in a collision. One type of air bag is a so-called curtain air bag, which expands and deploys inside the vehicle cabin so as to cover a side window glass. One type of curtain air bag is long in the front-rear direction so as to cover a plurality of units of side window glass disposed at intervals in the front-rear direction. According to the disclosure of Japan Patent Publication Ser. No. 2004-189099A, a curtain air bag is formed extremely long in the front-rear direction, such that it is possible to cover all of three units of window glass disposed at intervals in the front-rear direction. In the configuration disclosed in JP 2004-189099A, in a stored state, the curtain air bag is fixed to the vehicle body along the upper edge of the side window glass, and also fixed to a rearmost pillar.

Incidentally, when the side window glass is covered by the curtain air bag from inside the vehicle cabin, particularly during a vehicle roll, it is desirable that the curtain air bag can sufficiently counter external force (can maintain tensile strength) toward the inside of the vehicle cabin or the outside of the vehicle cabin. Thus, it is desirable that not only is the upper portion of the curtain air bag fixed to the vehicle body, also a portion corresponding to the rear end of the curtain air bag, i.e. a portion along the rear edge of the side window glass, is fixed to the vehicle body.

On the other hand, the rear pillar is covered by a rear pillar trim in order to, for example, appear more attractive from inside the vehicle cabin, and the rear pillar trim is formed with a member that is much harder than a soft roof trim covering the inner face of a roof panel, such that the rear pillar trim is not easily damaged by personal belongings or the like. More specifically, ordinarily the rear pillar trim is formed from a hard synthetic resin. When a side window glass directly in front of the rear pillar covered by the rear pillar trim is covered with the curtain air bag, in a stored state, the portion of the curtain air bag along the rear edge of the side window glass is covered by the rear pillar trim such that it cannot be seen from inside the vehicle cabin. Accordingly, it becomes necessary for the curtain air bag in a stored state to be deployed inside the vehicle cabin while at least the upper portion of a predetermined end edge, which is the end edge of the rear pillar trim to the outside in the widthwise direction of the vehicle, is deformed forward. That is, a predetermined end edge of the rear pillar trim is positioned in the immediate vicinity of the side window glass, so while at least the upper portion of the predetermined end edge is deformed forward, the curtain air bag in a stored state is deployed inside the vehicle cabin from a space between the predetermined end edge and the side window glass created by this deformation.

Incidentally, a middle pillar positioned at the front edge of the side window glass is ordinarily covered from the inside of the vehicle cabin by a hard middle pillar trim. In order to, for example, prevent interference (being caught) by (the upper end edge of) the middle pillar trim when attempting to expand and deploy the curtain air bag from a stored state, it is desirable to dispose the curtain air bag such that it passes to the inside in the widthwise direction of the vehicle of the inner edge of the middle pillar trim in the widthwise direction of the vehicle. In this manner, due to the curtain air bag in a stored state being extended rearward in a state having been positioned significantly inside in the widthwise direction of the vehicle in order to prevent interference by the middle pillar trim, at the rear pillar trim portion, the curtain air bag is in a state positioned significantly inside in the widthwise direction of the vehicle from the predetermined end edge.

However, the rear pillar trim is made of hard material and so is not easily deformed, and thus in a state in which the curtain air bag in a stored state has been positioned significantly inside in the widthwise direction of the vehicle, in order to deploy the curtain air bag inside the vehicle cabin it is necessary to deform the rear pillar trim an extremely large amount, so it is difficult to insure smooth expansion and deployment of the curtain air bag.

Also, U.S. Patent Application Publication Serial No. 2004/0150198 discloses a curtain air bag apparatus configured such that the curtain air bag is deployed from the rear pillar trim, but USPA.P.S.No. 2004/0150198 makes no specific disclosure with respect to the layout of the curtain air bag.

Also, JP 2004-314655A discloses a structure in which a hard trim is provided above the side window glass, but this publication does not disclose the curtain air bag being deployed from the rear pillar trim.

SUMMARY OF THE INVENTION

The present invention was made with the foregoing in mind, and it is an object thereof to provide a rear structure of a vehicle provided with a curtain air bag apparatus in which the curtain air bag can be smoothly expanded and deployed while the rear pillar trim is deformed.

In order to attain this object, in the present invention, basically, a curtain air bag in a stored state provided along a rear edge of a side window glass, compared to other portions along the upper edge or the like of the side window glass, is positioned closer to the side window glass, i.e., is positioned further to the outside in the widthwise direction of the vehicle.

According to the present invention, it is possible to smoothly expand and deploy the curtain air bag while deforming the rear pillar trim.

BRIEF DESCRIPTION OF THE DRAWINGS

FIGS. 3(a)-(d) show examples of folding up the curtain air bag into the stored state.

DETAILED DESCRIPTION OF THE PREFERRED EMBODIMENTS OF THE INVENTION

First Embodiment

First, a first embodiment of the present invention will be described with reference to FIGS. 1 to 13.

Figure 1:
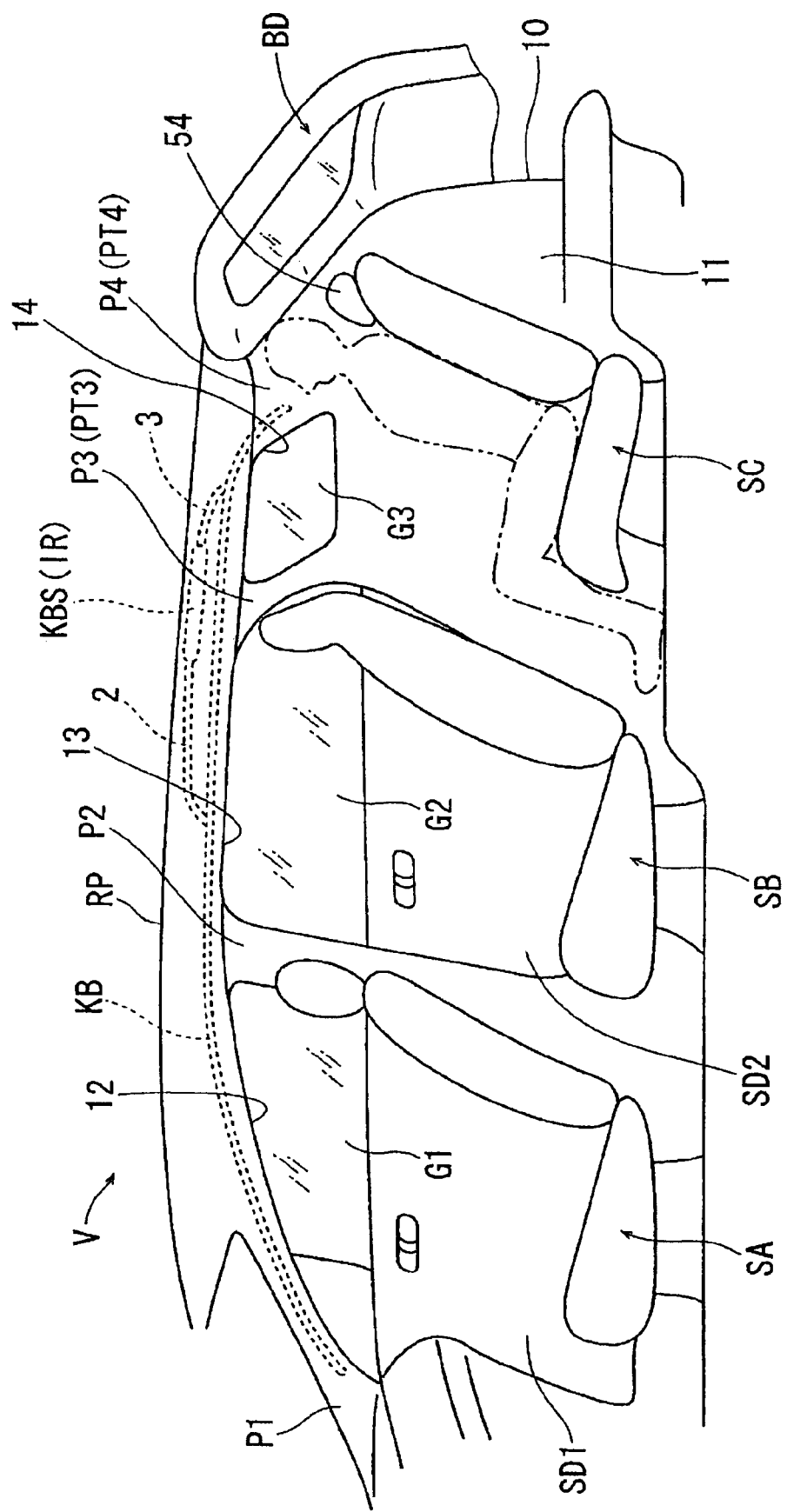
FIG. 1 is a simplified side cross-sectional view in which a curtain air bag in a stored state is viewed from inside a vehicle cabin.
Figure 2:
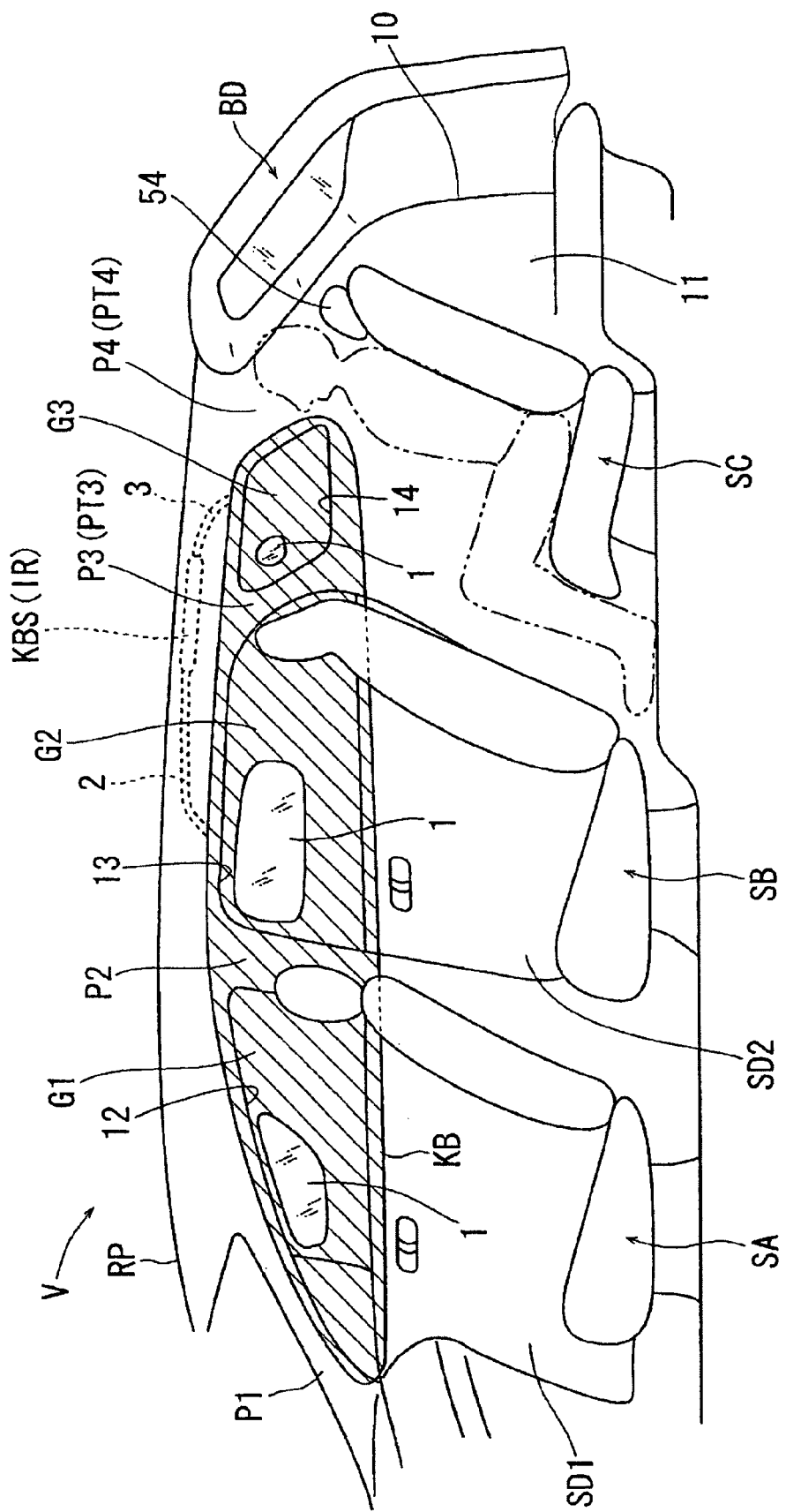
FIG. 2 shows a state in which the curtain air bag has been expanded and deployed in the vehicle cabin, and corresponds to FIG. 1.

In FIGS. 1 and 2, a vehicle V includes a front seat SA, a second row seat SB disposed to the rear of the front seat SA, and a third row seat SC that is a specific seat disposed to the rear of the second row seat SB. A side door for the front seat SA is indicated by numeral SD1, and a side door for the second row seat SB is indicated by numeral SD2. The vehicle V includes, as pillars, in order from front to rear, an A pillar P1, a B pillar P2, a C pillar P3 as a middle pillar, and a D pillar P4 as a rear pillar. The area between left and right D pillars P4 is used for a rear opening 10 that is opened or closed by a back door BD, and through the rear opening 10, personal belongings are placed in or removed from a cargo compartment 11 to the rear of the third row seat SC.

The side door SD1 opens or closes a passenger opening 12 between the A pillar P1 and the B pillar P2, and includes a side window glass G1 that is driven to open or close in the vertical direction. Also, the side door SD2 opens or closes a passenger opening 13 between the B pillar P2 and the C pillar P3, and includes a side window glass G2 that is driven to open or close in the vertical direction. A side window glass G3 is disposed between the C pillar P3 and the D pillar P4, and in the present embodiment, the side window glass G3 is a fixed-type (permanently set) window glass and thus cannot be opened, but an openable-type window glass may also be used for the side window glass G3. Numeral 14 indicates a rear side opening that is blocked with the side window glass G3.

The three side window glasses G1 to G3 are approximately entirely covered from inside the vehicle cabin by a curtain air bag KB that operates, for example, when a side collision occurs or is predicted, or when the vehicle rolls or a roll is predicted. The curtain air bag KB, in a stored state, is fixed to the vehicle body along and directly close to the edge of the three side window glasses G1 to G3. That is, the front end of the curtain air bag KB in a stored state is fixed to the A pillar P1, the rear end is fixed to the D pillar P4, and the middle portion between the front end to the rear end is fixed to the vehicle body on a line connecting the vicinity of the upper edge of the side window glasses G1 to G3 in the front-rear direction. A suitable setup can be adopted for fixing of the curtain air bag to the vehicle body, such as fixing the curtain air bag continuously or fixing the curtain air bag at predetermined intervals.

When the curtain air bag KB is expanded and deployed, the curtain air bag KB is deployed inside the vehicle cabin along the side window glasses G1 to G3 in the form of the hatched area shown in FIG. 2, thus covering all of the side window glasses G1 to G3 from inside the vehicle cabin. The size of the curtain air bag KB is set so that when expanded and deployed, the lower end of the curtain air bag KB is positioned slightly below the beltline (positioned slightly below the lower edge of the side window glasses G1 to G3). The portion of the curtain air bag KB that is not in the hatched area in FIG. 2 is a non-expanded portion 1 in which gas pressure is partially not supplied, and is in a thin state essentially not expanded in the widthwise direction of the vehicle. The position at which the non-expanded portion 1 is formed is set to a position far removed from the head position of passengers seated in the seats SA to SC. It is preferable to provide the non-expanded portion 1 in order to be able to expand and deploy the curtain air bag KB earlier, but it is also possible to adopt a configuration in which the non-expanded portion 1 is not provided. Also, the front end of the curtain air bag KB can be fixed to the vehicle body in the area of the middle portion of the front end of the A pillar P1, and in this case, it is preferable to connect the (lower end of) the front end of the curtain air bag KB and the vicinity of the front end of the A pillar P1 with a tether (a cord-like member).

FIGS. 3A to 3D show an example of folding up the curtain air bag KB into the stored state. That is, the curtain air bag KB, deployed in a thin state in which gas pressure is not supplied (see FIG. 3A), is folded accordion-like from the direction of the lower end of the curtain air bag KB (see FIG. 3B), eventually becoming a single rod-like body (see FIG. 3C: the outer shape of a cross-section is for example approximately square or rectangular). The procedure for folding up can be selected as appropriate. For example, the front side and the back side may be alternately stacked in order from the lower end side, or only the front side or the back side may be stacked in only one direction, or the front side or the back side may be rolled up from one direction. A predetermined portion of the front end of the rod-like curtain air bag KB, and a predetermined portion of the rear end, are screwed, and thus the curtain air bag KB becomes bent such that those predetermined portions point downward. The curve of the front end corresponds to the slope of the A pillar P1, and points downward comparatively gradually. The curve of the rear end of the curtain air bag KB corresponds to the slope of the D pillar P4, due to a relationship in which the D pillar P4 extends straight in approximately the vertical direction, points downward curving very abruptly in comparison to the front end. When the curtain air bag KB in a stored state has been fixed to the vehicle body, the rear end of the curtain air bag KB extends downward while curving from the rear of the upper edge to the top of the rear edge of the side window glass G3, and the lower end thereof is positioned in the vicinity of the lower edge of the side window glass G3 or in a position that does not reach the lower end of the side window glass G3 (in this embodiment, a position in approximately the middle in the vertical direction of the rear edge of the side window glass G3) (see FIG. 1).

In FIGS. 1 and 2, IR is an inflator fixed to the vehicle body, and supplies gas pressure for expansion and deployment to the curtain air bag KB in a stored state. In the present embodiment, the gas pressure generated by the inflator IR due to igniting the inflator IR is supplied to the curtain air bag KB in a stored state via two (front and rear) supply paths 2 and 3. The front supply path 2 supplies gas pressure from a position in approximately the middle in the front-rear direction of the curtain air bag KB in a stored state. The rear supply path 3 supplies gas pressure at the vicinity of the rear end of the curtain air bag KB in a stored state. The number of the supply paths 2 and 3, and the positions at which they supply gas to the curtain air bag KB in a stored state, can be appropriately modified. A curtain air bag apparatus KBS is configured from, for example, the curtain air bag KB, the inflator IR, and the supply paths 2 and 3.

Figure 4:
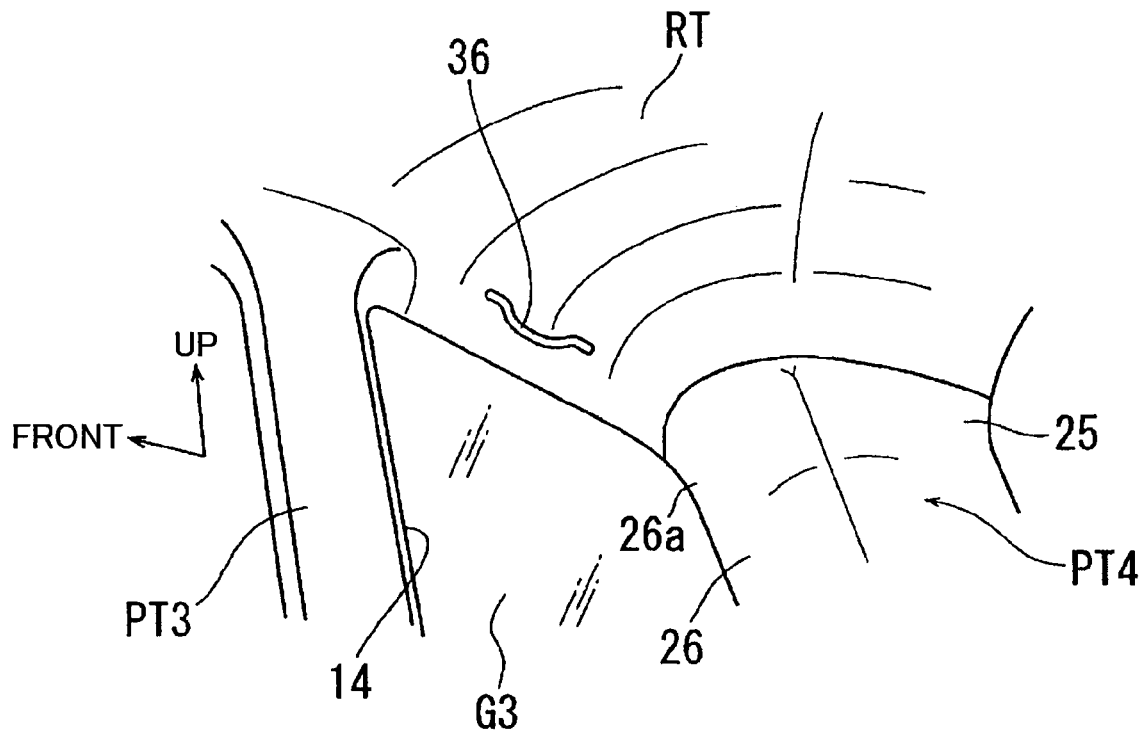
FIG. 4 is a perspective view in which the vicinity of the rear pillar trim is viewed from inside the vehicle cabin.
Figure 6:
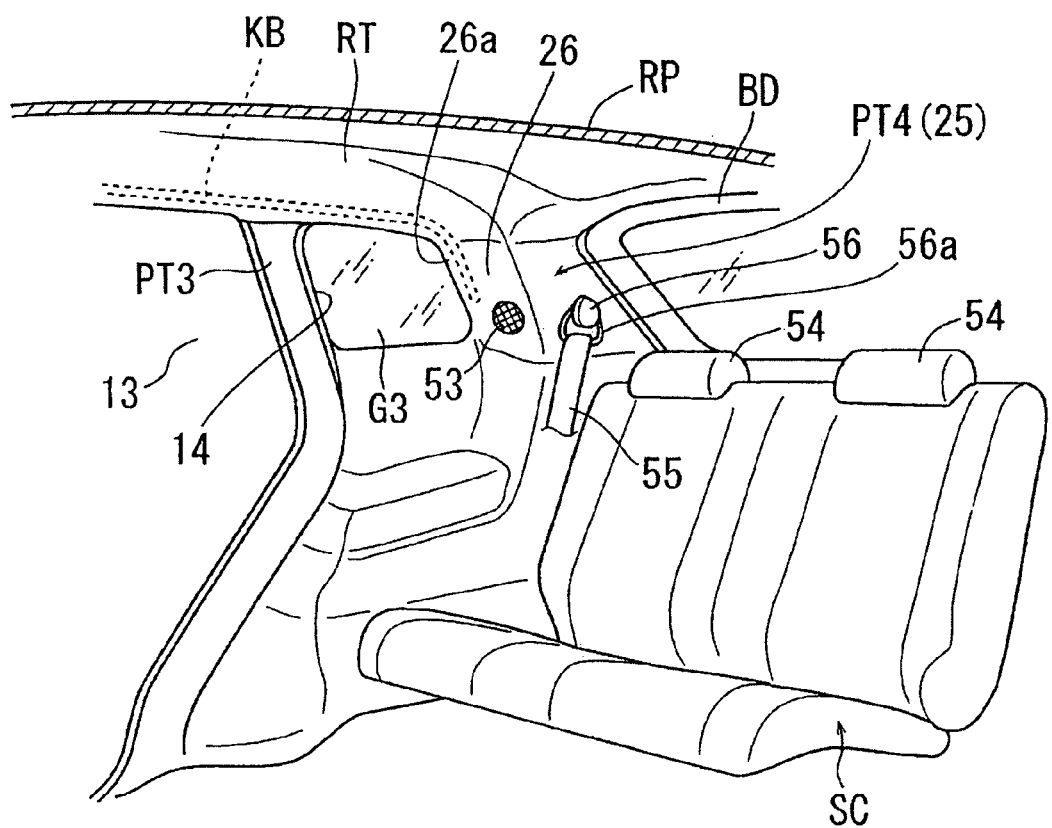
FIG. 6 is a perspective view in which, in a state excluding a second row seat, the vicinity of a third row seat and the rear pillar trim is viewed from inside the cabin.
Figure 7:
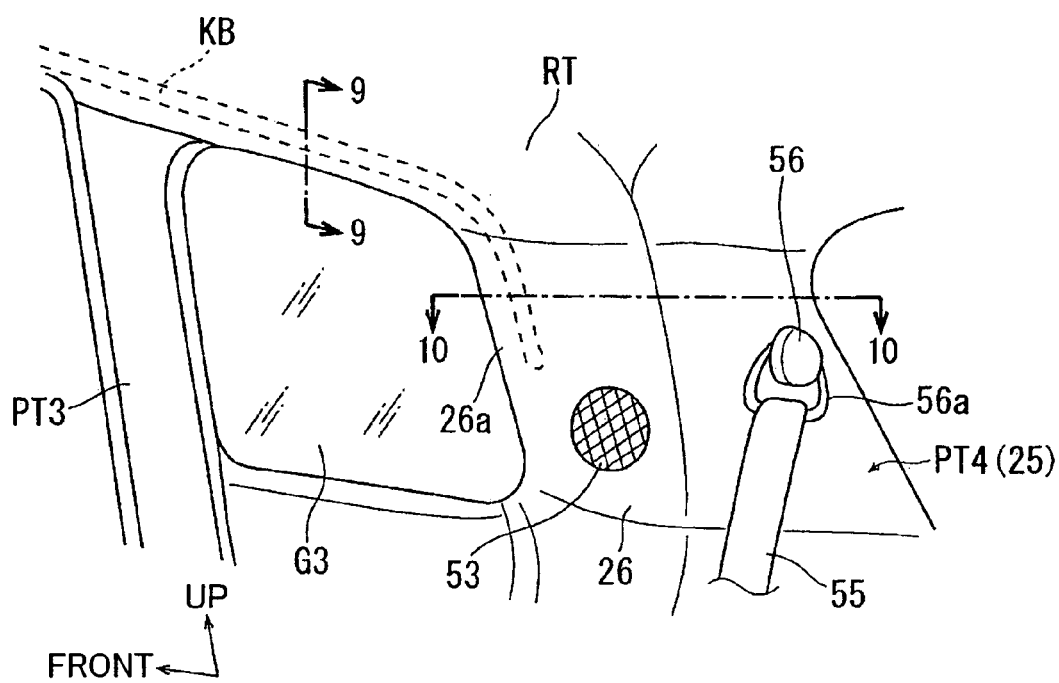
FIG. 7 is an enlarged view of relevant portions of FIG. 6.

Each of the aforementioned pillars P1 to P4 is covered from inside the vehicle cabin by pillar trims, and as shown in FIGS. 4, 6, and 7, the pillar trim of the C pillar P3, i.e. the middle pillar trim, is indicated by numeral PT3, and the pillar trim of the D pillar P4, i.e. the rear pillar trim, is indicated by numeral PT4. Also, the vehicle cabin side of a roof panel RP (see in particular FIG. 9) is covered by a roof trim RT (the roof trim is omitted from FIGS. 1 and 2). The roof trim RT is formed from, for example, a soft material such as an elastic body, e.g., material in which the surface of urethane foam or the like is covered with nonwoven cloth, and the roof trim RT can be comparatively easily deformed with a degree of external force applied by hand. The pillar trims such as the middle pillar trim PT3 and the rear pillar trim PT4 are formed of harder material than the roof trim, and can each be constituted from hard synthetic resin, polypropylene being one example. In particular, the rear pillar trim PT4 is formed from TPO (polypropylene constituted of thermo-plastic olefin), which is not easily damaged even at low temperatures (e.g., −20° C.), and thus is not easily deformed with a degree of external force applied by hand. Thus, the rear pillar trim PT4 in particular is harder (sufficiently hard) than the roof trim RT, and so the rear pillar trim PT4 is not easily damaged by contact with personal belongings or the like. Also, it is possible to partially form only the portion of the rear pillar trim PT4 that receives the pressure of expansion and deployment from the curtain air bag KB, and the vicinity thereof, from synthetic resin that is not easily damaged as described above.

Figure 8:
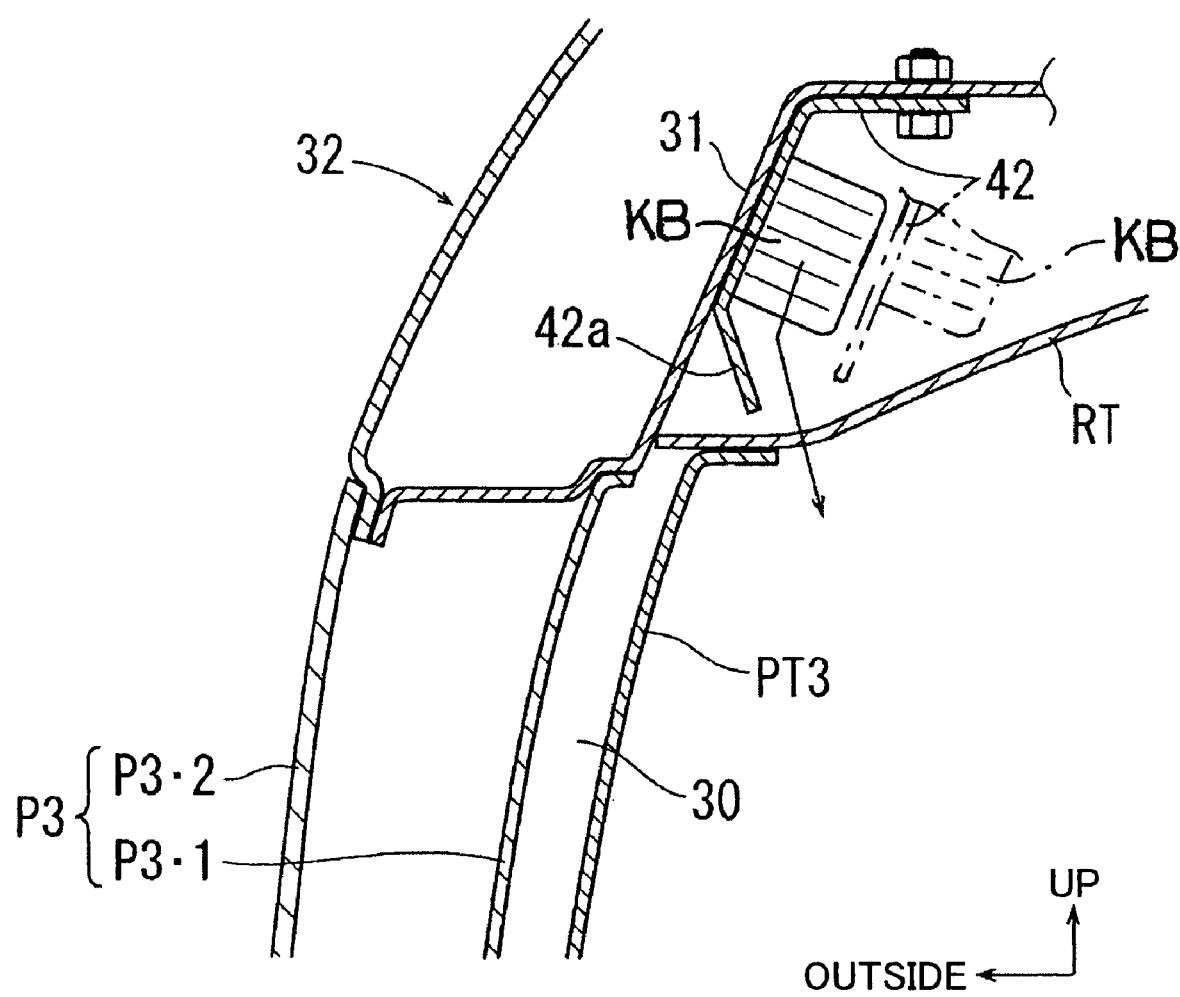
FIG. 8 is a front cross-sectional view showing an example of a preferred setup in a middle pillar trim portion.

FIG. 8 shows an example of a preferred setup for the middle pillar trim PT3 portion. That is, the middle pillar (C pillar) P3 is, as publicly known, formed with a closed cross-sectional shape from an inner panel P3-1 and an outer panel P3-2. The upper end of the middle pillar trim PT3, which covers the middle pillar P3 from inside the vehicle cabin, is somewhat separated from the inner face (the inner panel P3-1) in the widthwise direction of the vehicle of the middle pillar P3, and between the middle pillar P3 and the middle pillar trim PT3, a gap 30 is formed that has a space in the widthwise direction of the vehicle. The upper opening of the gap 30 is lidded by the roof trim RT. An installation bracket 42, holding the curtain air bag KB in a stored state in the vicinity of the middle pillar trim PT3, includes an extension 42a that extends downward. The extension 42a is set to slope more towards the bottom so as to be gradually positioned inside in the widthwise direction of the vehicle, and the direction in which the extension 42a points is toward the position of the inner end in the widthwise direction of the middle pillar trim PT3 (may also be set up to point slightly more toward the inside in the widthwise direction of the vehicle than that inner end position). By providing the extension 42a, the curtain air bag KB to be expanded and deployed is not at all interfered with by the middle pillar PT3 due to the guiding action of the extension 42a, nor does the curtain air bag KB enter into the gap 30, so the curtain air bag KB reliably deployed in the vehicle cabin. Also, as shown by the dashed dotted line in FIG. 8, the curtain air bag KB is not disposed further inside the vehicle cabin than the inner edge in the widthwise direction of the vehicle of the middle pillar trim PT3 (further to the inside in the widthwise direction of the vehicle), and thus it is possible to reliably prevent the curtain air bag KB from getting caught on the middle pillar trim PT3 when deploying the curtain air bag KB.

Figure 9:
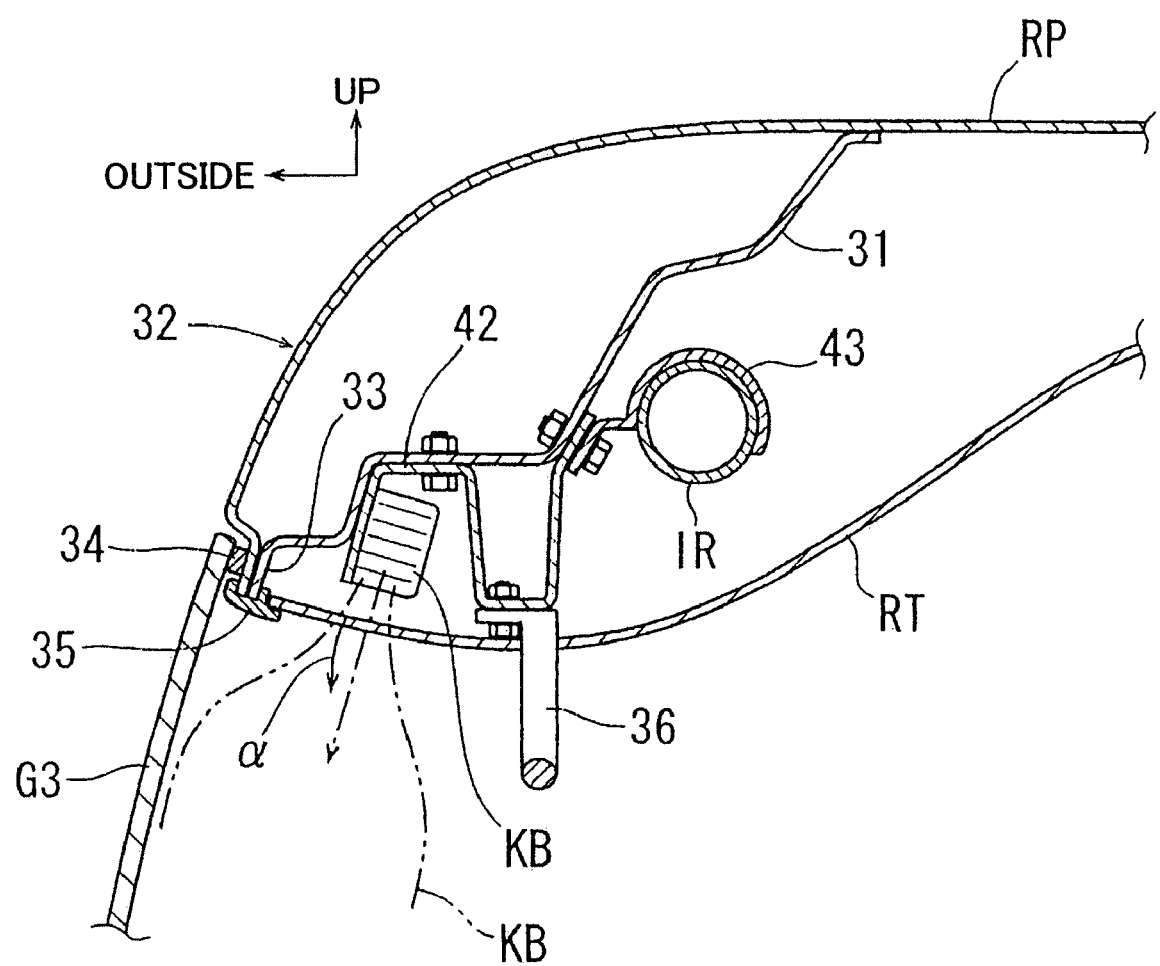
FIG. 9 is a cross-sectional view corresponding to line 9-9 in FIG. 7.
Figure 10:
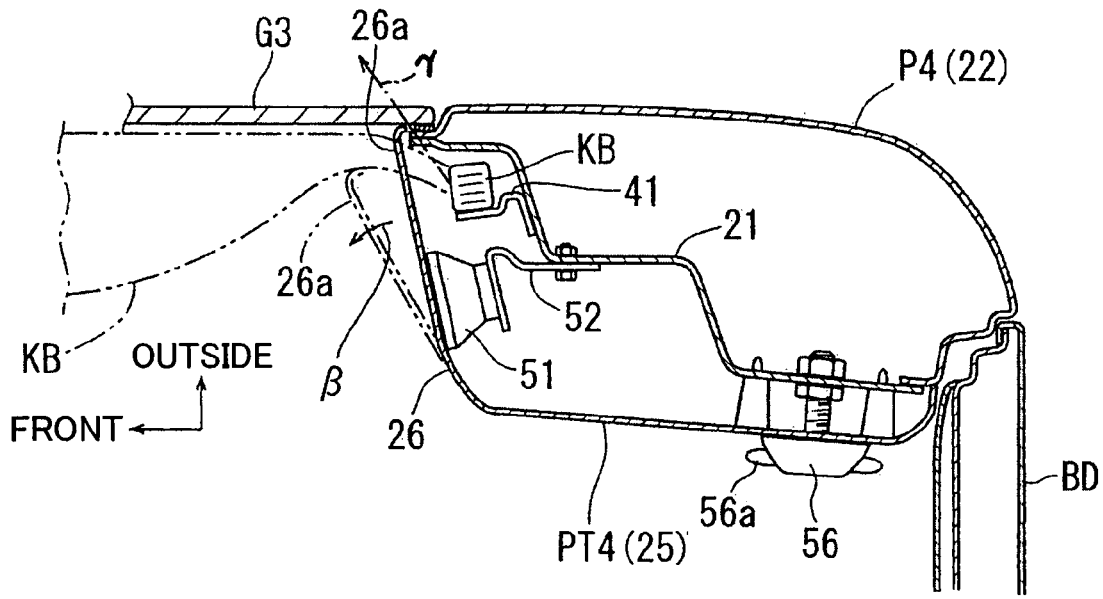
FIG. 10 is a cross-sectional view corresponding to line 10-10 in FIG. 7.
Figure 11:
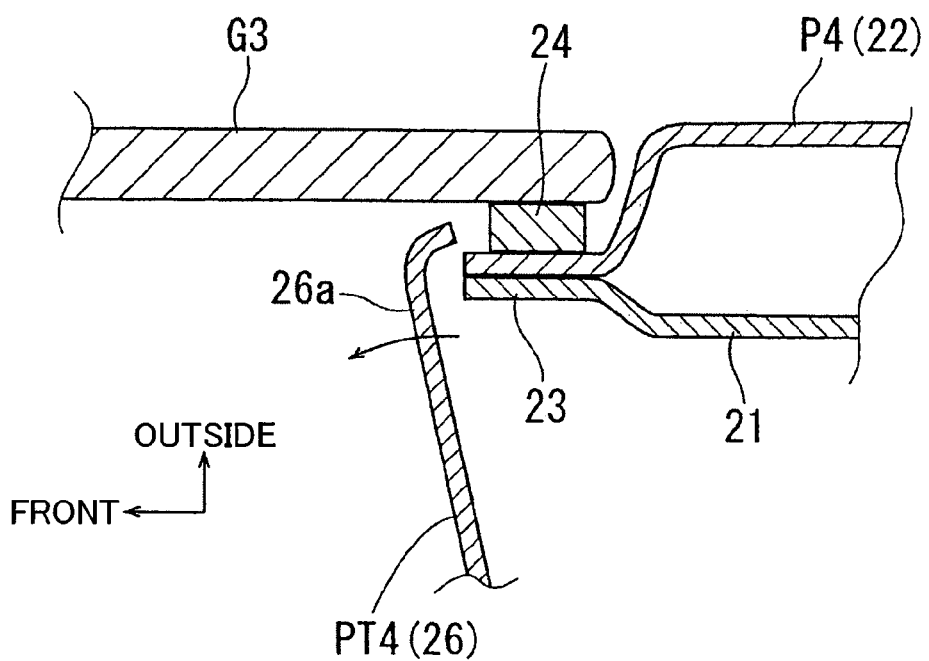
FIG. 11 is an enlarged cross-sectional view of relevant portions of FIG. 10.
Figure 13:
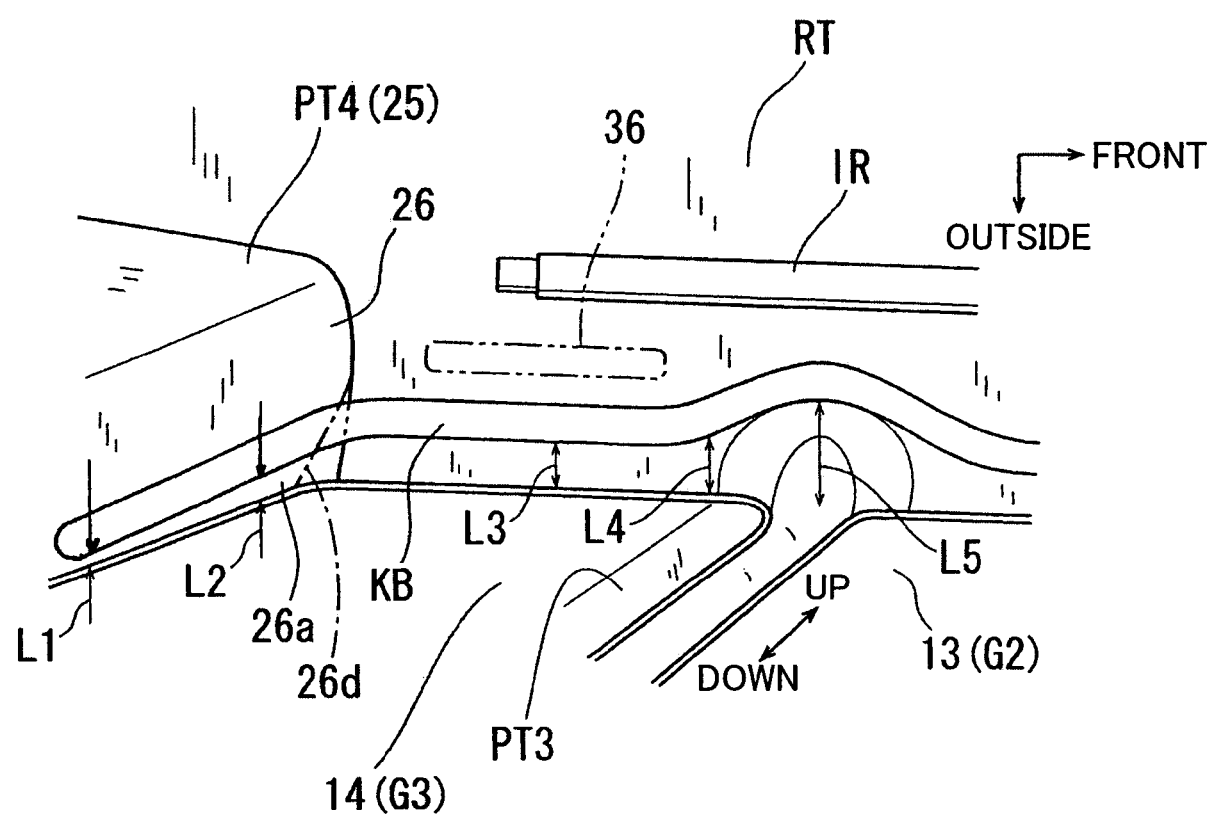
FIG. 13 is a plan view showing an example of disposing the curtain air bag in a stored state in the vicinity of the rear pillar trim.

As shown in FIG. 10, the rear pillar P4 is formed with a closed cross-sectional shape by an inner panel 21 and an outer panel 22, and as shown in FIG. 11, a connecting flange 23 that extends shortly to the front is formed at the front edge of the rear pillar P4. The rear edge of the side window glass G3 is fixed to the outer face of the connecting flange 23 via an adhesive material 24. As shown in FIG. 10, the rear pillar trim PT4, which covers the rear pillar P4, is formed with an approximately L-like cross-sectional shape in the horizontal direction, and includes a side face 25 that extends broadly in the front-rear direction, and a front face 26 that is extended from the front end of the side face 25 outside in the widthwise direction of the vehicle, and extends broadly in the widthwise direction of the vehicle. An end edge outside in the widthwise direction of the vehicle of the front face 26, i.e., a predetermined end edge 26a, is positioned in the immediate vicinity of the rear edge of the side window glass G3, and is provided extending to the vicinity of the connecting flange 23 (see FIG. 9). Also, the front face 26 is set up slightly sloping so as to overall be gradually positioned frontward to the outside in the widthwise direction of the vehicle, but in a plan view (when viewed from above the vehicle body), the vicinity of the predetermined end edge 26a is set up slightly sloping so as to be gradually positioned rearward to the outside in the widthwise direction of the vehicle (in FIG. 13, the state of the dashed dotted line indicated by numeral 26d). Also, this sort of rearward-sloping setup may be adopted for only the top side of the front face 26, which receives pressing force from the curtain air bag KB when expanding and deploying the curtain air bag KB, as described below (see single-dotted line in FIG. 13). In FIG. 13, the dashed dotted line indicates a state in which a rearward-sloping setup as described above has been adopted, and the solid line indicates a state in which a rearward-sloping setup has not been adopted.

Figure 5:
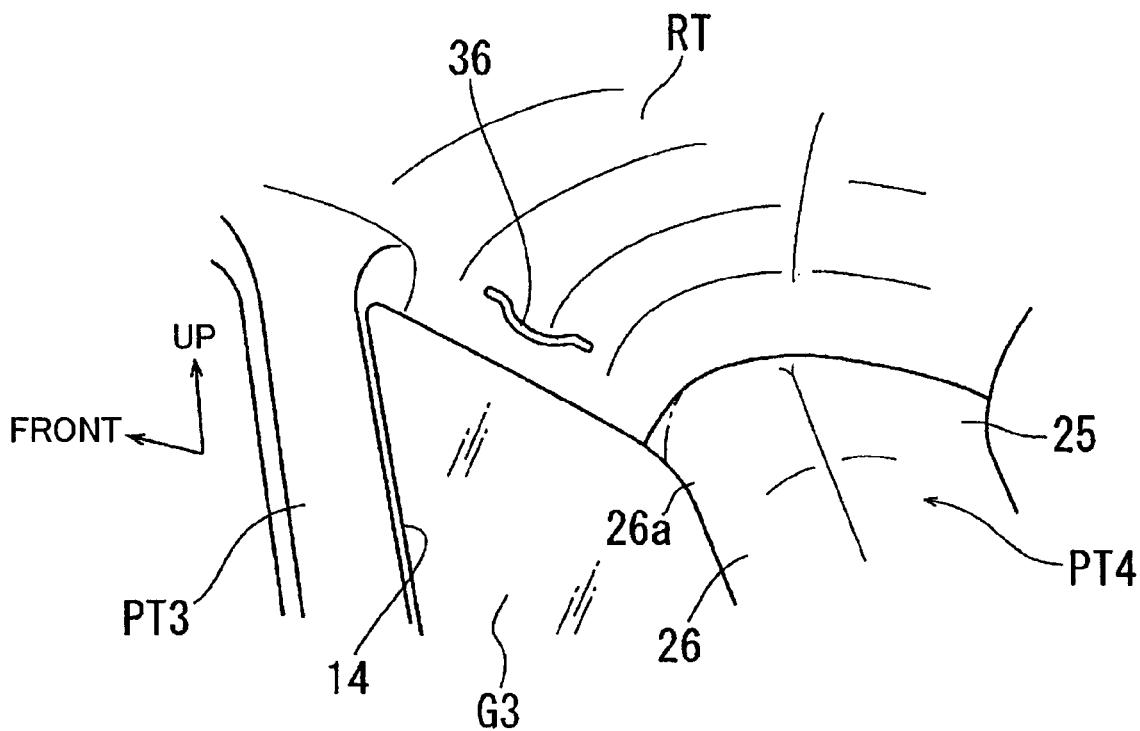
FIG. 5 corresponds to FIG. 4, and shows a case in which the upper portion of a predetermined end edge of the rear pillar trim is not set up sloping.

Here, in FIG. 4, the upper end face of the predetermined end edge 26a of the front face 26 in the rear pillar trim PT4 is set up sloping so as to gradually curve downward closer to the outside in the widthwise direction of the vehicle, and end-processed to be rounded (processed so as to not have a sharp angle). That is, viewed from the front (when viewed in the front-rear direction of the vehicle body), that upper end face is set up sloping so as to gradually be positioned lower closer to the outside in the widthwise direction of the vehicle. As shown in FIG. 5, which is a modified example of FIG. 4, a configuration may also be adopted in which the above end processing is not performed on the predetermined end edge 26a in FIG. 4 (the dashed dotted line in FIG. 5 indicates a sloping setup in which the end processing has been performed).

As shown in FIG. 9, the end of the roof panel RP outside in the widthwise direction of the vehicle is used as a roof side rail 32 constituted from a strong member with a closed cross-sectional shape extending in the front-rear direction by an inner panel (reinforcement) 31. The lower end of the roof side rail 32 includes a connection flange 33 that extends shortly downward, and the upper edge of the side window glass G3 is fixed to the connection flange 33 with an adhesive material 34 (corresponding to the adhesive material 24 in FIG. 11). As shown in FIGS. 4 and 13, the outside end edge of the roof trim RT in the widthwise direction of the vehicle, between the pillar trim PT3 and the rear pillar trim PT4, protrudes somewhat to the outside in the widthwise direction of the vehicle, and is positioned in the immediate vicinity of the side window glass G3. Also, the outside end of the roof trim RT in the widthwise direction of the vehicle is held by the connecting flange 33 with an edge molding 35 (see FIG. 9).

As shown in FIGS. 9 and 10, the curtain air bag KB in a stored state is fixed to the vehicle body via installation brackets 41 and 42 or the like. The installation bracket 41 shown in FIG. 10 is for installation to the rear pillar P4, and the installation bracket 42 shown in FIG. 9 is for installation to the roof side rail 32. FIG. 13 shows an example of disposing the curtain air bag KB in a stored state in a portion from the upper edge to the rear edge of the side window glass G3, but in FIG. 13, in order to clearly show the disposed state of the curtain air bag KB, the installation brackets 41 and 42 are omitted. A detailed description of the disposed state of the curtain air bag KB in a stored state referred to in FIG. 13 will be given below.

The inflator IR that extends approximately lengthwise in the front-rear direction in FIG. 13 is, as shown in FIG. 9, fixed to the roof side rail 32 via an installation bracket 43. As shown for example in FIGS. 4 and 9, an assist grip 36 is fixed to the roof side rail 32 as a vehicle body interior part, and the portion of the assist grip grasped by an occupant penetrates through the roof trim RT and is exposed inside the vehicle cabin. In the present embodiment, as shown in FIGS. 9 and 13, the assist grip 36 is positioned between the curtain air bag KB in a stored state and the inflator IR.

Figure 12:
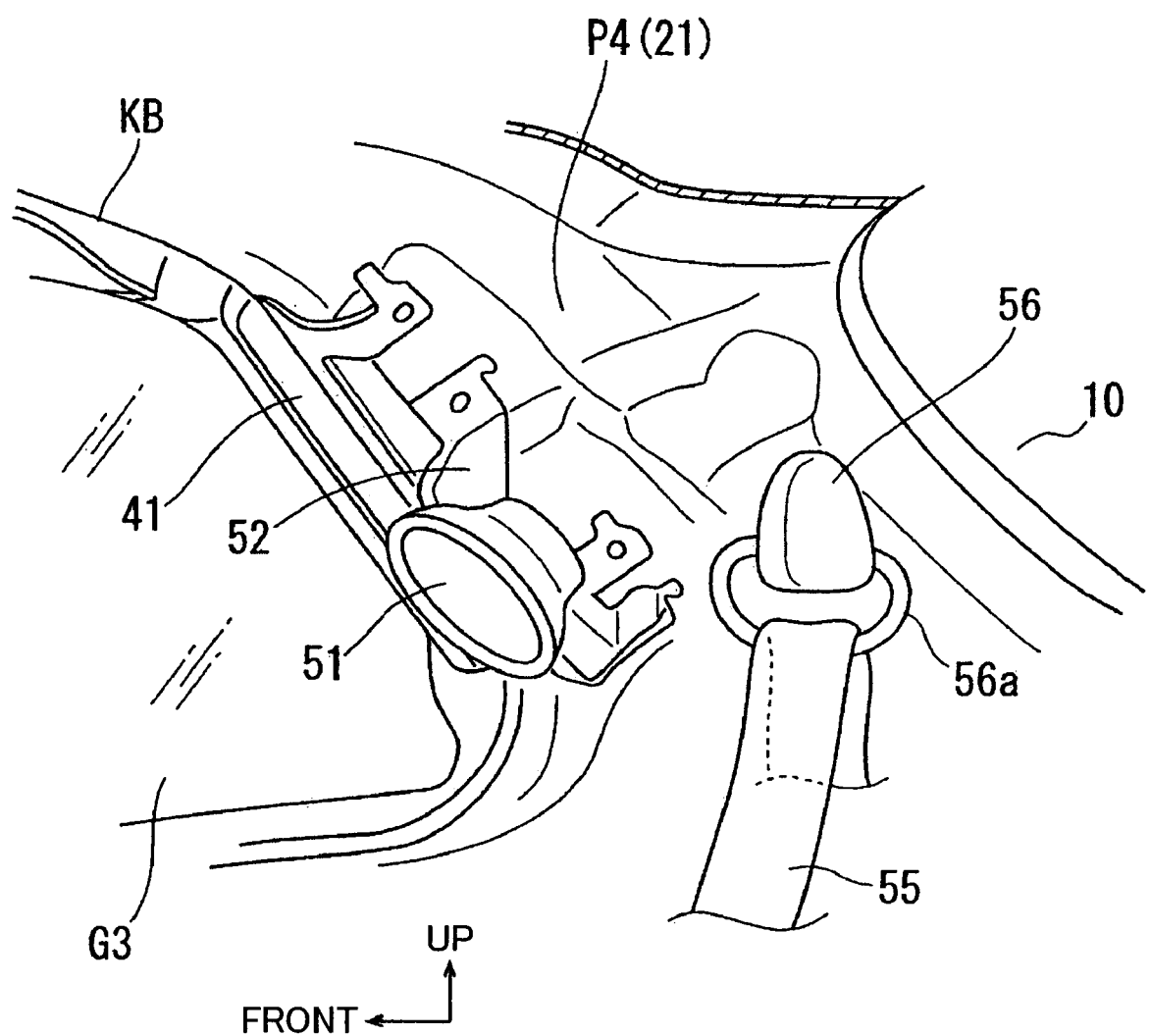
FIG. 12 is a perspective view showing the disposed state of a speaker and the like in a state with the rear pillar trim removed.

As shown in FIGS. 10 and 12, a speaker 51 is disposed inside the rear pillar trim PT4. The speaker 51 is fixed to the rear pillar P4 via an installation bracket 52, and is set up to point (direction in which sound points) toward the front. In the rear pillar trim PT4, an opening 53 is formed at a position immediately in front of the speaker 51, i.e. at the front face 26 (see FIGS. 6 and 7). The opening 53 is configured as an aggregation of many small holes, and is set up by configuring a mesh-like pattern such that the opening 53 has a good outward appearance viewed from inside the vehicle cabin. The shape and size of the opening 53 corresponds to the shape and diameter of the speaker 51, and in the present embodiment the opening 53 has a round shape with a diameter of 7 to 10 cm. That is, the opening 53 has a round outer shape, and is configured by forming many small holes within the range of an area with a round shape. The outer shape of the opening 53 can be appropriately modified; an oval, square or rectangular shape may also be used, for example. Of course, an appropriate shape may be adopted for the shape of the many small holes as well, such as a round, oval, or square shape. Because the opening 53 is thus formed from many small holes, in actuality it is not possible to view the rear pillar trim PT4 from inside the vehicle cabin (the maximum diameter of the small holes is preferably set in a range of about 1 to 3 mm). The vertical position of the opening 53 (the speaker 51) is set so that the bottom of the front face 26 is separated as much as possible from the top (the intersection of the upper edge and the rear edge of the side window glass G3) of the predetermined end edge 26a of the rear pillar trim PT4.

As shown in FIG. 6, near the front face 26 of the rear pillar trim PT4, the outside end of the third row seat SC in the widthwise direction of the vehicle, and in particular a head rest 54, is positioned, and the vicinity of the head of a passenger in the third row seat SC is positioned at the head rest 54. Accordingly, the head of a passenger seated in the third row seat SC is positioned near the opening 53, and because the sound dispersed in the vehicle cabin from the speaker 51 through the opening 53 is pointed forward, the passenger seated in the third row seat SC may hear the sound from the opening 53 with greater volume and thus feel discomfort, but this is prevented or reduced by the head rest 54. Also, forward direction of the sound dispersed in the vehicle cabin through the opening 53 results in very preferable sound generation for an occupant seated in the first row seat SA (the front seat) or the second row seat SB.

In FIGS. 6, 7, and 12, 55 is a seat belt for an occupant of the third row seat SC, 56 is a shoulder anchor for the seat belt 55, and a guide of the shoulder anchor 56 that guides the seat belt 55 is indicated by numeral 56a. The shoulder anchor 56 is positioned in the side face 25 of the rear pillar trim PT4, and the installed end of the shoulder anchor 56 penetrates through the rear pillar trim PT4 and is fixed to the rear pillar P4. The seat belt 55 is extended from a retractor that has been fixed to the vehicle body at the bottom of the vicinity of the rear pillar trim PT4.

Next is a detailed description of the mode of disposing the curtain air bag KB in a stored state in the vicinity of the side window glass G3 (rear side opening 14 blocked with the side window glass G3), with reference to FIG. 13. The end edge of the roof trim RT is disposed so as to slightly overlap on the upper end face of the middle pillar trim PT3 and the rear pillar trim PT4, but these details are omitted from FIG. 13. First, the curtain air bag KB in a stored state is provided extending in the front-rear direction along the side window glass G3, but in the vicinity of the middle pillar trim PT3, the curtain air bag KB is disposed so as to pass through the vicinity of the middle pillar trim PT3 and slightly to the inside in the widthwise direction of the vehicle from the inner end of the middle pillar trim PT3 in the widthwise direction of the vehicle (this inner end is the inner end of the portion extending in the vertical direction, as shown in FIG. 8). The separation distance of the curtain air bag KB in a stored state and the side window glass G3 (which can also be considered a predetermined outer face of the vehicle body) in the vicinity of the middle pillar trim PT3 is indicated by numeral L5.

The curtain air bag KB in a stored state, in a portion along the upper edge of the side window glass G3, is provided roughly parallel to the side window glass G3, and the separation distance from the side window glass G3 in the widthwise direction of the vehicle is indicated by numeral L3. The curtain air bag KB in a stored state, in the vicinity of the border along the upper edge of the side window glass G3 from the middle pillar trim PT3, gradually points toward the outside in the widthwise direction of the vehicle so as to not be interfered with by the middle pillar trim PT3 in the plan view shown in FIG. 13, thus ultimately having the separation distance L3 (L3<L5). L4 indicates the separation distance of the curtain air bag KB in a stored state from the side window glass G3, at the position of the front end of the upper edge of the side window glass G3, i.e. the portion immediately to the rear of the middle pillar trim PT3 (L3<L4<L5).

The curtain air bag KB in a stored state, in a portion along the rear edge of the side window glass G3, is set up sloping so as to be, toward the bottom, gradually positioned to the outside in the widthwise direction of the vehicle. That is, the separation distance in the widthwise direction of the vehicle of the curtain air bag KB in a stored state from the side window glass G3, at the portion of the curtain air bag KB along the rear edge of the side window glass G3, is smaller in the vicinity of the lower end, there being L1, and is larger in the vicinity of the upper end, there being L2 (L1<L2, and L1<L2<L3<L4<L5). The sloping setup as described above begins from the vicinity of the border of the upper edge and the rear edge of the side window glass G3, and accordingly, the separation distance in the widthwise direction of the vehicle of the curtain air bag KB in a stored state from the side window glass G3 is set to be about the same at the position of the upper end of the rear edge of the side window glass and the position of the rear end of the upper edge.

As described above, the separation distance in the widthwise direction of the vehicle of the curtain air bag KB in a stored state from the side window glass G3, in the portion along the upper edge of the side window glass G3 (except at the position of the front end and the position of the rear end, which are border portions), is the middle separation distance L3, corresponding to LA in the claims, and in the portion along the rear end of the side window glass G3 (except at the position of the upper end, which is a border area), is the separation distance L1 or L2, corresponding to LB in the claims, and in the middle pillar trim PT3 portion, is the separation distance L5, corresponding to LC in the claims. Also, the same value may be used for the separation distances L1 and L2 in the portion along the rear edge of the side window glass G3 (setting the same value at the top and bottom of the position in the widthwise direction of the vehicle in the portion along the rear edge of the side window glass G3). The separation distances L1 to L5 have relationships relative to the side window glass G3 (predetermined outside face of the vehicle body), but the larger the value of these separation distances, the more their absolute position moves to the inside in the widthwise direction of the vehicle.

As is clear from FIGS. 9 and 13, in a plan view, the curtain air bag KB is positioned further outside in the widthwise direction of the vehicle than the portion positioned further to the front than the assist grip 36, so the separation distance in the widthwise direction of the vehicle of the curtain air bag KB in a stored state from the side window glass G3, at the portion corresponding to the assist grip 36 provided as a vehicle interior part, is smaller than the portion positioned further to the front than the assist grip 36. Also, the portion of the curtain air bag KB in a stored state disposed further to the rear than the predetermined end edge 26a is twisted at the portion of the border of the upper edge and the rear edge of the side window glass G3 (i.e. in the vicinity of the upper end of the predetermined end edge 26a in the rear pillar trim PT4), changing the deployment direction of the curtain air bag KB, and the expansion of the curtain air bag KB is performed such that in the portion along the upper edge of the side window glass G3 the expansion is directed approximately downward, and at the portion along the rear edge of the side window glass, points to approximately the outside in the widthwise direction of the vehicle as shown by arrow γ in FIG. 10.

Next is a description of the operation of the configuration as described above. When the curtain air bag KB is in a stored state, the inflator IR is ignited when a predetermined condition is satisfied, such as when a side collision has been detected or predicted, or when a vehicle roll has been detected or predicted. Gas pressure generated by ignition of the inflator IR is supplied to the curtain air bag KB in a stored state, and thus the curtain air bag KB changes to the shape as indicated by the hatched area in FIG. 2, and is expanded and deployed in the vehicle cabin.

The expansion and deployment of the curtain air bag KB into the vehicle cabin is performed while displacing the edge of the roof trim RT outside in the widthwise direction of the vehicle downward, as indicated by arrow α in FIG. 9 (the expanded and deployed curtain air bag KB is indicated by the dashed double-doffed line). The roof trim RT is a soft material, so it can easily be deformed downward. Also, at the rear side of the vehicle, the expansion and deployment of the curtain air bag KB is performed while displacing the top of the predetermined end edge 26a of the rear pillar trim PT4 to the front as indicated by arrow β in FIG. 10 (the expanded and deployed curtain air bag KB is indicated by the dashed double-dotted line). In FIG. 10, the curtain air bag KB is expanded and deployed into the vehicle cabin through the space created between the side window glass G3 and the predetermined end edge 26a, but the curtain air bag KB includes an expansion portion that is expanded in the widthwise direction of the vehicle in the portion of the predetermined end edge 26a, and accordingly, it becomes necessary to sufficiently displace the predetermined end edge 26a to the inside in the widthwise direction of the vehicle while displacing (the top of) the predetermined end edge 26a toward the front.

In the front face 26, the opening 53 is formed at the bottom position separated from the predetermined end edge 26a, and the strength in the vicinity of the opening 53 is comparatively weaker than other portions. Thus, when the curtain air bag KB presses the predetermined end edge 26a frontward, the front face 26 is approximately entirely much displaced, centered at the vicinity of the opening 53, as shown by the double-dotted line in FIG. 10, thus forming a large space through which the curtain air bag passes in the widthwise direction of the vehicle. Because it is preferable to greatly displace the predetermined end edge 26a over the range of a large area such as approximately the entire front face 26 (a range with a long distance to the top of the predetermined end edge 26a), in comparison to only greatly displacing near the predetermined end edge 26a, excessive force does not act on the predetermined end edge 26a and the vicinity thereof, thus preventing a situation in which the predetermined end edge 26a and the vicinity thereof are partially damaged.

In particular, in the present embodiment, in the portion in the vicinity of the border of the upper edge and the rear edge of the side window glass G3 (the upper end of the predetermined end edge 26a), in a side view, the curtain air bag KB curves so as to bend at an angle of not more than 120 degrees from the approximately horizontal direction and is thus provided extended on the bottom side along the rear edge of the side window glass G3, and when the curtain air bag KB is deployed, stress operates on the periphery of the upper end of the predetermined end edge 26a, toward the bottom and the front thereof. In order to mitigate such stress from acting on the upper end, relative to the rear pillar trim PT4, the curtain air bag KB is twisted at the portion that corresponds to the upper end of the predetermined end edge 26a (vicinity of the upper end), and the deployment direction is set such that the bottom side and the front side approximately do not cross, but some degree of stress on the upper end cannot be avoided. Thus, because the opening 53 is disposed separated from the upper end where stress operates in this manner, such stress is prevented from acting on the opening 53, and thus the weakened vicinity of the opening 53 is prevented from being damaged.

Here, as described above, the front face 26 (of the predetermined end edge 26a) is set up slightly sloping such that toward the outside in the widthwise direction of the vehicle, the front face 26 is gradually positioned to the rear (the setup of a rear sloping portion 26d indicated by the dashed dotted line in FIG. 13). Thus, in particular, when attempting to expand and deploy, downward and to the front, the portion of the curtain air bag KB in a stored state that is in the vicinity of the border of the upper edge and the rear edge of the side window glass G3, the soft roof trim RT is positioned in the portion of the rear sloping portion 26d that has been set up sloping to the rear, so the stress caused by the deployed curtain air bag KB that acts on the vicinity of the border is released, and thus the deployability of the curtain air bag KB is improved. Also, by setting up the top of the predetermined end edge 26a so as to gradually face downward closer to the outside in the widthwise direction of the vehicle (approximately the same stat as indicated by the single-dotted line in FIG. 13), the soft roof trim RT is also positioned in this portion with a sloping setup, so same as in the case of forming the rear sloping portion 26d, while releasing the stress caused by the curtain air bag KB, the deployability of the curtain air bag KB particularly from the top of the predetermined end edge 26a toward the front is improved. Also, a configuration may be adopted in which the aforementioned sloping toward the rear and sloping downward are both set at the same time.

In addition, the curtain air bag KB in a stored state provided to the rear of the predetermined end edge 26a is set up so as to be positioned as far outside as possible in the widthwise direction of the vehicle, so the predetermined end edge 26a is deformed as easily as possible, which is desirable for further improving the deployability of the curtain air bag KB. In particular, in order to prevent interference between a passenger sitting in the third row seat SC (the last row seat) and the curtain air bag KB when attempting to expand and deploy the curtain air bag KB, it is preferable to adopt a configuration in which the curtain air bag KB in a stored state located to the rear of the predetermined end edge 26a is positioned more to the outside in the widthwise direction of the vehicle toward the bottom.

Also, the curtain air bag KB in a stored state, in the portion corresponding to the assist grip 36, is provided offset to the outside in the widthwise direction of the vehicle relative to the assist grip 36, and in the portion corresponding to the middle pillar trim PT3, which is a portion further to the front than the assist grip 36, the curtain air bag KB is positioned to the inside in the widthwise direction of the vehicle relative to the assist grip 36, so the curtain air bag KB is deployed well without any interference from the assist grip 36 or the middle pillar trim PT3. Further, the curtain air bag KB in a stored state is set up such that from the middle pillar trim PT3 via the upper edge of the side window glass G3 to along the rear edge of the side window glass G3, the curtain air bag KB is gradually positioned to the outside in the widthwise direction of the automobile (in steps in the present embodiment), so for example, the curtain air bag KB in a stored state is set with the separation distance L5 in the portion along the upper edge of the side window glass G3. Thus, in comparison to a case in which the curtain air bag KB is abruptly offset to the outside in the widthwise direction of the vehicle in the vicinity of the position of the rear end of the upper edge of the side window glass G3, the deployment of the curtain air bag KB is improved to the extent that an abrupt curve is not set up.

Further, the expansion direction of the portion of the curtain air bag KB in a stored state along the rear edge of the side window glass G3 points approximately toward the outside in the widthwise direction of the vehicle, as indicated by arrow γ in FIG. 10, so the curtain air bag KB, which is expanded and deployed inside the vehicle cabin while deforming the predetermined end edge 26a, is deployed while the curtain air bag KB makes contact with the side window glass G3. In other words, the space to be formed between the predetermined end edge 26a and the side window glass G3, and used as the passageway of the curtain air bag KB, is allowed to be as small as possible, and as a result it is not necessary to greatly deform the predetermined end edge 26a unnecessarily, which is preferable for preventing the rear pillar trim PT4 from being damaged in the vicinity of the predetermined end edge 26a.

FIGS. 14 to 17 show a modified example of the first embodiment. The same constituent elements as in the first embodiment are given the same numerals and a duplicate description thereof is omitted here (also true for Modified Examples 2 to 5 below). In Modified Example 1, the trim material positioned along the upper edge of the side window glass G3 is configured not from the roof trim RT, but from a roof side trim RST formed with hard synthetic resin (same as the rear pillar trims PT3 and PT4). The roof side trim RST is set up in a case in which, when moving the roof trim RT from outside the vehicle to inside the vehicle through a vehicle opening and installing the roof trim RT to the roof, it is not possible to form the roof trim RT largely due to a reason such as the opening of the back door BD or the like being small, and by using the roof side trim RST as a piece separate from the roof trim RT for the portion that cannot pass through the opening, the installability of the roof trim RT is improved. Of course, there may also be instances when the roof side trim RST is installed in order to improve appearance. The width of the roof side trim RST in the widthwise direction of the vehicle is about the same as the width of the pillar trim PT3 in the widthwise direction of the vehicle, but is significantly less than the width front face 26 of the rear pillar trim PT4 in the widthwise direction of the vehicle.

Figure 15:
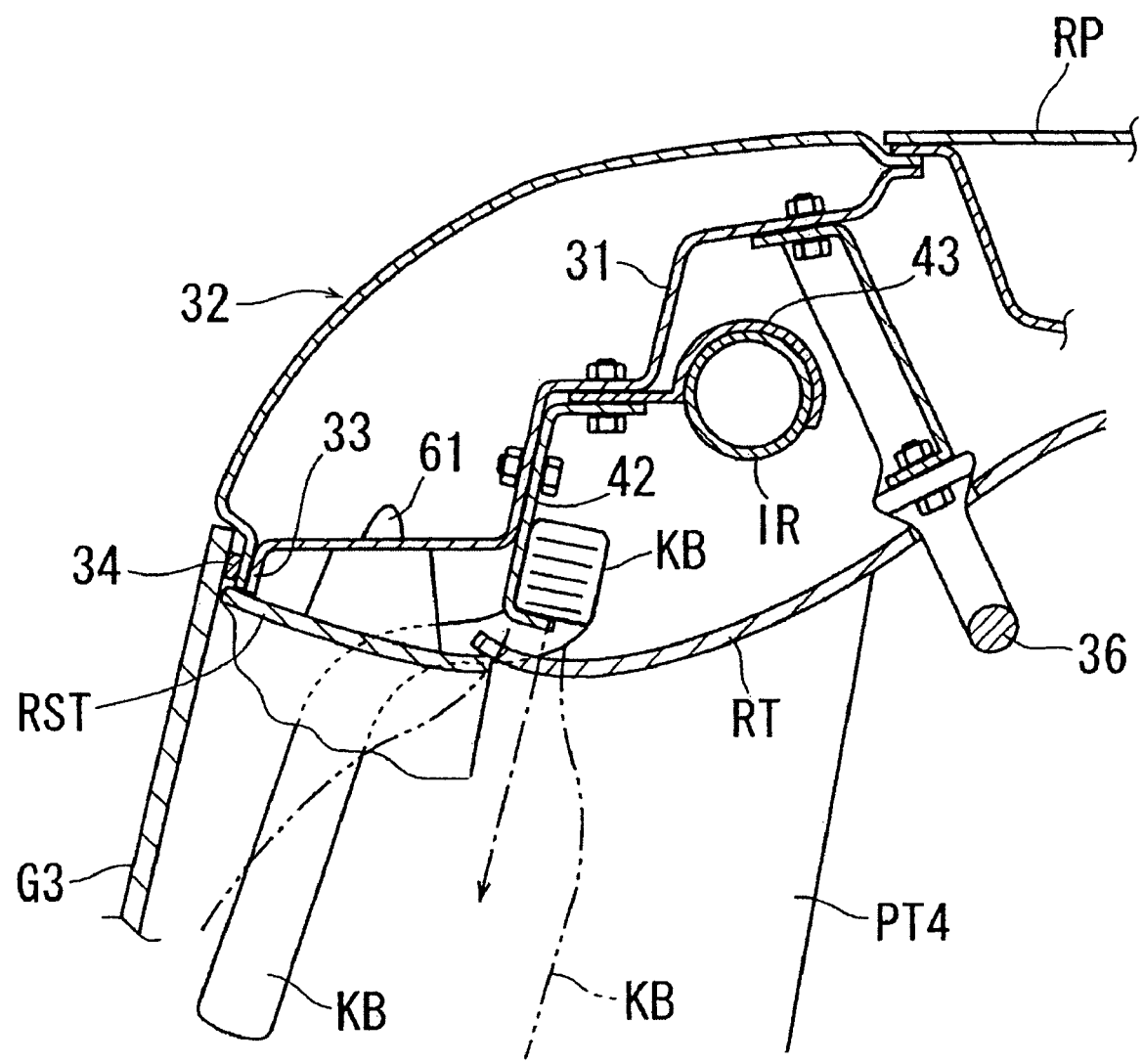
FIG. 15 is a cross-sectional view corresponding to line 15-15 in FIG. 14.
Figure 16:
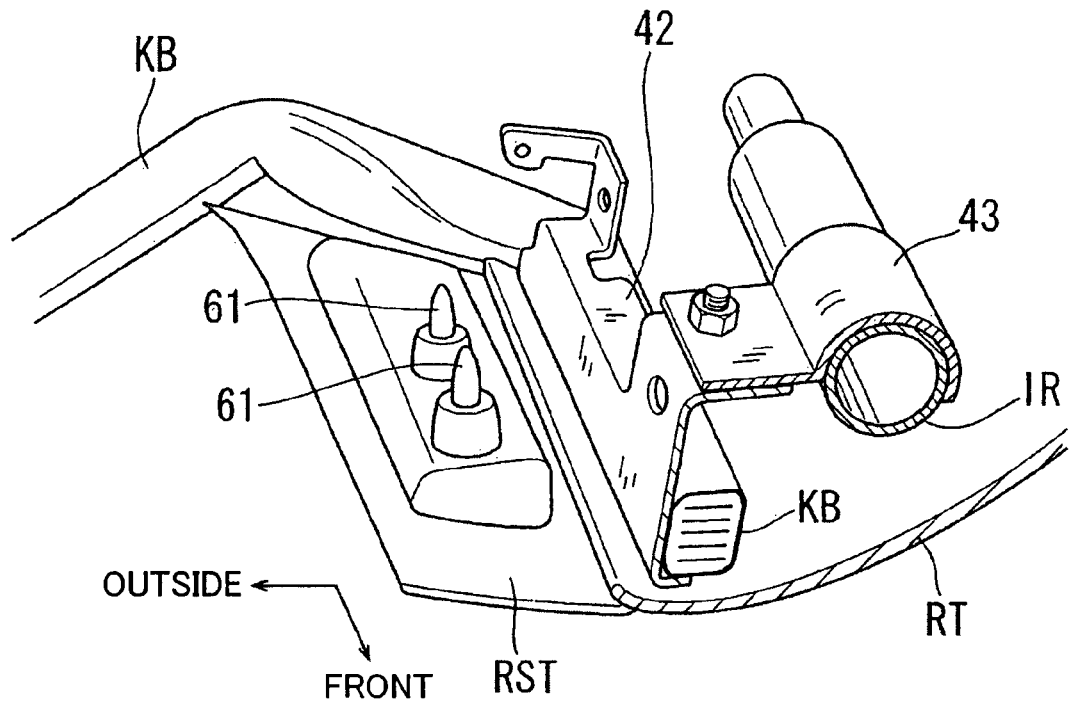
FIG. 16 is a partial cross-section perspective view showing the structure in the vicinity of the upper edge of a side window glass in Modified Example 1.
Figure 17:
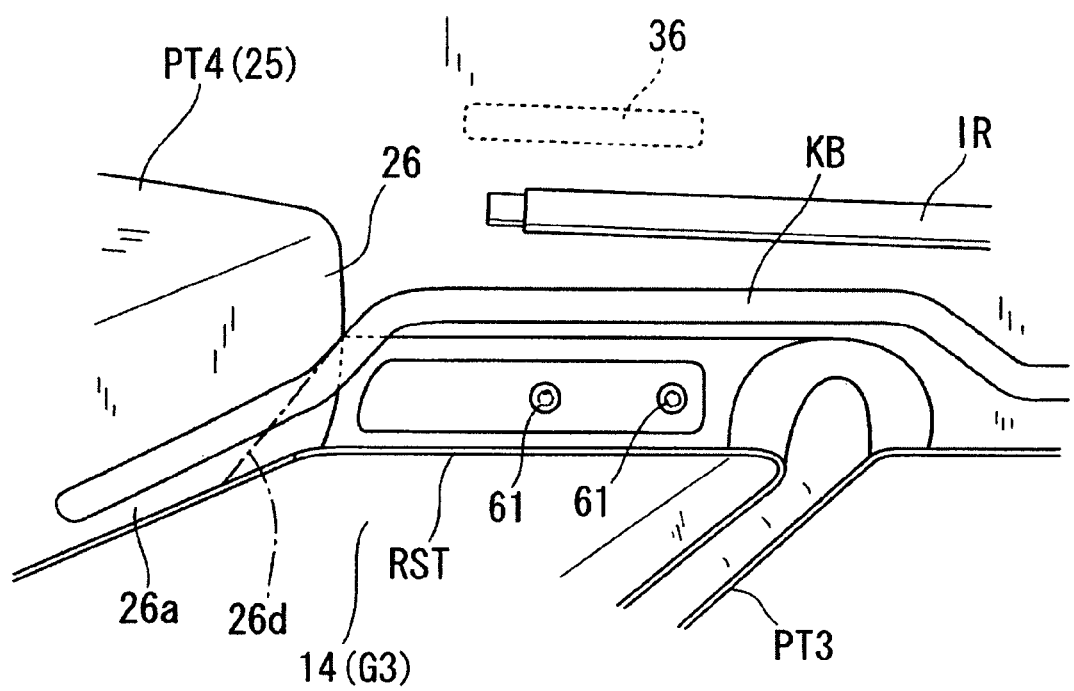
FIG. 17 shows an example of disposing the curtain air bag in a stored state according to Modified Example 1.

The upper face of the roof side trim RST includes a plurality of catch protrusions 61, and using those catch protrusions 61, the roof side trim RST is fixed to the lower face of the roof side rail 32 (see FIG. 15 in particular). The curtain air bag KB in a stored state, in the portion along the upper edge of the side window glass G3, is provided so as to be positioned slightly further inside in the widthwise direction of the vehicle than the roof side trim RST. That is, the curtain air bag KB in a stored state, when expanding and deploying, is deployed in the vehicle cabin from between the roof side trim RST and the roof trim RT while deforming the roof trim RT downward. The roof side trim RST is configured so that the catch protrusions 61 are tightly caught by the roof side rail 32, and are not displaced downward even when receiving pressure when the curtain air bag KB is expanded and deployed. However, a configuration may also be adopted in which the catch position of the catch protrusions 61 relative to the roof side rail 32 is changed slightly downward when receiving pressure during expansion and deployment (such that the roof side trim RST can only be displaced downward a predetermined amount, and is not allowed to become detached from the roof side rail 32).

The assist grip 36 is set up in a position significantly further inside in the widthwise direction of the vehicle than in the case of the above embodiment, and is positioned further inside in the widthwise direction of the vehicle than the inflator IR. Also, the curtain air bag KB in a stored state, in the portion along the upper edge of the side window glass G3 and the middle pillar PT3 portion, is set up at the same position in the widthwise direction of the vehicle. In Modified Example 1 as well, it is possible to smoothly perform expansion and deployment of the curtain air bag KB.

Figure 18:
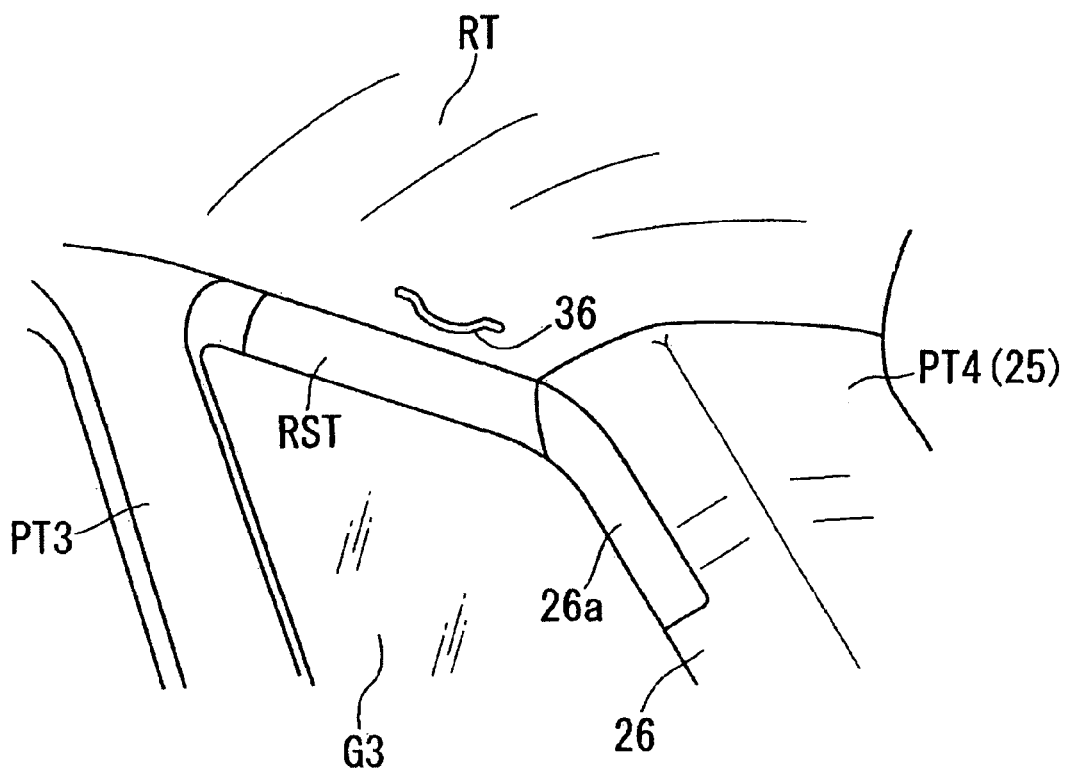
FIG. 18 is a relevant portion perspective view that corresponds to FIG. 4, and shows Modified Example 2 of the first embodiment.
Figure 19:
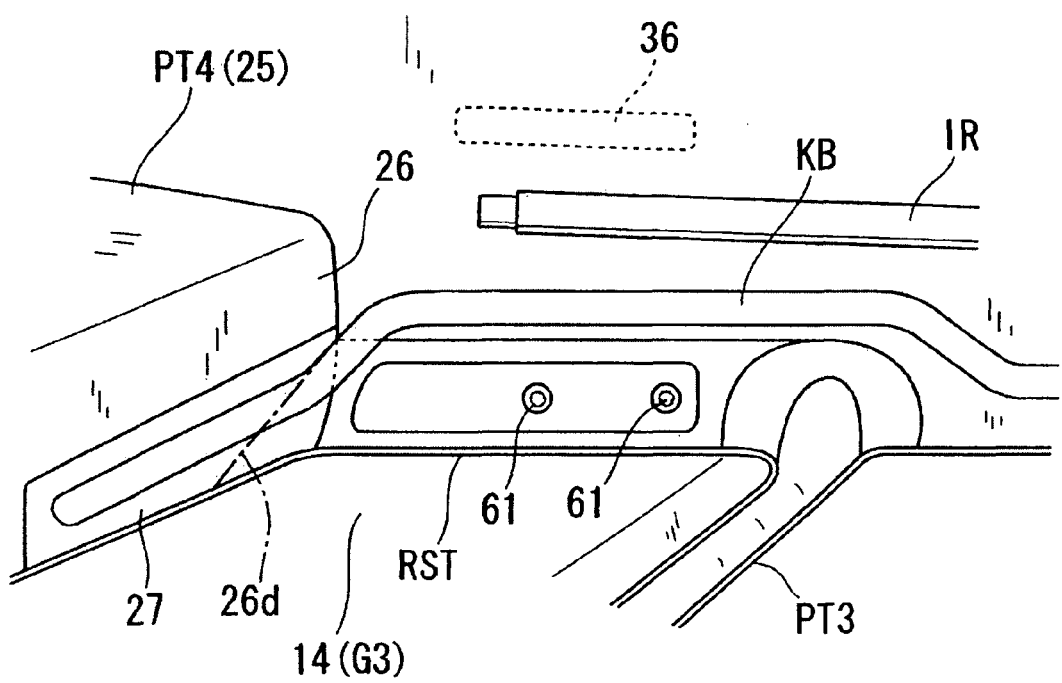
FIG. 19 shows an example of disposing the curtain air bag in a stored state according to Modified Example 2.
Figure 20:
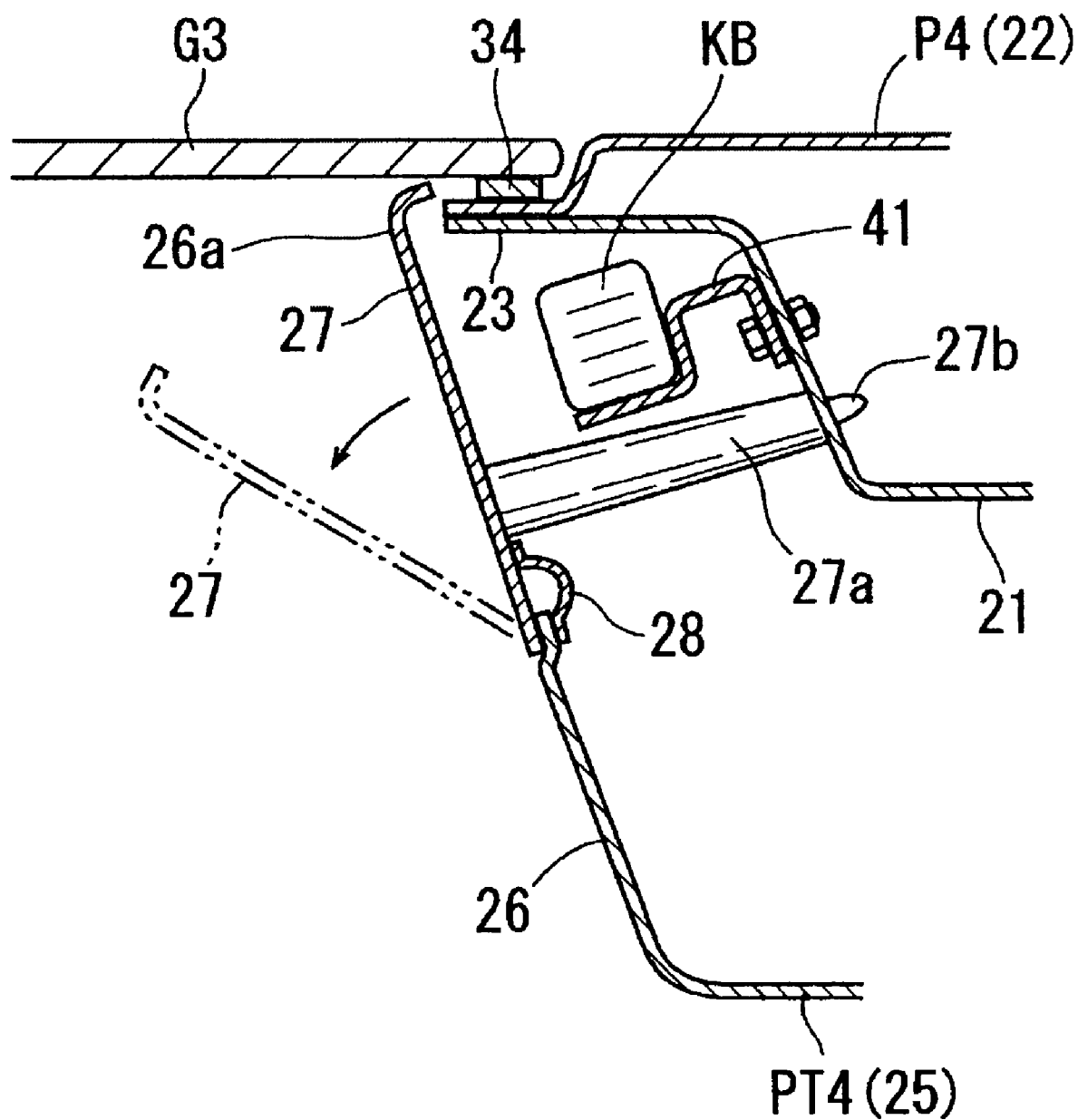
FIG. 20 shows Modified Example 2 and is a cross-sectional view corresponding to FIG. 10.

FIGS. 18 to 20 show Modified Example 2 of the first embodiment. In Modified Example 2, a predetermined portion of the front face 26 in the rear pillar trim PT4 including the predetermined end edge 26a, more specifically, a portion of the front face 26 that is near the outside in the widthwise direction of the vehicle and upward of approximately the middle position in the vertical direction, is configured with a cover member 27 used as a separately formed cover. The cover member 27 is formed flush with the front face 26, and integrated with the other portion (main body portion) of the rear pillar trim PT4 via a hinge 28. The hinge 28, for example, is formed with a loop-like shape (approximately semi-circular arc-like shape) with a soft synthetic resin or the like, and is set up so that the cover member 27 can be swung frontward with the hinge 28 as center of that movement. The cover member 27 is caught by the rear pillar P4 using a catch protrusion 27b formed at the tip end of a support stay 27a provided protruding from the back face of the cover member 27. When the curtain air bag KB is expanded and deployed, the catching action on the rear pillar P4 of the catch protrusion 27b is easily released, and as indicated by the dashed double-dotted line in FIG. 20, the cover member 27 is easily swung forward with the hinge 28 as center of that movement, and thus the deployability of the curtain air bag KB is very good.

Figure 21:
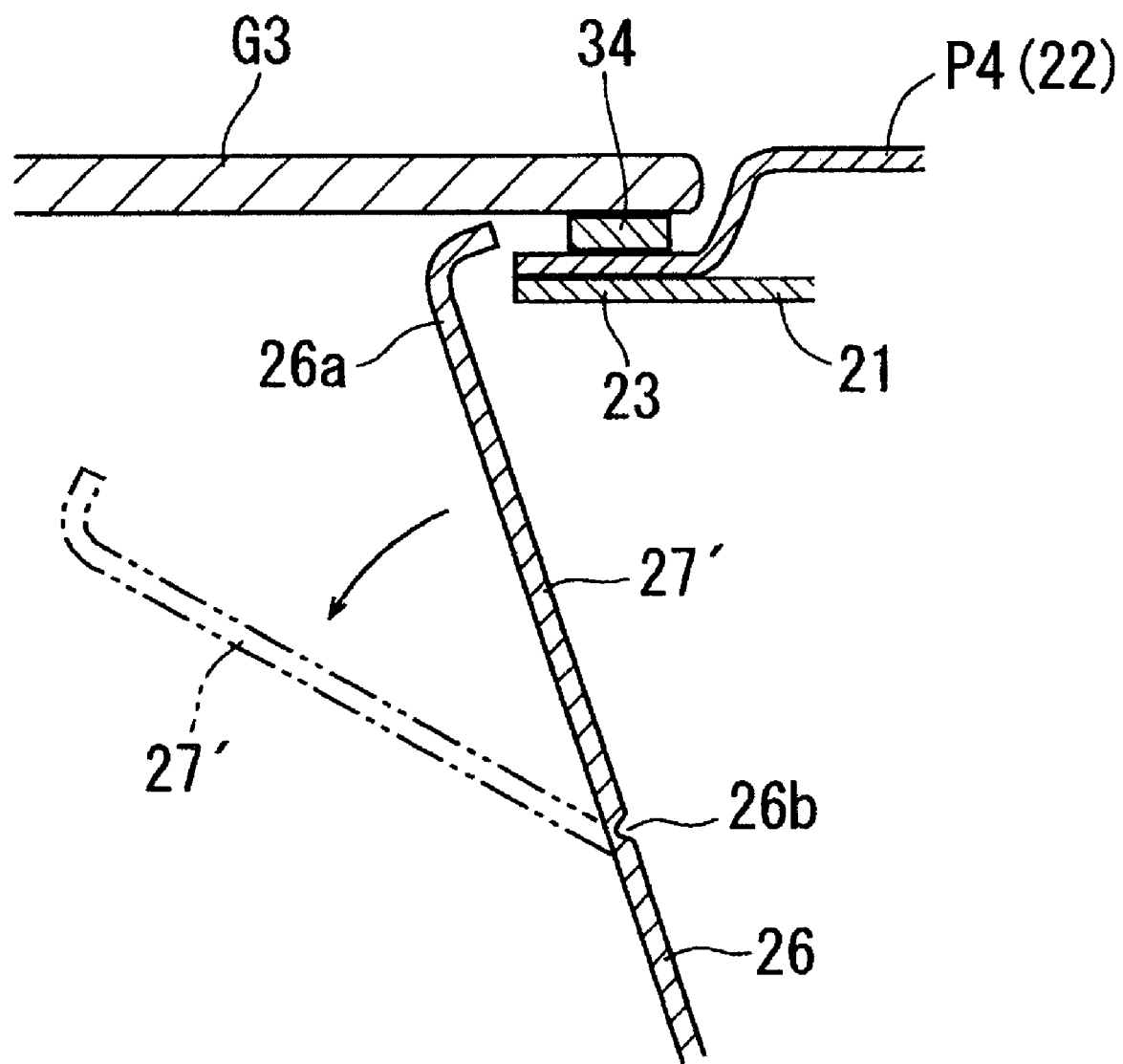
FIG. 21 shows a modified example of FIG. 20.

FIG. 21 shows a modification of FIG. 20, in which the portion that corresponds to the cover member 27 is formed integrated with the front face 26 of the rear pillar trim PT4. That is, formed at the position of the border of a cover 27' that corresponds to the cover member 27 and the other portion, from the back face side of the front face 26, is a groove 26b that performs the function of the hinge 28. The state in which the curtain air bag KB is in a stored state is indicated by the solid line in FIG. 21, and the state in which the curtain air bag KB has been expanded and deployed is indicated by the dashed double-dotted line in FIG. 21.

Figure 22:
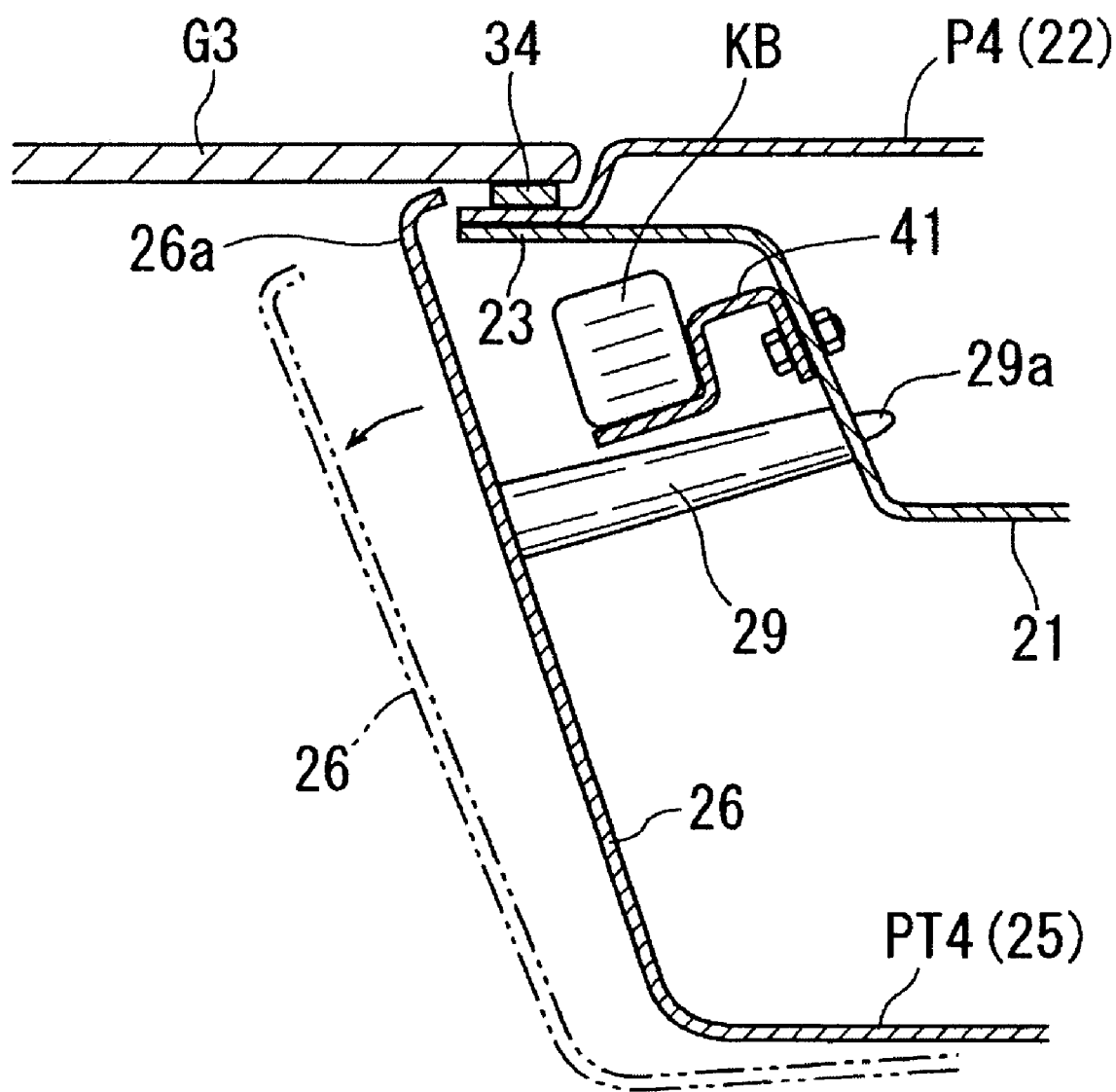
FIG. 22 shows Modified Example 3 of the first embodiment, and corresponds to FIG. 10.

FIG. 22 shows Modified Example 3 of the first embodiment, in which when not less than a predetermined pressing force frontward relative to the rear pillar trim PT4 has been received, the rear pillar trim PT4 can be approximately entirely displaced frontward relative to the rear pillar P4. That is, a catch protrusion 29a is formed at the tip end of a support stay 29 provided protruding from the back face side of the front face 26, and the catch protrusion 29a is caught by the rear pillar P4. When not less than a predetermined pressing force frontward has acted on the front face 26, the catching action on the rear pillar P4 of the catch protrusion 29a is easily released, and as shown by the double-dotted line in FIG. 22, the rear pillar trim PT4 is approximately entirely easily displaced frontward, and thus the curtain air bag KB is deployed well.

Figure 23:
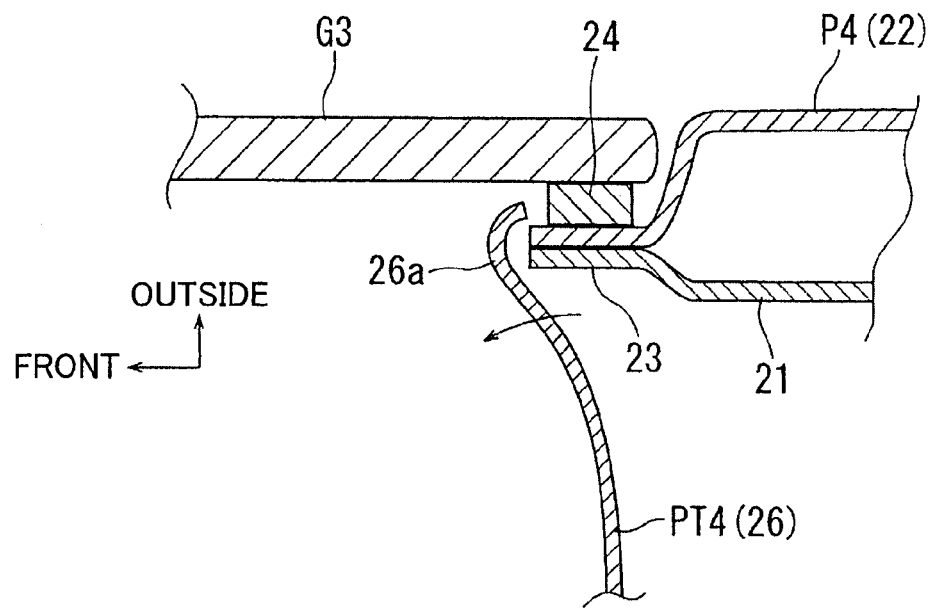
FIG. 23 shows Modified Example 4 of the first embodiment, and corresponds to FIG. 11.

FIG. 23 shows a Modified Example 4 of the first embodiment. In Modified Example 4, of the front face 26 of the rear pillar trim PT4, particularly the vicinity of the predetermined end edge 26a is curved to become convex toward the rear, so as to be positioned more to the front at locations further to the outside in the widthwise direction of the vehicle. According to Modified Example 4, when expanding and deploying the curtain air bag KB, the predetermined end edge 26a side is more easily displaced to the inside in the widthwise direction of the vehicle, and moreover, the area that receives pressing force from the curtain air bag KB also is increased to the extent of the curve (to that extent it is possible to still more adequately prevent damage of the vicinity of the predetermined end edge 26a). Also, when the predetermined end edge 26a has received pressing force toward the front from the curtain air bag KB, the predetermined end edge 26a is promptly displaced in the direction that separates from the side window glass G3 without any movement toward the side window glass G3.

Figure 24:
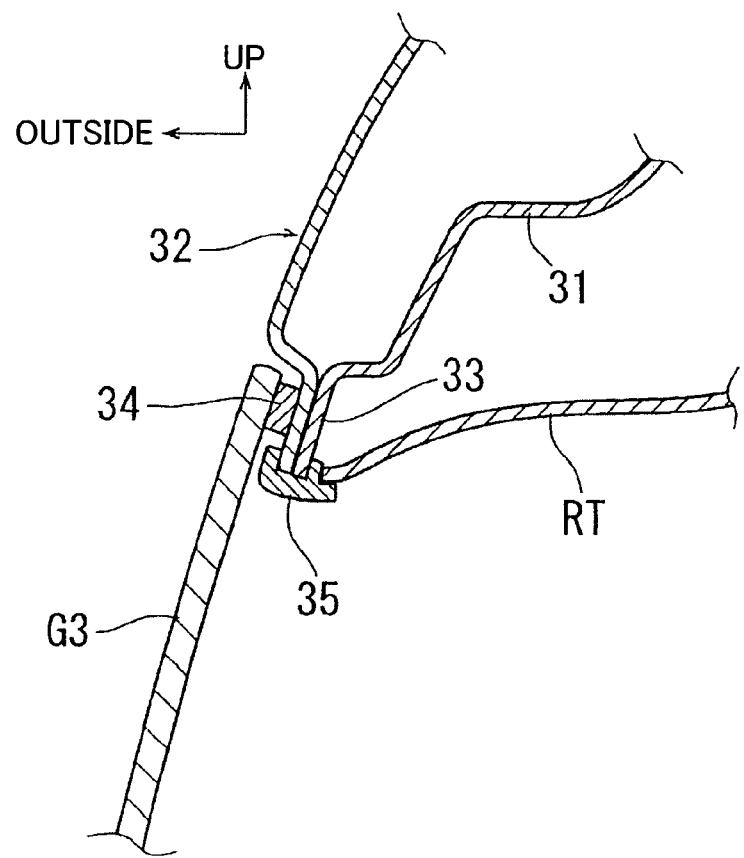
FIG. 24 shows Modified Example 5 of the first embodiment, and corresponds to FIG. 9.

FIG. 24 shows Modified Example 5 of the first embodiment. In Modified Example 5, the outside end of the roof trim RT in the widthwise direction of the vehicle is formed curving increasingly downward toward the outside in the widthwise direction of the vehicle, so same as in the case of FIG. 22, when pressure has been received from the curtain air bag KB when expanding and deploying, the roof trim RT is displaced downward more easily.

Second Embodiment

Figure 25:
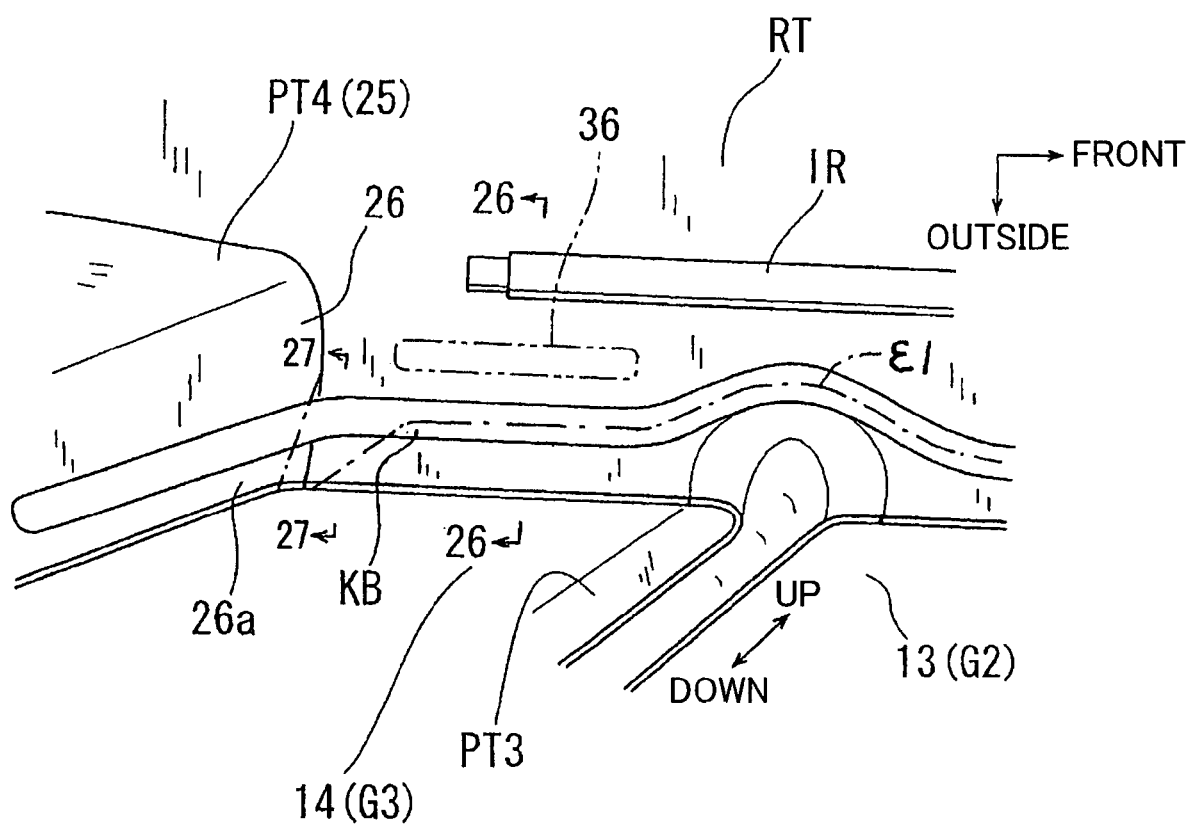
FIG. 25 shows a second embodiment of the present invention, and is a plan view that shows an example of disposing the curtain air bag in a stored state in the vicinity of a side window glass and an example setup for the direction in which deployment of the curtain air bag points.
Figure 26:
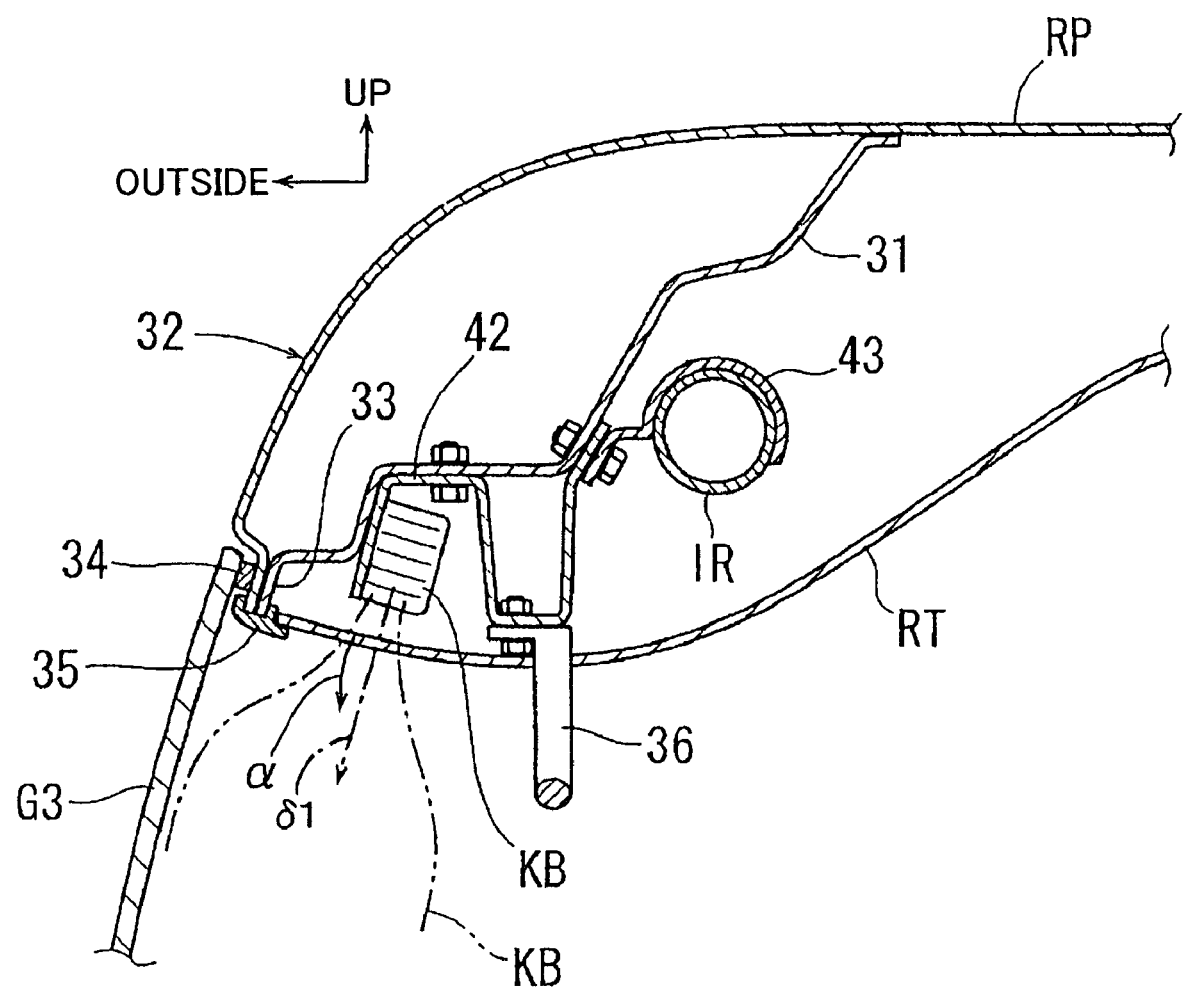
FIG. 26 is a cross-sectional view corresponding to line 26-26 in FIG. 25.
Figure 27:
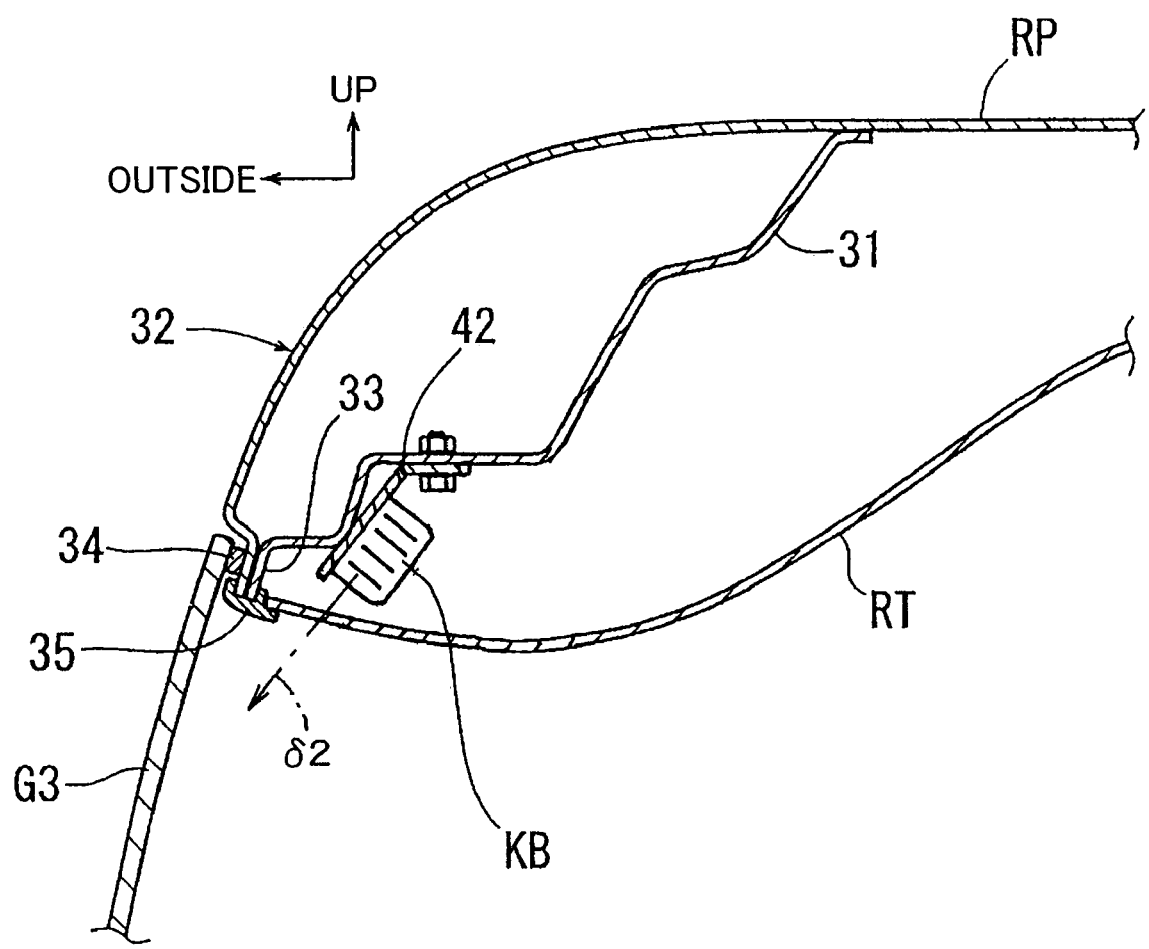
FIG. 27 is a cross-sectional view corresponding to line 27-27 in FIG. 25.

Next is a description of a second embodiment of the present invention with reference to FIGS. 25 to 27. The basic configuration of the second embodiment is the same as that of the first embodiment (see FIGS. 1 to 12), so the same constituent elements as in the first embodiment are given the same numerals and a duplicate description thereof is omitted here (also true for the third and fourth embodiments described below). Also, in the second embodiment as well, although a description with symbols is omitted in the drawings, same as in the first embodiment, the separation distance of the curtain air bag KB in a stored state from the side window glass G3 in the widthwise direction of the vehicle, in the portion along the rear edge of the side window glass G3, is set so as to be smaller than, among the portion along the upper edge of the side window glass G3, the portion in the vicinity of the middle pillar trim PT3 (see FIG. 13; L2<L4). This is also true for the third and fourth embodiments described below.

In the stored curtain air bag KB, the deployment direction described below, when the curtain air bag KB is fixed to the vehicle body at an ordinary installation fixing location, is the direction in which the curtain air bag KB first deploys from the stored state. For example, when the curtain air bag KB has been folded accordion-like from the bottom end (bottom end in a deployed state) of the curtain air bag KB in a deployed state, the deployment tip end side in the direction in which the accordion extends is the direction of deployment. Ordinarily, when folded accordion-like in this manner, because the deployment tip end side in the direction in which the accordion extends is the direction of deployment, the side opposite to the installation fixing location of the curtain air bag KB can become the direction of deployment. Also, when the curtain air bag KB is rolled into a roll-like shape as well, the side opposite to the installation fixing location of the curtain air bag KB is the direction of deployment.

In the second embodiment, in the portion of the curtain air bag KB in a stored state along the upper edge of the side window glass G3, the deployment direction of that portion is changed to point toward the outside in the widthwise direction of the vehicle. That is, in the vicinity of the front end of the upper edge of the side widow glass G3, as shown in FIG. 26, the deployment direction of the curtain air bag KB is set to point approximately downward, as indicated by arrow δ1. On the other hand, in the vicinity of the rear end of the upper edge of the side widow glass G3, as shown in FIG. 27, the deployment direction of the curtain air bag KB is set to point much to the outside in the widthwise direction of the vehicle, as indicated by arrow δ2. The details of the change from the deployment direction in FIG. 26 to the deployment direction in FIG. 27 are shown in FIG. 25. That is, in FIG. 25, a track connecting the point where a direction line of the deployment direction of the curtain air bag KB in the stored state intersects the roof trim RT is indicated as a track ε1 with the dashed dotted line. The more the trajectory ε1 is displaced to the outside in the widthwise direction of the vehicle, the more the deployment direction of the curtain air bag KB is changed to the outside in the widthwise direction of the vehicle. In the example in FIG. 25, the deployment direction of the curtain air bag KB, as shown in FIG. 26, points approximately downward from the front end of the upper edge of the side window glass G3 to a position slightly further rearward than the rear middle position. From the vicinity of the rear end of the upper edge of the side window glass G3 to the rear end, the deployment direction is gradually changed to point to the outside in the widthwise direction of the vehicle, and at the position immediately in front of the rear pillar trim PT4, as indicated by arrow γ in FIG. 10, the deployment direction points toward the vehicle body panel (the connecting flange 23).

As is clear from FIGS. 25 and 26, the curtain air bag KB in a stored state, in a plan view, is set up to be positioned to the inside in the widthwise direction of the vehicle so as to avoid the middle pillar trim PT3 portion at that portion, and to be gradually positioned to the outside in the widthwise direction of the vehicle from the middle pillar trim PT3 portion, and extend in approximately the front-rear direction from the vicinity of the front end of the upper edge of the side window glass G3 to the vicinity of the rear end, and the portion along the rear edge of the side window glass G3 is positioned furthest outside in the widthwise direction of the vehicle. Also, the curtain air bag KB in a stored state, in the portion corresponding to the assist grip 36 provided as a vehicle interior part, is positioned further to the outside in the widthwise direction of the automobile than the portion positioned further to the front than the assist grip 36.

Next is a description of the operation of the configuration as described above. When the curtain air bag KB is in a stored state, the inflator IR is ignited when a predetermined condition is satisfied, such as when a side collision has been detected or predicted, or when a vehicle roll has been detected or predicted. Gas pressure generated by ignition of the inflator IR is supplied to the curtain air bag KB in a stored state, and thus the curtain air bag KB changes to the shape as indicated by the hatched area in FIG. 2, and is expanded and deployed in the vehicle cabin.

The expansion and deployment of the curtain air bag KB into the vehicle cabin is performed while displacing the edge of the roof trim RT outside in the widthwise direction of the vehicle downward, as indicated by arrow α in FIG. 26 (the expanded and deployed curtain air bag KB is indicated by the dashed double-dotted line). The roof trim RT is a soft material, so it can easily be deformed downward. Also, at the rear side of the vehicle, the expansion and deployment of the curtain air bag KB is performed while displacing at least the top of the predetermined end edge 26a of the rear pillar trim PT4 to the front as indicated by arrow β in FIG. 10 (the expanded and deployed curtain air bag KB is indicated by the dashed double-dotted line). In FIG. 10, the curtain air bag KB is expanded and deployed into the vehicle cabin through the space created between the side window glass G3 and the predetermined end edge 26a, but the curtain air bag KB includes an expansion portion that is expanded in the widthwise direction of the vehicle in the predetermined end edge 26a portion, and accordingly, it becomes necessary to sufficiently displace the predetermined end edge 26a to the inside in the widthwise direction of the vehicle while displacing (the top of) the predetermined end edge 26a toward the front. In the portion of the curtain air bag KB in a stored state along the rear edge of the side window glass G3, the expansion direction of the curtain air bag KB points much to the outside in the widthwise direction of the vehicle, as indicated by arrow γ in FIG. 10, so the curtain air bag KB, which is expanded and deployed inside the vehicle cabin while deforming the predetermined end edge 26a, is deployed while the curtain air bag KB makes contact with the side window glass G3. In other words, the space to be formed between the predetermined end edge 26a and the side window glass G3, and used as the passageway of the curtain air bag KB, is allowed to be as small as possible, and as a result it is not necessary to greatly deform the predetermined end edge 26a unnecessarily, which is preferable for preventing the rear pillar trim PT4 from being damaged in the vicinity of the predetermined end edge 26a.

In the portion along the rear edge of the side window glass G3, the deployment direction of the curtain air bag KB points toward the connecting flange 23, and does not point directly toward the rear pillar trim PT4 or the side window glass G3, so it is possible to prevent a situation in which the rear pillar trim PT4 or the side window glass G3 is damaged by large pressure when deployment occurs.

In the front face 26, the opening 53 is formed at the bottom position separated from the predetermined end edge 26a, and the strength in the vicinity of the opening 53 is comparatively weaker than other portions. Thus, when the curtain air bag KB presses the predetermined end edge 26a frontward, approximately the entire front face 26 is much displaced, with that movement centered at the vicinity of the opening 53, as shown by the dashed double-dotted line in FIG. 10, thus forming a large space through which the curtain air bag passes in the widthwise direction of the vehicle. Because it is preferable to greatly displace the predetermined end edge 26a over the range of a large area such as approximately the entire front face 26 (a range with a long distance to the top of the predetermined end edge 26a), in comparison to only greatly displacing near the predetermined end edge 26a, excessive force (excessive deformation) does not act on (particularly the top of) the predetermined end edge 26a and the vicinity thereof, thus preventing a situation in which the predetermined end edge 26a and the vicinity thereof are partially damaged.

In particular, in the present embodiment, in the portion in the vicinity of the border of the upper edge and the rear edge of the side window glass G3 (the upper end of the predetermined end edge 26a), in a side view, the curtain air bag KB curves so as to bend at an angle of not more than 120 degrees from the approximately horizontal direction and is thus provided extended on the bottom side along the rear edge of the side window glass G3, and when the curtain air bag KB is deployed, stress operates on the periphery of the upper end of the predetermined end edge 26a, toward the bottom and the front thereof. In order to mitigate the action of such stress on the upper end, relative to the rear pillar trim PT4, the curtain air bag KB is twisted at the portion that corresponds to the upper end of the predetermined end edge 26a (vicinity of the upper end), and the deployment direction is set such that the bottom side and the front side approximately do not cross, but some degree of stress on the upper end cannot be avoided. Thus, because the opening 53 is disposed separated from the upper end where stress operates in this manner, such stress is prevented from acting on the opening 53, and thus the weakened vicinity of the opening 53 is prevented from being damaged.

Here, as described above, (the predetermined end edge 26a of the front face 26 is set up slightly sloping such that toward the outside in the widthwise direction of the vehicle, the front face 26 is gradually positioned to the rear, and the portion set up sloping to the rear is where the soft roof trim RT is positioned, so deployability of the curtain air bag KB is improved. Also, by setting up the top of the predetermined end edge 26a to gradually point downward further to the outside in the widthwise direction of the vehicle, the soft roof trim RT is also positioned in the portion set up sloping, so the deployability of the curtain air bag KB is good particularly from the top of the predetermined end edge 26a. In particular, when attempting to expand and deploy, downward and to the front, the portion of the curtain air bag KB in a stored state that is in the vicinity of the border of the upper edge and the rear edge of the side window glass G3, the soft roof trim RT is positioned in the portion of the rear sloping portion 26d that has been set up sloping to the rear, so the pressure that acts in the vicinity of the border due to the deployed curtain air bag KB is released, and thus the deployability of the curtain air bag KB is improved. Also, by setting the top of the predetermined end edge 26a to gradually point downward further to the outside in the widthwise direction of the vehicle, the soft roof trim RT is also positioned in this portion, so same as in a case in which the rear sloping portion 26d was formed, while the pressure caused by the deployed curtain air bag KB is released, the deployability of the curtain air bag KB is good particularly from the top of the predetermined end edge 26a toward the front. Also, a configuration may be adopted in which the aforementioned sloping toward the rear and sloping downward are both set at the same time.

In addition, the deployment direction of the curtain air bag KB, in the portion along the upper edge of the side window glass G3, is set to point relatively more to the inside in the widthwise direction of the vehicle than the portion along the rear edge, so the side window glass G3 is not pressed against from inside the vehicle cabin with a large force. Thus, while preventing damage to the side window glass G3, it is possible to easily deform the soft roof trim downward, and easily expand and deform the curtain air bag KB inside the vehicle cabin.

Also, when, viewed from the side in the widthwise direction of the vehicle, the angle between the upper edge and the rear edge of the side window glass G3 is not more than 120 degrees (preferably 100 degrees), the stored curtain air bag KB is disposed along approximately the upper edge and the rear edge of the side window glass G3, so in the periphery of the upper end of the predetermined end edge 26a in the rear pillar trim PT4, the direction in which the stored curtain air bag KB extends is greatly changed so as to bend. Thus, when the curtain air bag KB is deployed, stress operates on the periphery of the upper end of the predetermined end edge 26a, toward the bottom and the front thereof. On the other hand, the curtain air bag KB is set up to be twisted in the portion corresponding to the upper end of the predetermined end edge 26a (vicinity of the upper end), so that the curtain air bag KB is deployed in downward and frontward directions that approximately do not intersect. Thus the stress on the upper end of the predetermined end edge 26a is reduced, so it is possible to prevent damage to the rear pillar trim PT4.

Also, in the present embodiment, as shown in FIG. 27, at the rear end of the upper edge of the side window glass G3, which is in the vicinity of the upper end of the predetermined end edge 26a of the rear pillar trim PT4, the deployment direction of the curtain air bag KB points to the outside in the widthwise direction of the vehicle, and in that case, the outer edge of the soft roof trim RT in the widthwise direction of the vehicle exists on a line extended in the deployment direction, so it is possible to dramatically improve deployability.

Further, the change in the location of the deployment direction, which causes deployability to worsen, happens in the portion where the easily deformed roof trim RT is positioned, so it is possible to insure good deployability of the curtain air bag KB into the vehicle cabin. Incidentally, when the deployment direction has changed abruptly in the vicinity of the border between the upper edge and the rear edge of the side window glass G3, in the portion where it is necessary to deform the hard pillar trim PT4, the location where the deployment direction changes, and the location where the curtain air bag KB in a stored state changes from a state extending in approximately the horizontal direction to a state extending in approximately the vertical direction, overlap more than a little, which is preferable for insuring sufficient deployability of the curtain air bag KB.

As shown in FIG. 25, the curtain air bag KB in a stored state provided to the rear of the predetermined end edge 26a is set up so as to be positioned as far outside as possible in the widthwise direction of the vehicle, so the predetermined end edge 26a is deformed as easily as possible, which is desirable for further improving the deployability of the curtain air bag KB. In particular, a case in which the curtain air bag KB in a stored state located to the rear of the predetermined end edge 26a is positioned further outside in the widthwise direction of the vehicle toward the bottom is preferable for preventing interference between a passenger sitting in the third row seat SC (the last row seat) and the curtain air bag KB when attempting to expand and deploy the curtain air bag KB.

Also, the curtain air bag KB in a stored state, in the portion corresponding to the assist grip 36, is provided offset to the outside in the widthwise direction of the vehicle relative to the assist grip 36, and in the portion corresponding to the middle pillar trim PT3, which is a portion further to the front than the assist grip 36, the curtain air bag KB is positioned to the inside in the widthwise direction of the vehicle relative to the assist grip 36, so the curtain air bag KB is deployed well without any interference from the assist grip 36 or the middle pillar trim PT3.

Figure 28:
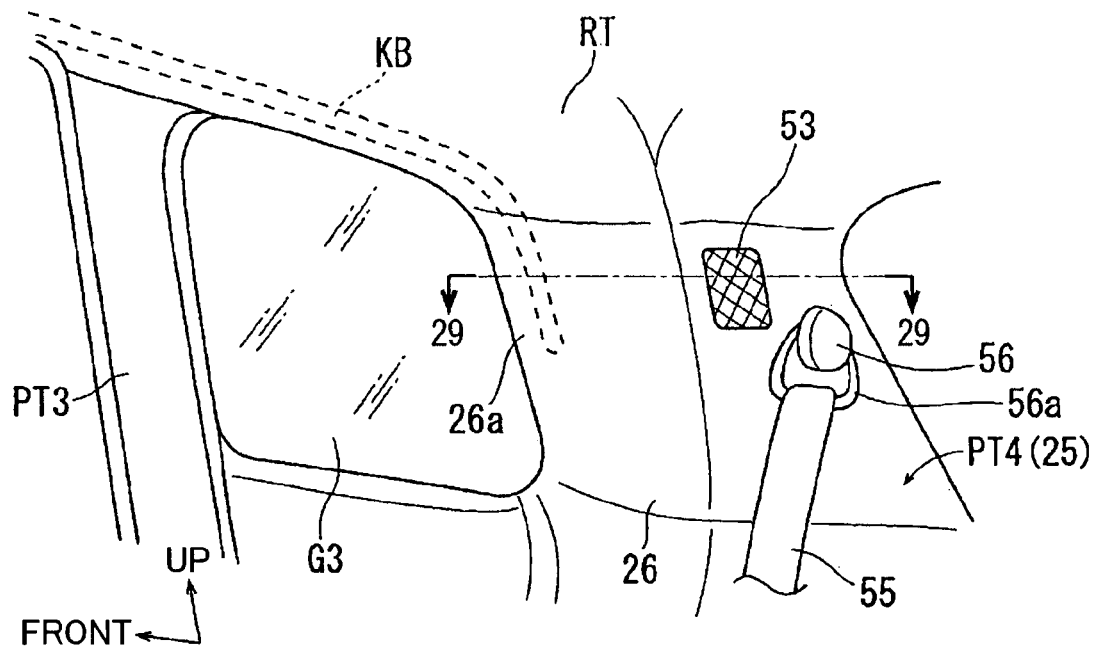
FIG. 28 shows Modified Example 1 of the second embodiment, and corresponds to FIG. 7.
Figure 29:
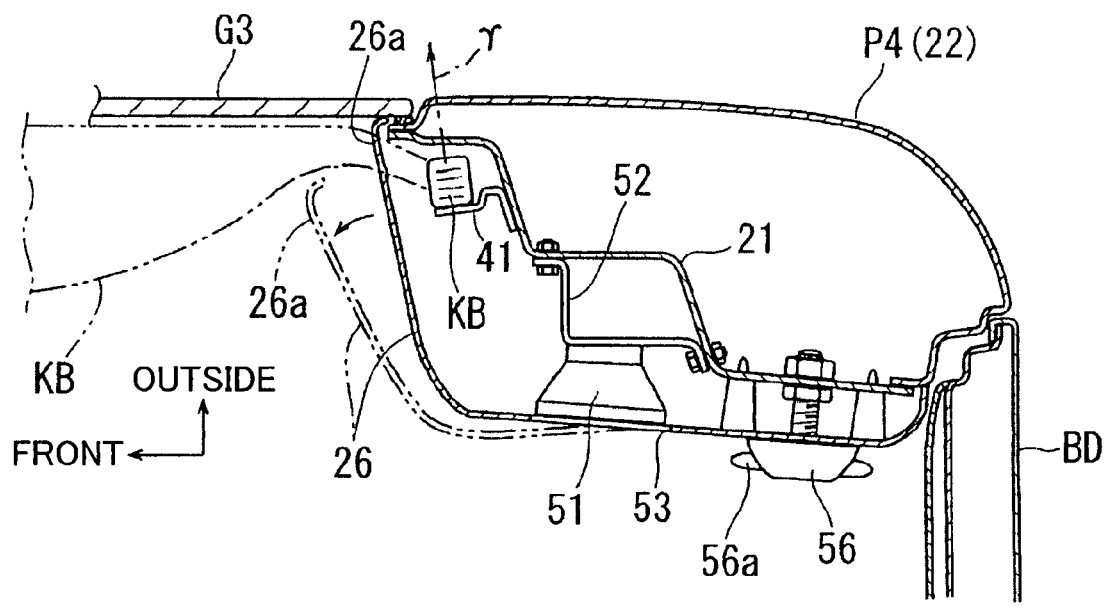
FIG. 29 is a cross-sectional view corresponding to line 29-29 in FIG. 28.

FIGS. 28 and 29 show a Modified Example 1 of the second embodiment. The same constituent elements as in the second embodiment are given the same numerals and a duplicate description thereof is omitted here (also true for Modified Examples and subsequent below). In Modified Example 1, the shoulder anchor 56 and the opening 53 for the speaker 51 are formed in the side face 25 of the rear pillar trim PT4. That is, the shoulder anchor 56 is disposed in the same position as in the above embodiment, but the position of the speaker 51 and the opening 53 differs from the above embodiment; the opening 53 is positioned in the side face 25. That is, the opening 53 is formed in the upper portion of the side face 25, and the speaker 51 is provided in the rear pillar trim PT4 corresponding to the opening 53. The sound from the speaker 51, i.e. the sound dispersed into the vehicle cabin through the opening 53, points to the inside in the widthwise direction of the vehicle. The position of the opening 53 in the distance along the surface of the rear pillar trim PT4 is set to a position closer to the top of the predetermined end edge 26 than the shoulder anchor 56 (the position of the opening 53 in the side face 25 is further frontward and upward than the shoulder anchor 56).

In Modified Example 1 in FIGS. 28 and 29, when the curtain air bag KB is expanded and deployed, as indicated in FIG. 19 with a dashed double-dotted line, the rear pillar trim PT4 is much deformed, that deformation centered in the vicinity of the opening 53, whose strength is comparatively weaker than other portions, and thus damage to the predetermined end edge 26a (particularly the top thereof) and the vicinity thereof is prevented. Also, the position of the opening 53 is closer to the top of the predetermined end edge 26a than the position of the shoulder anchor 56, so the shoulder anchor 56 does not suppress the aforementioned deformation of the rear pillar trim PT4.

Figure 30:
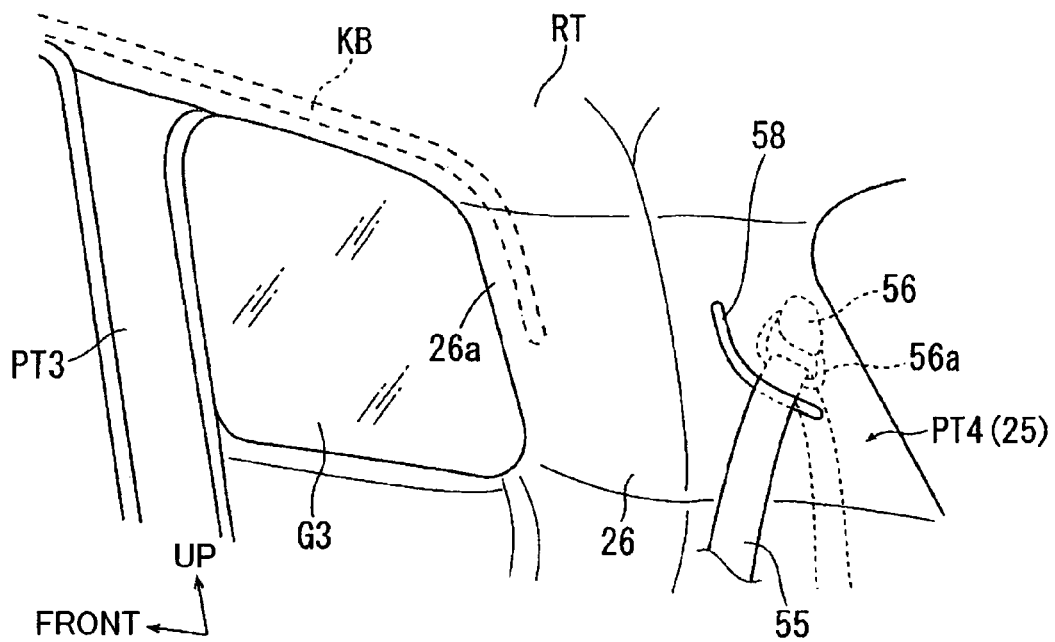
FIG. 30 shows Modified Example 2 of the second embodiment, and corresponds to FIG. 7.

FIG. 30 shows Modified Example 2 of the second embodiment. In Modified Example 2, (a guide 56a of) the shoulder anchor 56 is positioned in the rear pillar trim PT4, and in the side face 25 of the rear pillar trim PT4, an elongated hole 58 is formed through which the seat belt 55 passes after passing through the shoulder anchor 56. When, same as the opening 53 in the above embodiment, the elongated hole 58 receives pressure from the curtain air bag KB during expansion and deployment, the elongated hole performs a function to allow the entire rear pillar trim PT4 to deform greatly, with that deformation centered on the vicinity of the elongated hole 58. The elongated hole 58 is formed long in an arc-like shape from the upper front to the lower bottom of the side face 25. Thus, along with being able to promote deformation of the entire rear pillar trim PT4, it is possible to greatly insure adjustment width of the height position of the seat belt 55 according to differences in the physique of the passenger seated in the third row seat SC.

Figure 31:
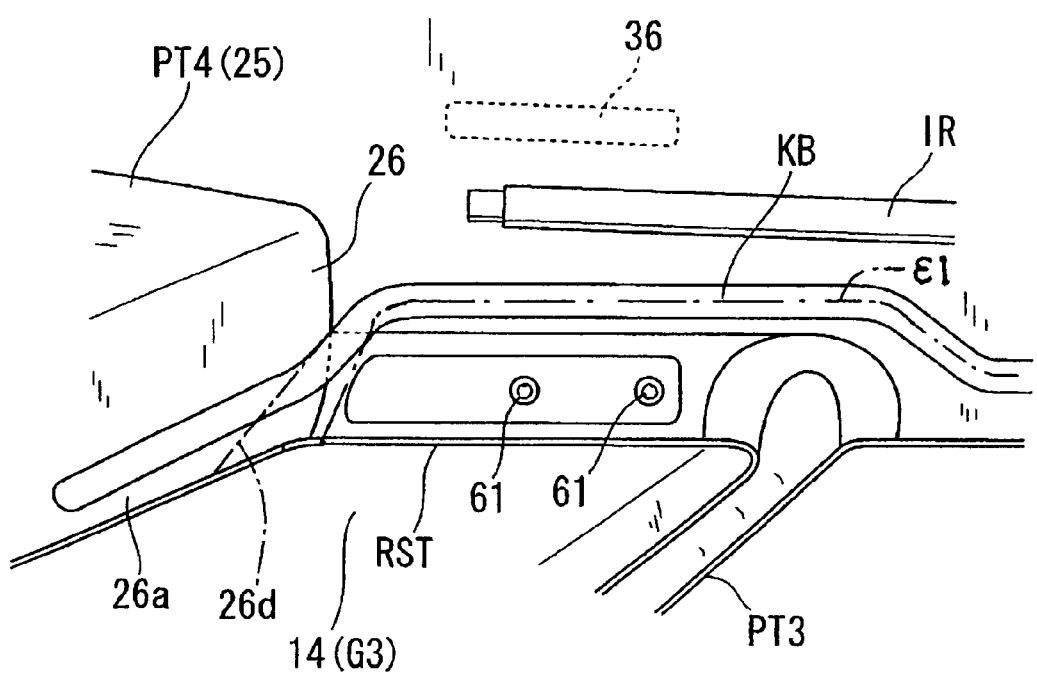
FIG. 31 shows a case in which Modified Example 1 of the first embodiment is applied to the second embodiment, and corresponds to FIG. 25.

Modified Example 1 of the first embodiment is applicable in the second embodiment. This case is shown in FIG. 31. In this case, in the rear end of the upper edge of the side window glass G3, the hard roof side trim RST exists on a line extended in the deployment direction of the curtain air bag KB, but the roof side trim RST is easily displaced downward when receiving deployment pressure even when there is a comparatively small deployment of the curtain air bag KB, so same as in the above embodiment, it is possible to dramatically improve the deployability of the curtain air bag KB.

Figure 32:
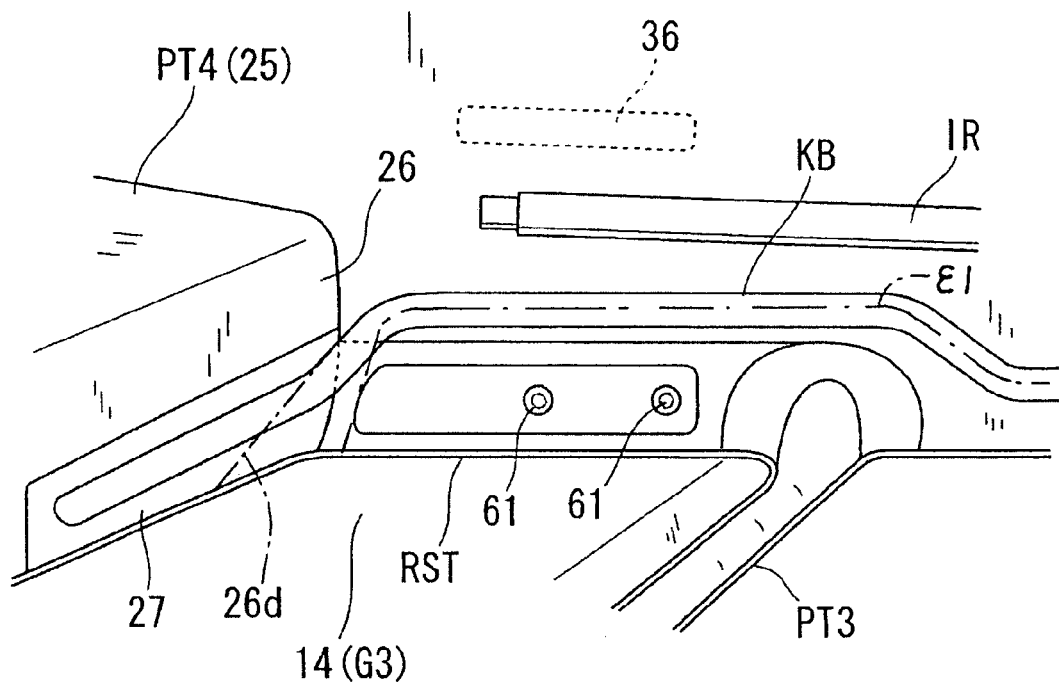
FIG. 32 shows a case in which Modified Example 2 of the first embodiment is applied to the second embodiment, and corresponds to FIG. 25.
Figure 33:
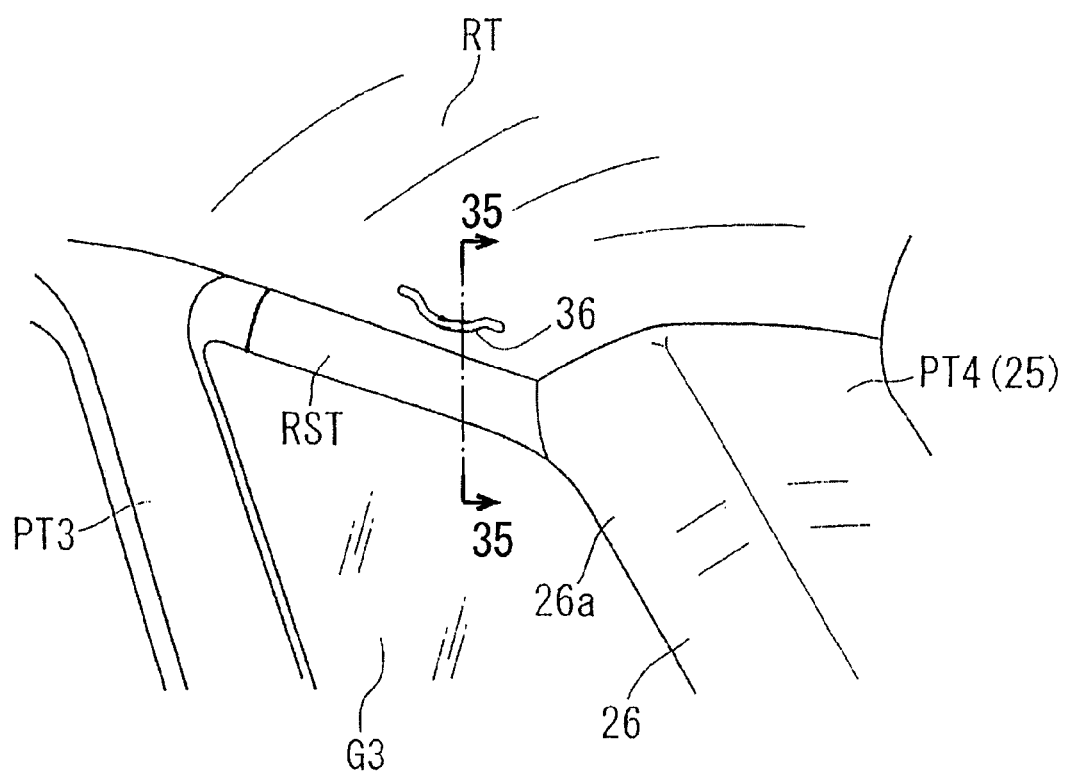
FIG. 33 shows a third embodiment of the present invention, and is a perspective viewing the vicinity of a rear pillar trim and a roof side trim from inside the vehicle cabin.

Also, Modified Example 2 of the first embodiment is applicable in the second embodiment. This case is shown in FIG. 32. In this case, it is also possible to apply a modified example as shown in FIG. 21. Further, Modified Examples 3 to 5 of the first embodiment are also applicable in the second embodiment.

Third Embodiment

Next is a description of a third embodiment of the present invention with reference to FIGS. 33 to 37.

In the third embodiment, as shown in FIGS. 33 to 37, the outside end edge of the roof trim RT in the widthwise direction of the vehicle, between the pillar trim PT3 and the rear pillar trim PT4, protrudes slightly in the widthwise direction of the vehicle, but does not reach the side window glass G3. In the immediate vicinity of the side window glass G3, the roof side trim RST is provided extending in the front-rear direction along the upper edge of the side window glass G3. That is, the roof side trim RST is positioned to the outside of the roof trim RT in the widthwise direction of the vehicle. The roof side trim RST is set up in a case in which, when moving the roof trim RT from outside the vehicle to inside the vehicle cabin through a vehicle opening and installing the roof trim RT to the roof, the roof trim RT cannot be largely formed for a reason such as the opening of the back door BD or the like being too small, and by using the roof side trim RST for a body separate from the roof trim RT as the portion of the roof trim RT that could not pass through the opening, the installability of the roof trim RT is improved. Of course, the roof side trim RST may also be installed in order to improve appearance.

The roof side trim RST, same as the rear pillar trim PT4 and the like, is harder than the roof trim RT, and specifically is formed from a hard synthetic resin such as the material that constitutes the rear pillar trim PT4. The roof side trim RST as a whole has the form of a thin plate, and is significantly smaller in the widthwise direction of the vehicle than the front face 26 of the rear pillar trim PT4. The roof side trim RST, is fixed to the roof side rail 32 (that constitutes the inner panel 31) using a catch protrusion 61 set up at a position to the front of the middle position in the front-rear direction of the roof side trim RST (see FIGS. 35 and 36). The rear end of the roof side trim RST is positioned in the immediate vicinity of the upper end (front end) of the rear pillar trim PT4, and adjacent such that there is approximately no space between members RST and PT4, but may also be provided adjacent such that there is a slight amount of space. Likewise, the front end of the roof side trim RST is positioned in the immediate vicinity of the rear end of the middle pillar trim PT3, and is adjacent such that there is approximately no space between members RST and PT3, but may also be provided adjacent such that there is a slight amount of space. Also, in a case in which a space is formed, it is preferable to bury the space in a small molding material or plug material or the like.

In the present embodiment, the assist grip 36 is provided positioned further to the inside in the widthwise direction of the vehicle than the inflator IR, but the position in which the assist grip 36 is provided can be set as appropriate; for example, the assist grip 36 may be positioned between the curtain air bag KB in a stored state and the inflator IR.

Figure 34:
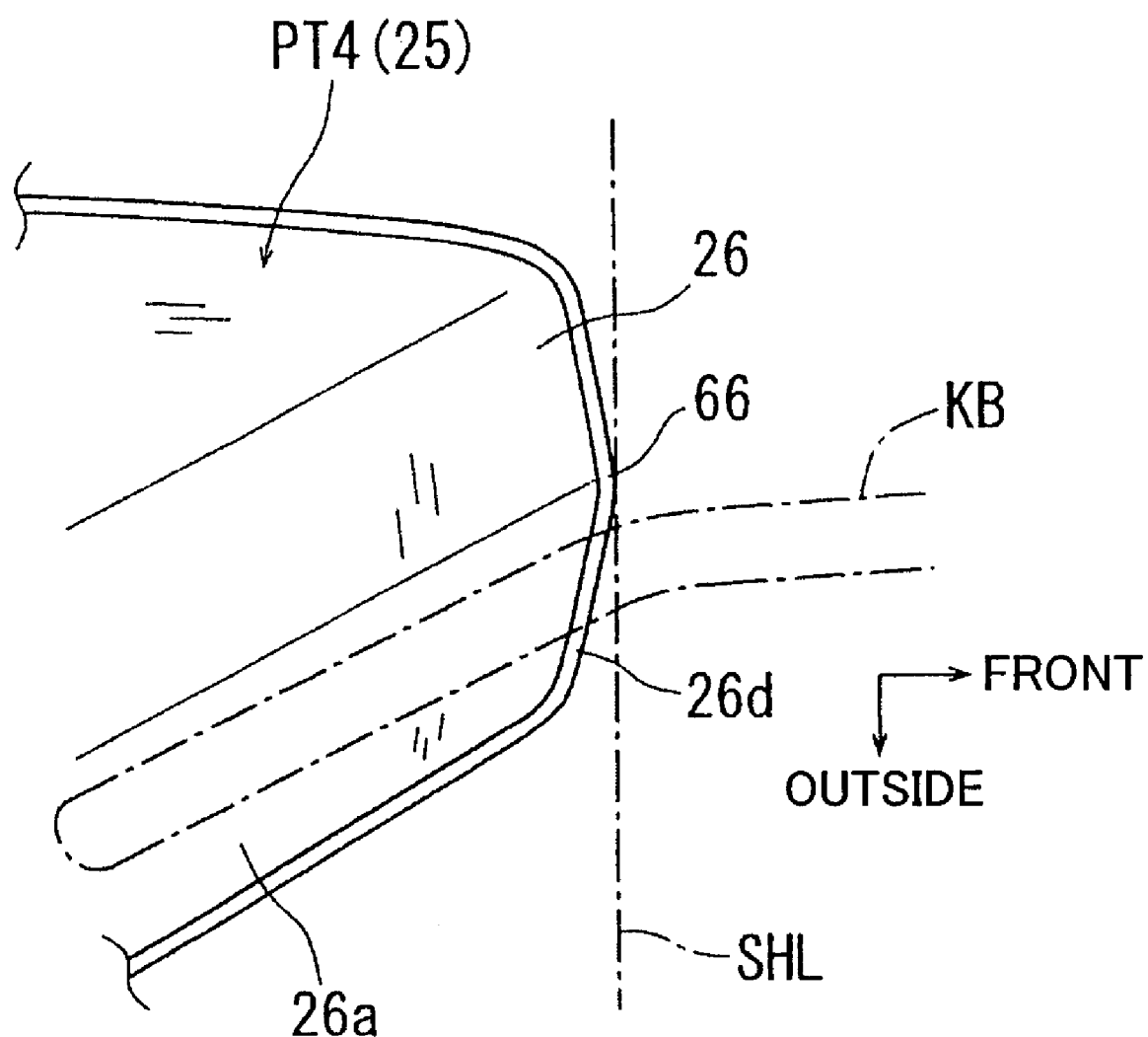
FIG. 34 is a relevant portion plan view that shows a case in which a rear sloping portion is formed in a front face portion of the rear pillar trim.
Figure 37:
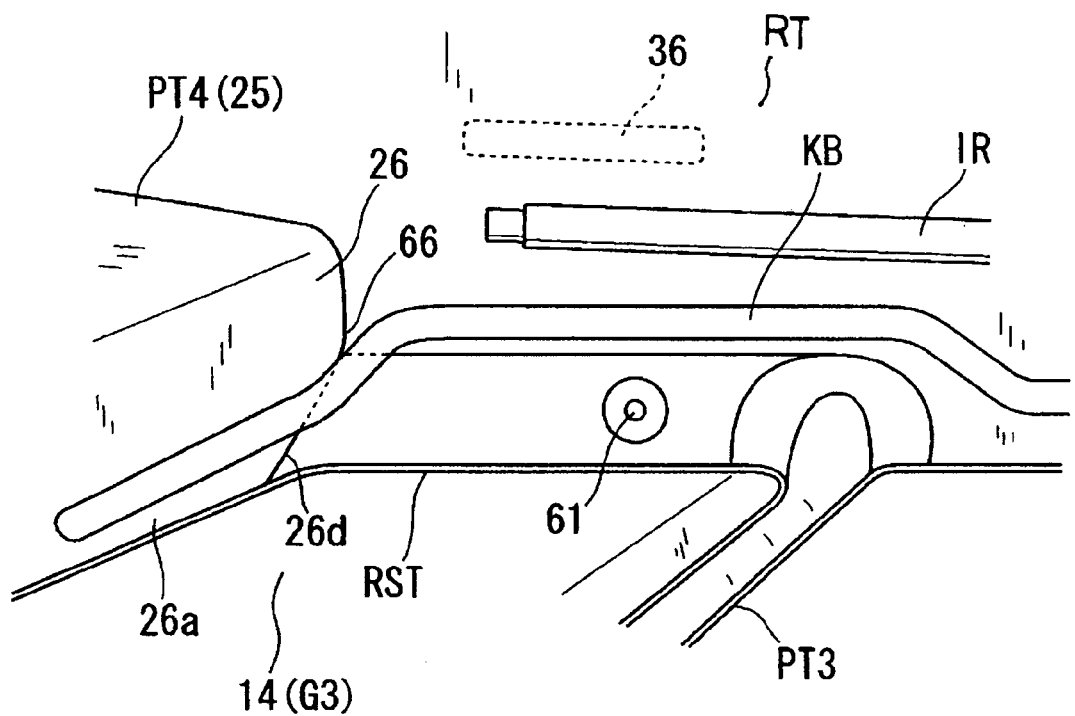
FIG. 37 is a relevant portion plan view showing, for example, a curtain air bag in a stored state disposed in the vicinity of the roof side trim.

As shown in FIGS. 34 and 37, the front face 26 in the rear pillar trim PT4, in a plan view (when viewed from above the vehicle body, for example), if formed so as to have the sloping portion 26d sloped so as to gradually be positioned to the rear further to the outside in the widthwise direction of the vehicle. That is, the portion positioned to outside in the widthwise direction of the vehicle from a break point 66 at a position in approximately the middle in the widthwise direction of the vehicle of the front face 26 is used as the rear sloping portion 26d. The sloping portion 26d is sloped such that, further to the outside in the widthwise direction of the vehicle from the break point 66, the sloping portion 26d is separated further from a vehicle widthwise reference line SHL that extends in the widthwise direction of the vehicle. In the present embodiment, the rear sloping portion 26d is formed in approximately a straight line, but it may also be, for example, set up to slope in an arc-like shape that is convex toward the front. Also, the rear sloping portion 26d may be formed in only the upper portion of the front face 26. By forming the rear sloping portion 26d, the area of the portion of the rear pillar trim PT4 that covers the curtain air bag KB in a stored state from the front is reduced, and to that extent, the resistance action of the rear pillar trim PT4 is reduced and thus the deployability of the curtain air bag KB is improved.

Figure 35:
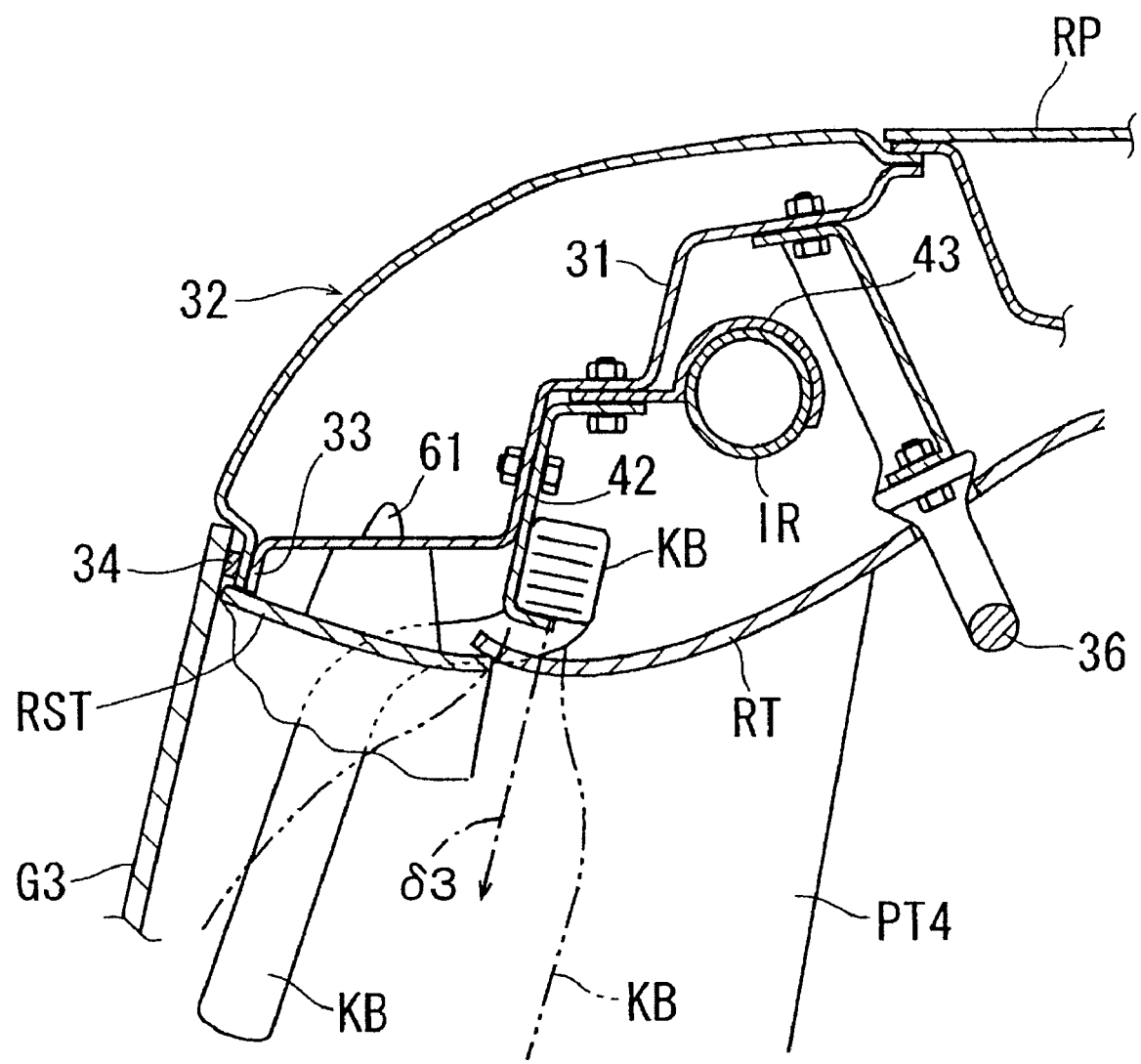
FIG. 35 is a cross-sectional view corresponding to line 35-35 in FIG. 33.
Figure 36:
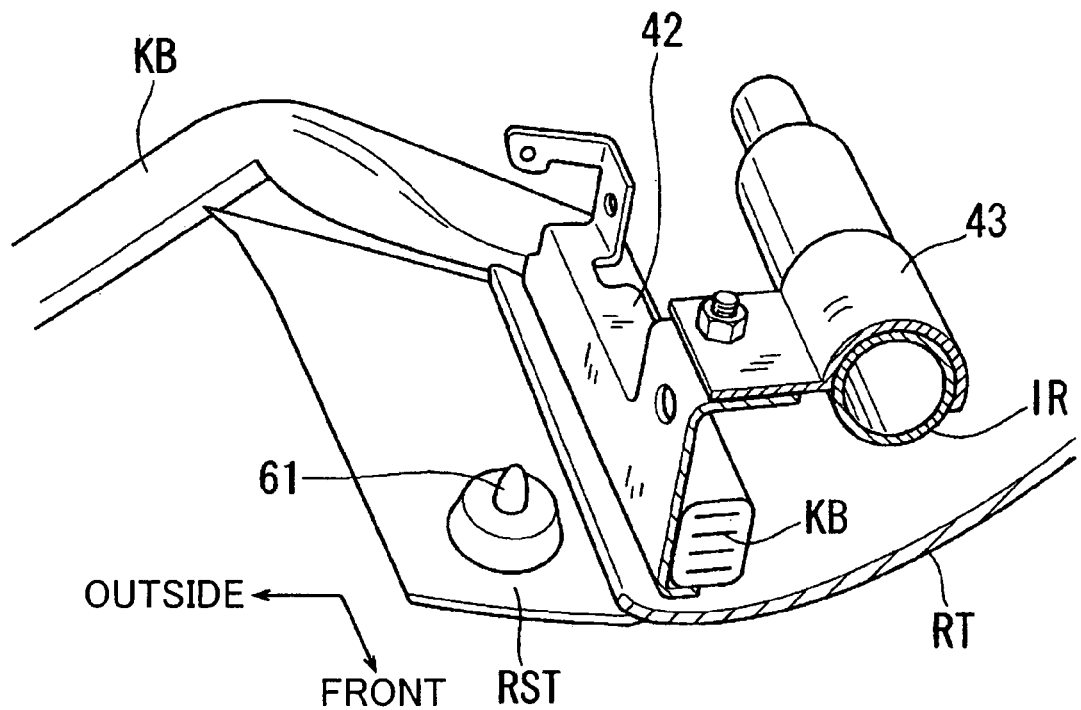
FIG. 36 shows the structure of the vicinity of the roof side trim, and is a relevant portion perspective view of a partial cross-section.

Next is a description of the disposed state of the curtain air bag KB in a stored state in the vicinity of the roof side trim RST, and the deployment direction of the curtain air bag KB, with reference to FIGS. 10, 35, and 37. First, when describing the disposed state of the curtain air bag KB in a stored state, as shown in FIG. 37, the curtain air bag KB, in the portion along the roof side trim RST, is provided extending in the front-back direction in an approximately straight line (approximately straight) so as to pass through a position slightly more to the inside in the widthwise direction of the vehicle than the inside edge of the roof side trim RST in the widthwise direction of the vehicle, and passes to the inside of the middle pillar trim PT3 in the widthwise direction of the vehicle. The curtain air bag KB is set up so that the curtain air bag KB bends toward the outside in the widthwise direction of the vehicle in the vicinity of the rear end of the roof side trim RST, and in the portion along the rear pillar trim PT4, the curtain air bag KB is positioned further to the outside in the widthwise direction of the vehicle than at the portion along the roof side trim RST. The curtain air bag KB in a stored state is provided in the immediate vicinity of the rear sloping portion 26d, and is set up so that the deployment direction of the curtain air bag KB passes through the rear sloping portion 26d, so that the curtain air bag KB in the midst of expansion and deployment makes contact with the rear sloping portion 26d. The shape of the rear sloping portion 26d in a plan view can be appropriately set. For example, the rear sloping portion 26d may be formed in a straight line or convex toward the front.

The deployment direction of the curtain air bag KB is set for example in the following manner, and the deployment direction of the curtain air bag KB is the direction of deployment from the deployed state to the first deployed direction when the curtain air bag KB is fixed to the vehicle body at the ordinary installation fixing location. For example, when the curtain air bag KB is folded up like an accordion from the bottom end of the curtain air bag KB in a deployed state (the bottom end in a deployed state), the deployment leading side in the direction in which the accordion is provided is the deployment direction. When the curtain air bag KB is folded up in an accordion-like state, ordinarily, the deployment leading side in the direction in which the accordion is provided is the deployment direction, so the side opposite to the installation fixing location of the curtain air bag KB can also be the deployment direction. Also, when the curtain air bag KB is been rolled into a roll-like shape as well, the side opposite to the installation fixing location of the curtain air bag KB becomes the direction of deployment.

First, the deployment direction of the curtain air bag KB at the middle pillar trim PT3 portion and the portion along the roof side trim RST, points approximately downward, as indicated by arrow δ3 in FIG. 35. On the other hand, in the portion along the rear pillar trim PT4, as indicated by arrow γ in FIG. 10, the deployment direction changes much to the outside in the widthwise direction of the vehicle, and the deployment direction is set so that the connecting flange 23, which is a vehicle body panel, is in the deployment direction (such that the side window glass G3 is not directly positioned in the deployment direction). The above sort of large change in the deployment direction, as described above, is performed by twisting the curtain air bag KB in a stored state from the vicinity of the rear end of the roof side trim RST to the vicinity of the upper end of the rear pillar trim PT4.

Next is a description of the operation of the configuration as described above. When the curtain air bag KB is in a stored state, the inflator IR is ignited when a predetermined condition is satisfied, such as when a side collision has been detected or predicted, or when a vehicle roll has been detected or predicted. Gas pressure generated by ignition of the inflator IR is supplied to the curtain air bag KB in a stored state, and thus the curtain air bag KB is expanded and deployed in the vehicle cabin with the shape as indicated by the hatched area in FIG. 2.

Expansion and deployment of the curtain air bag KB inside the vehicle cabin, in the portion along the roof side trim RST, is performed via the location of the border between the roof side trim RST and the roof trim RT. That is, the curtain air bag KB is deployed inside the vehicle cabin while the roof trim RT positioned at the portion of the roof side trim RST inside in the widthwise direction of the vehicle is deformed downward (the roof side trim RST maintains the state shown in FIG. 35). Because the roof trim RT is soft, that deformation downward is easily performed, so the deployment of the curtain air bag KB inside the vehicle cabin via the location of the border of the roof side trim RST and the roof trim RT is smoothly performed.

The deployment of the curtain air bag KB in the middle pillar trim PT3 portion is performed via the location of the border of the middle pillar trim PT3 and the roof trim RT. That is, the curtain air bag KB is deployed inside the vehicle cabin while the roof trim RT to the inside of the middle pillar trim PT3 in the widthwise direction of the vehicle is deformed downward. Because the roof trim RT is soft, that deformation downward is easily performed, so the deployment of the curtain air bag KB inside the vehicle cabin via the location of the border of the roof side trim RST and the middle pillar trim PT3 is smoothly performed, and in particular, deployment is smoothly performed while preventing a situation in which, for example, the curtain air bag KB is caught on the upper end of the middle pillar trim PT3.

The deployment of the curtain air bag KB in the portion of the rear end of the roof side trim RST is performed via the location of the border of the rear end of the roof side trim RST and the upper end of the rear roof pillar trim PT4. That is, the curtain air bag KB is deployed inside the vehicle cabin while the rear end of the roof side trim RST is deformed downward. The roof side trim RST is in particular has a thin plate-like form, and only the front end position of the roof side trim RST is fixed to the vehicle body, with the rear end not fixed to the vehicle body, so downward deformation of the rear end of the roof side trim RST is comparatively easily performed, and thus the deployment of the curtain air bag KB is smoothly performed. Also, the catch protrusion 61 of the roof side trim RST is tightly caught by the (inner panel 31) of the roof side rail 32, and is not displaced downward even when receiving pressure when the curtain air bag KB is expanded and deployed. However, a configuration may also be adopted in which the catch position of the catch protrusion 61 relative to the roof side rail 32 is changed slightly downward when receiving pressure during expansion and deployment (such that the roof side trim RST can only be displaced downward a predetermined amount, and is not allowed to be detached from the roof side rail 32), and in this case, the deployability of the curtain air bag KB into the vehicle cabin is further improved.

Deployment of the curtain air bag KB from the rear pillar trim PT4, as indicated by arrow β in FIG. 10, is performed while deforming the front face 26 frontward (the expanded and deployed curtain air bag KB is indicated by the dashed double-dotted line). In FIG. 10, the curtain air bag KB is expanded and deployed into the vehicle cabin through the space created between the side window glass G3 and the predetermined end edge 26a, but the curtain air bag KB includes an expansion portion that is expanded in the widthwise direction of the vehicle in the portion of the predetermined end edge 26a, and accordingly, it becomes necessary to sufficiently displace the predetermined end edge 26a to the inside in the widthwise direction of the vehicle while displacing (the top of) the predetermined end edge 26a toward the front. Further, the expansion direction of the portion of the curtain air bag KB in a stored state along the rear edge of the side window glass G3 points much to the outside in the widthwise direction of the vehicle, as indicated by arrow γ in FIG. 10, so the curtain air bag KB, which is expanded and deployed inside the vehicle cabin while deforming the predetermined end edge 26a, is deployed while the curtain air bag KB makes contact with the side window glass G3. In other words, the space to be formed between the predetermined end edge 26a and the side window glass G3, and used as the passageway of the curtain air bag KB, is allowed to be as small as possible, and as a result it is not necessary to greatly deform the predetermined end edge 26a unnecessarily, which is preferable for preventing the rear pillar trim PT4 from being damaged in the vicinity of the predetermined end edge 26a.

In the portion along the rear edge of the side window glass G3, the deployment direction of the curtain air bag KB points toward the connecting flange 23, and does not point directly toward the rear pillar trim PT4 or the side window glass G3, so it is possible to prevent a situation in which the rear pillar trim PT4 or the side window glass G3 is damaged by large pressure when deployment occurs.

With the rear sloping portion 26d formed in the front face 26, the area of the portion of the rear pillar trim PT4 that covers the curtain air bag KB in a stored state from the front is reduced, and to that extent, the resistance action of the rear pillar trim PT4 is reduced and thus the deployability of the curtain air bag KB is improved.

In the front face 26, the opening 53 is formed at the bottom position separated from the predetermined end edge 26a, and the strength in the vicinity of the opening 53 is comparatively weaker than other portions. Thus, when the curtain air bag KB presses the predetermined end edge 26a frontward, the front face 26 is approximately entirely much displaced, that displacement centered at the vicinity of the opening 53, as shown by the dashed double-dotted line in FIG. 10, thus forming a large space through which the curtain air bag passes in the widthwise direction of the vehicle. Because it is preferable to greatly displace the predetermined end edge 26a over the range of a large area such as approximately the entire front face 26 (a range with a long distance to the top of the predetermined end edge 26a), in comparison to only greatly displacing near the predetermined end edge 26a, excessive force does not act on (particularly the top of) the predetermined end edge 26a and the vicinity thereof, thus preventing a situation in which the predetermined end edge 26a and the vicinity thereof are partially damaged.

In particular, in the present embodiment, in the portion in the vicinity of the border of the upper edge and the rear edge of the side window glass G3 (the upper end of the predetermined end edge 26a), in a side view, the curtain air bag KB curves so as to bend at an angle of not more than 120 degrees from the approximately horizontal direction and is thus provided extended on the bottom side along the rear edge of the side window glass G3, and when the curtain air bag KB is deployed, stress operates on the periphery of the upper end of the predetermined end edge 26a, toward the bottom and the front thereof. In order to mitigate such stress from acting on the upper end, relative to the rear pillar trim PT4, the curtain air bag KB is twisted at the portion that corresponds to the upper end of the predetermined end edge 26a (vicinity of the upper end), and the deployment direction is set such that the bottom side and the front side approximately do not cross, but some degree of stress on the upper end cannot be avoided. Thus, because the opening 53 is disposed separated from the upper end where stress operates in this manner, such stress is prevented from acting on the opening 53, and thus the weakened vicinity of the opening 53 is prevented from being damaged.

In addition, the deployment direction of the curtain air bag KB, in the portion along the upper edge of the side window glass G3, is set to point relatively more to the inside in the widthwise direction of the vehicle than the portion along the rear edge, so the side window glass G3 is not pressed against from inside the vehicle cabin with a large force. Thus, while preventing damage to the side window glass G3, it is possible to easily deform the soft roof trim downward, and easily expand and deform the curtain air bag KB inside the vehicle cabin.

As shown in FIG. 35, the curtain air bag KB provided to the rear of the predetermined end edge 26a is set up so as to be positioned as much as possible to the outside in the widthwise direction of the vehicle, which is preferable for deforming the predetermined end edge 26a as easily as possible and further improving the deployability of the curtain air bag KB. In particular, in order to prevent interference between a passenger sitting in the third row seat SC (the last row seat) and the curtain air bag KB when attempting to expand and deploy the curtain air bag KB, it is preferable to adopt a configuration in which the curtain air bag KB in a stored state located to the rear of the predetermined end edge 26a is positioned more to the outside in the widthwise direction of the vehicle toward the bottom. Of course, in the portion along the rear edge of the side window glass G3, the deployment direction of the curtain air bag KB points toward the connecting flange 23, so damage to the side window glass G3 is prevented.

Also, in the present embodiment, at the rear end of the upper edge of the side window glass G3, the hard roof side trim RST is present in the extension of the curtain air bag KB in the deployment direction, and because the roof side trim RST receives a comparatively small amount of deployment pressure when the curtain air bag KB is deployed and thus is easily displaced downward, good deployability of the curtain air bag KB is insured.

Here, when viewed from the side in the widthwise direction of the vehicle, when the angle between the upper edge and the rear edge of the side window glass G3 is not more than 120 degrees (preferably 100 degrees), the stored curtain air bag KB also is disposed along approximately the upper edge and the rear edge of the side window glass G3, so in the periphery of the upper end of the predetermined end edge 26a in the rear pillar trim PT4, the direction in which the stored curtain air bag KB extends is greatly changed so as to bend. Thus, when the curtain air bag KB is deployed, stress operates on the periphery of the upper end of the predetermined end edge 26a, toward the bottom and the front thereof. On the other hand, the curtain air bag KB is set up to be twisted in the portion corresponding to the upper end of the predetermined end edge 26a (vicinity of the upper end), so that the curtain air bag KB is deployed in downward and frontward directions that approximately do not intersect. Thus the stress on the upper end of the predetermined end edge 26a is reduced, so it is possible to prevent damage to the rear pillar trim PT4.

Figure 38:
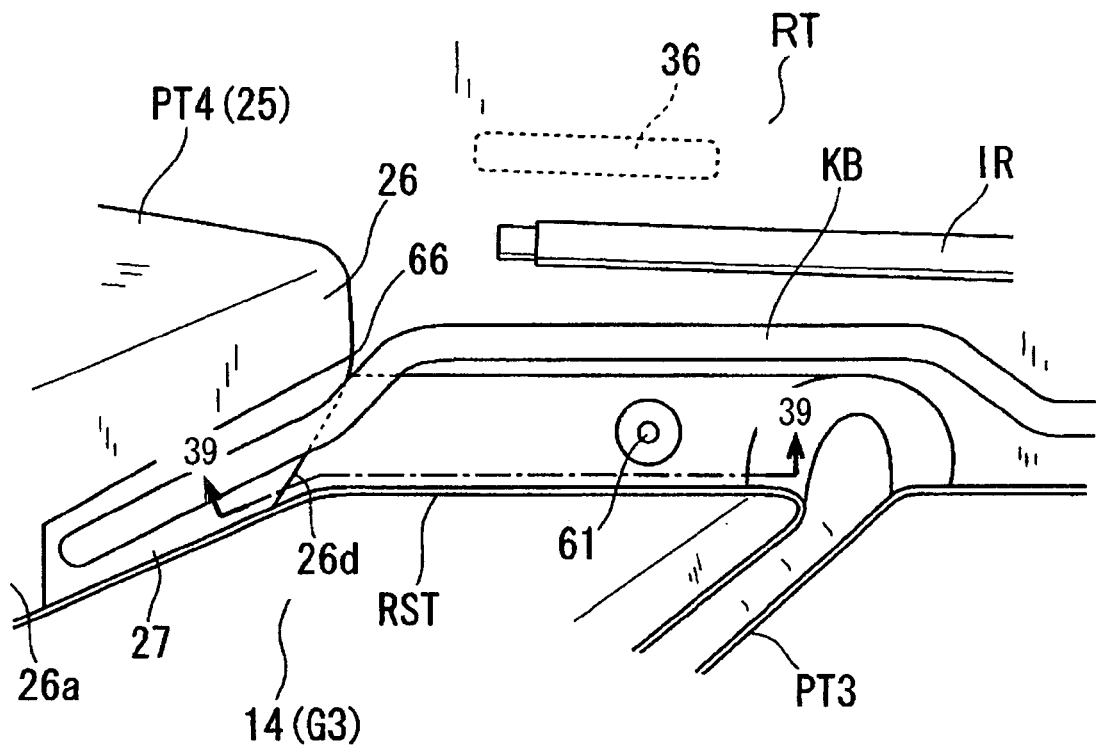
FIG. 38 shows a case in which Modified Example 2 of the first embodiment is applied to a third embodiment, and corresponds to FIG. 37.
Figure 39:
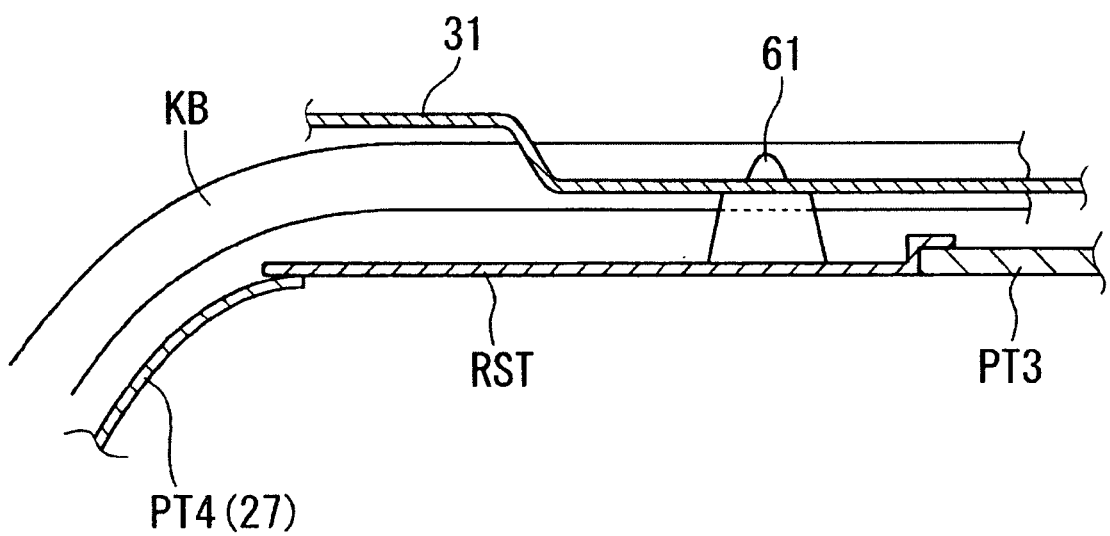
FIG. 39 is a cross-sectional view corresponding to line 39-39 in FIG. 38.

Modified Example 2 of the first embodiment is applicable in the third embodiment. This case is shown in FIGS. 38 and 39. In this case, the rear sloping portion 26d is formed in the rear pillar trim PT4, but the inside edge of the cover member 27 in the widthwise direction of the vehicle is set up to be in the vicinity of the break point 66 of the sloping portion 26d (see FIG. 38).

As shown in FIG. 39, the upper end (position of the upper end) of the cover member 27 is set up to be positioned below and to the front of the rear end (position of the rear end) of the roof side trim RST, that is, set up to be positioned closer to the vehicle cabin side. Thus, the frontward deformation of the cover member 27 is reliably performed without obstruction by the roof side trim RST. In other words, downward deformation of the rear end of the roof side trim RST is performed after the cover member 27 is deformed frontward and downward. In this case, it is preferable for the sake of deployability that, viewing from the side of the side window glass G3, the angle between the upper edge and the rear edge of the side window glass G3 is not less than 90 degrees, and that at least the direction in which the front end (upper end) of the cover member 27 lies along the direction in which the curtain air bag KB extends in the vicinity of the front end of the cover member 27.

Also, Modified Example 2 of the first embodiment is applicable in the third embodiment. This case is shown in FIG. 32. In this case, a modified example as shown in FIG. 21 is also applicable. Further, Modified Example 3 of the first embodiment is also applicable in the third embodiment.

Figure 40:
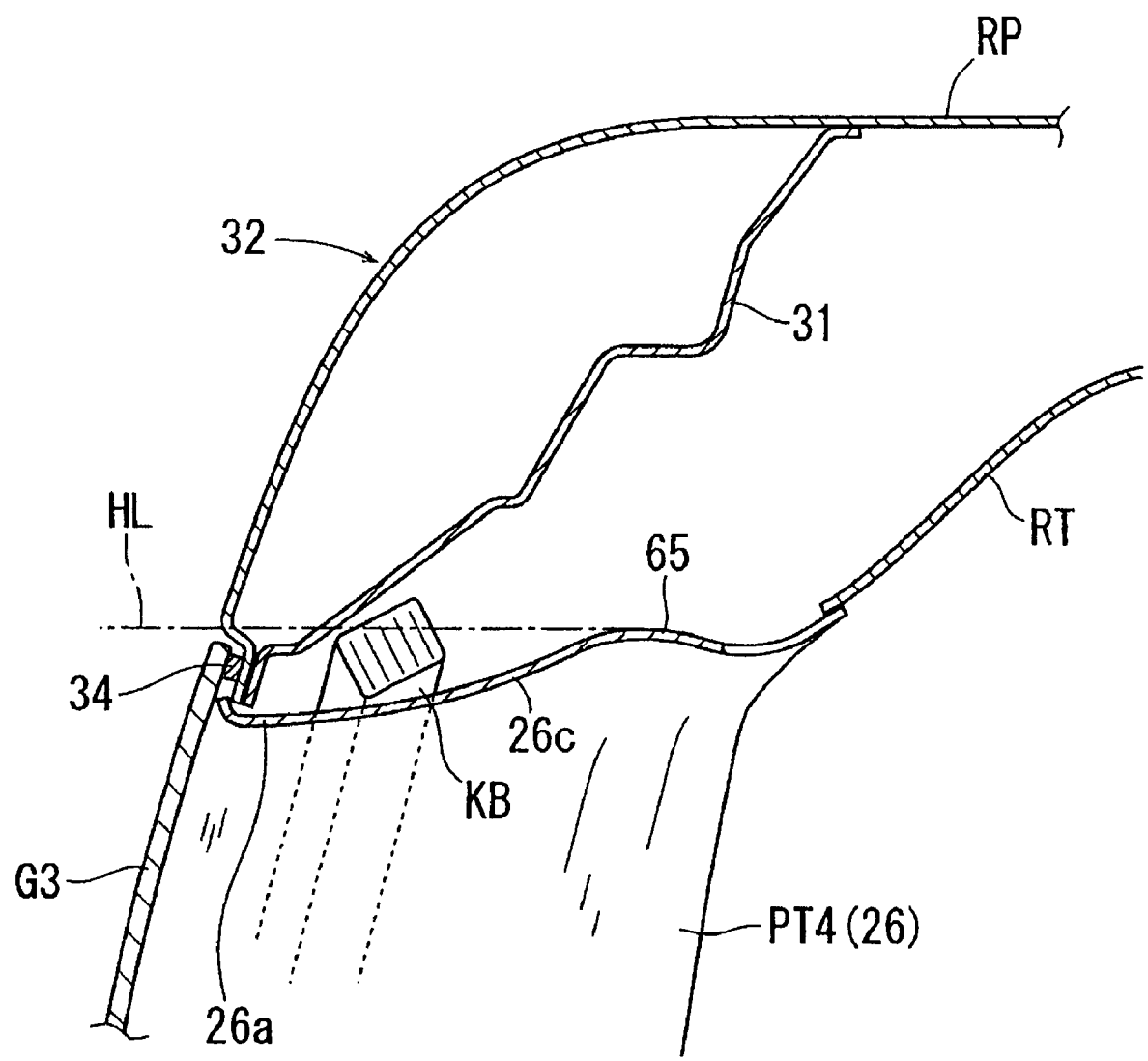
FIG. 40 shows Modified Example 1 of the third embodiment, in which the cross-sectional state of the vicinity of the upper end of the rear pillar trim is viewed from the front.

FIG. 40 shows Modified Example 1 of the third embodiment. In Modified Example 1, when viewed from the front (for example, when viewed from the front of the vehicle body), the front face 26 is set up sloping to be positioned gradually downward toward the outside in the widthwise direction of the vehicle. More specifically, numeral HL is a horizontal reference line that extends in the widthwise direction of the vehicle, and the front face 26 is used as a downward sloping portion 26c that, from a break point position indicated by numeral 65 and set near the side face 25, is sloped gradually downward toward the outside in the widthwise direction of the vehicle (so as to gradually separate downward from the horizontal reference line HL). The curtain air bag KB is provided immediately to the rear of the downward sloping portion 26c (the installation brackets 41 or 42 are positioned front-rear in the cross-sectional of FIG. 40). The curtain air bag KB in a stored state is provided in the immediate vicinity of the downward sloping portion 26c, and set up so that the deployment direction of the curtain air bag KB passes through the downward sloping portion 26c, and so that during expansion and deployment the curtain air bag KB makes contact with the downward sloping portion 26c. The shape of the downward sloping portion 26c in a plan view can be appropriately set. For example, the downward sloping portion 26d may be formed in a straight line or convex upward.

In Modified Example 1 shown in FIG. 40, the curtain air bag KB attempted to be expanded and deployed is deployed into the vehicle cabin while passing over the sloping portion 26c of the front face 26. At this time, by forming the sloping portion 26c, in comparison to a case in which the sloping portion 26c is not formed, the portion of the area covering the curtain air bag KB in a stored state from the front is reduced, and to that extent, the action of the rear pillar trim PT4 to resist expansion and deployment of the curtain air bag KB is reduced and thus good deployability of the curtain air bag KB is insured. Also, when the curtain air bag KB attempts to pass over the sloping portion 26c, with the sloping direction set for the downward sloping portion 26c, the curtain air bag KB slides along the sloping portion 26c toward the outside in the widthwise direction of the vehicle and is deployed inside the vehicle cabin, so a situation is prevented in which the curtain air bag KB is caught by the rear pillar trim PT4. In this manner, the curtain air bag KB smoothly passes over the rear pillar trim PT4, and thus excessive force does not act on the rear pillar trim PT4, which is preferable for preventing damage to the rear pillar trim PT4.

Figure 41:
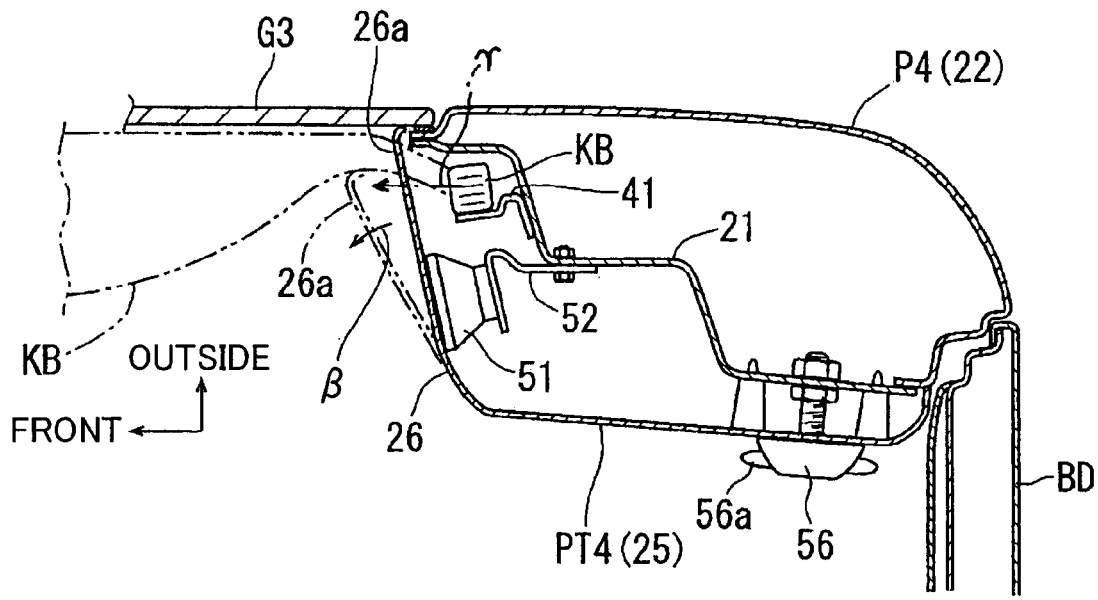
FIG. 41 shows Modified Example 2 of the third embodiment, and corresponds to FIG. 10.

FIG. 41 shows Modified Example 2 of third embodiment. FIG. 41 corresponds to FIG. 10, and in Modified Example 2, the deployment direction γ is set to point forward.

Fourth Embodiment

Next is a description of a fourth embodiment of the present invention. In the fourth embodiment, as shown in FIGS. 6 and 7, the opening 53 is formed in the front face 26 of the rear pillar trim PT4. The opening 53 was described in detail in the first embodiment, and so a description thereof is omitted here.

Next is a description of the operation of the operation of the above sort of configuration. When the curtain air bag KB is in a stored state, the inflator IR is ignited when a predetermined condition is satisfied, such as when a side collision has been detected or predicted, or when a vehicle roll has been detected or predicted. Gas pressure generated by ignition of the inflator IR is supplied to the curtain air bag KB in a stored state, and thus the curtain air bag KB is expanded and deployed in the vehicle cabin with the shape as indicated by the hatched area in FIG. 2.

The expansion and deployment of the curtain air bag KB into the vehicle cabin is performed while displacing the edge of the roof trim RT outside in the widthwise direction of the vehicle downward, as indicated by arrow α in FIG. 9 (the expanded and deployed curtain air bag KB is indicated by the dashed double-dotted line). The roof trim RT is a soft material, so it can easily be deformed downward. Also, at the rear side of the vehicle, the expansion and deployment of the curtain air bag KB is performed while displacing the top of the predetermined end edge 26a of the rear pillar trim PT4 to the front as indicated by arrow β in FIG. 10 (the expanded and deployed curtain air bag KB is indicated by the dashed double-dotted line). In FIG. 10, the curtain air bag KB is expanded and deployed into the vehicle cabin through the space created between the side window glass G3 and the predetermined end edge 26a, but the curtain air bag KB includes an expansion portion that is expanded in the widthwise direction of the vehicle in the portion of the predetermined end edge 26a, and accordingly, it becomes necessary to sufficiently displace the predetermined end edge 26a to the inside in the widthwise direction of the vehicle while displacing (the top of) the predetermined end edge 26a toward the front.

In the front face 26, the opening 53 is formed at the bottom position separated from the predetermined end edge 26a, and the strength in the vicinity of the opening 53 is comparatively weaker than other portions. Thus, when the curtain air bag KB presses the predetermined end edge 26a frontward, the front face 26 is approximately entirely much displaced, centered at the vicinity of the opening 53, as shown by the dashed double-dotted line in FIG. 10, thus forming a large space through which the curtain air bag passes in the widthwise direction of the vehicle. Because it is preferable to greatly displace the predetermined end edge 26a over the range of a large area such as approximately the entire front face 26 (a range with a long distance to the top of the predetermined end edge 26a), in comparison to only greatly displacing near the predetermined end edge 26a, excessive force does not act on the predetermined end edge 26a (particularly its upper portion) and the vicinity thereof, thus preventing a situation in which the predetermined end edge 26a and the vicinity thereof are partially damaged.

In particular, in the present embodiment, in the portion in the vicinity of the border of the upper edge and the rear edge of the side window glass G3 (the upper end of the predetermined end edge 26a), in a side view, the curtain air bag KB curves so as to bend at an angle of not more than 120 degrees from the approximately horizontal direction and is thus provided extended on the bottom side along the rear edge of the side window glass G3, and when the curtain air bag KB is deployed, stress operates on the periphery of the upper end of the predetermined end edge 26a, toward the bottom and the front thereof. In order to mitigate such stress from acting on the upper end, relative to the rear pillar trim PT4, the curtain air bag KB is twisted at the portion that corresponds to the upper end of the predetermined end edge 26a (vicinity of the upper end), and the deployment direction is set such that the bottom side and the front side approximately do not cross, but some degree of stress on the upper end cannot be avoided. Thus, because the opening 53 is disposed separated from the upper end where stress operates in this manner, such stress is prevented from acting on the opening 53, and thus the weakened vicinity of the opening 53 is prevented from being damaged.

Here, as described above, the front face 26 is set up slightly sloping such that toward the outside in the widthwise direction of the vehicle, the front face 26 is gradually positioned to the front. Thus, when pressing force to the front has been received from the curtain air bag KB, the predetermined end edge 26a is promptly displaced in the direction that separates from the side window glass G3 without any movement toward the side window glass G3. Incidentally, when the front face 26 is set up slightly sloping such that toward the outside in the widthwise direction of the vehicle, the front face 26 is gradually positioned to the rear, when pressing force to the front has been received from the curtain air bag KB, the predetermined end edge 26a, after temporarily nearing the side window glass G3, moves to separate from the side window glass G3. The movement nearing the side window glass G3 may suppress early deployment of the curtain air bag KB, and it is necessary to increase the total amount of displacement of the predetermined end edge 26a.

Also, as described in FIG. 4 by way of contrast with FIG. 5, (the end face of) the upper portion of the predetermined end edge 26a is sloped without having a corner (rounded), so expansion and deployment of the curtain air bag KB via this portion is improved (to the extent of the sloping setup, instead of the hard rear pillar trim PT4, easily deformed soft roof trim RT may be positioned).

Modified Examples 1 and 2 of the second embodiment are applicable in the fourth embodiment. When Modified Example 2 of the second embodiment is applied in the fourth embodiment, with reference to FIG. 30, in the side face 25 of the rear pillar trim PT4, the elongated hole 58 is formed through which the seat belt 55 passes after passing through the shoulder anchor 56.

Figure 14:
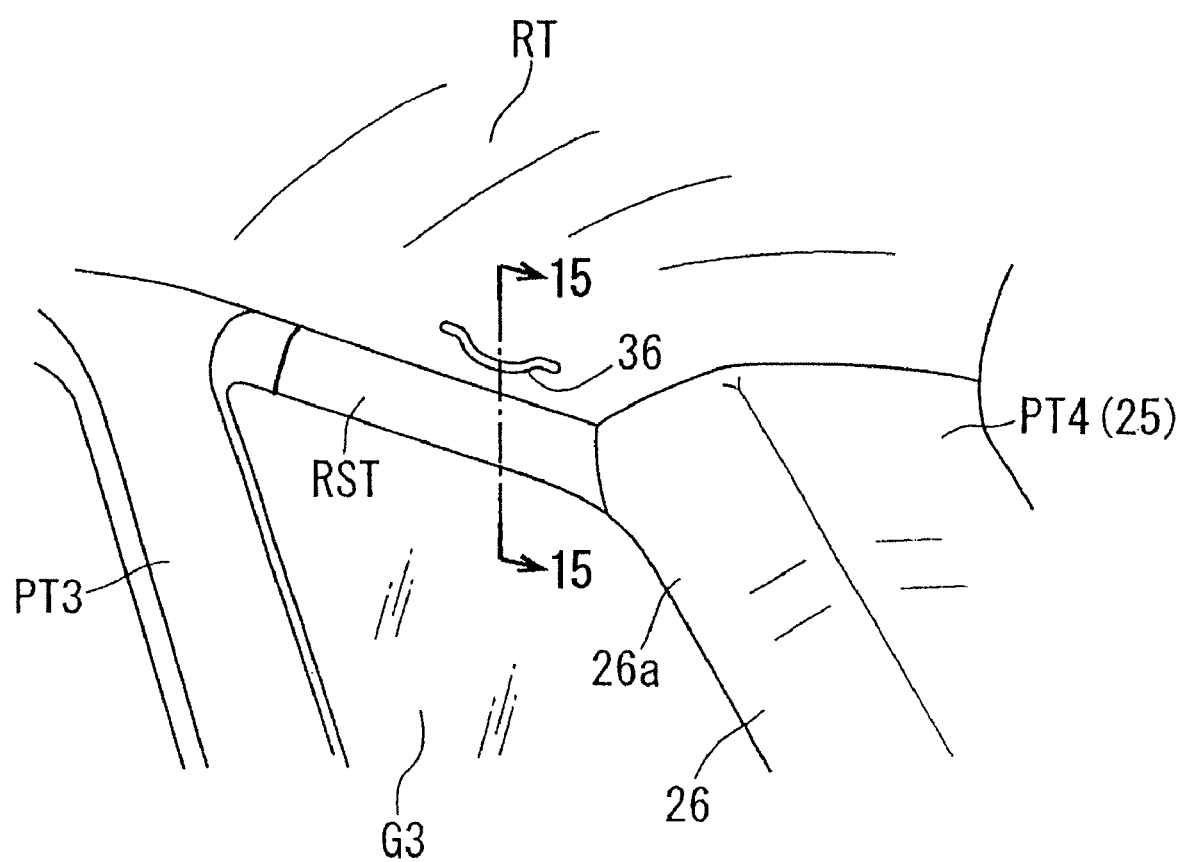
FIG. 14 is a relevant portion perspective view that corresponds to FIG. 4, and shows Modified Example 1 of a first embodiment.
Figure 42:
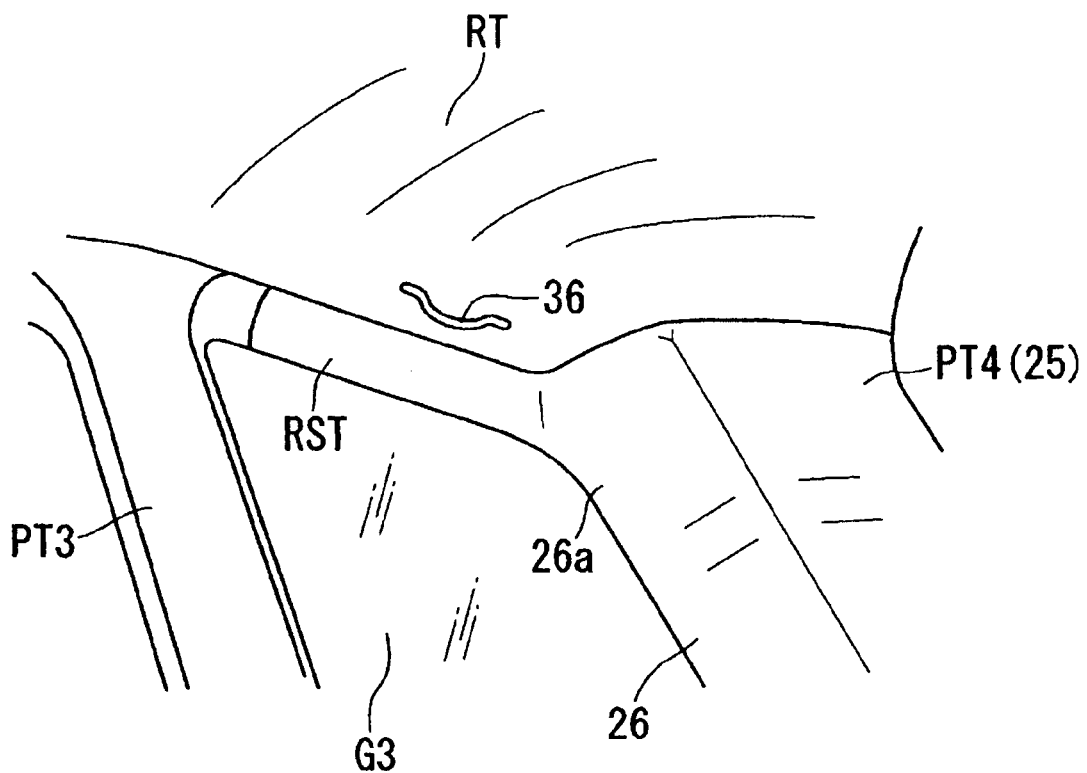
FIG. 42 is a relevant portion perspective view that shows the modified example in FIG. 14.
Figure 43:
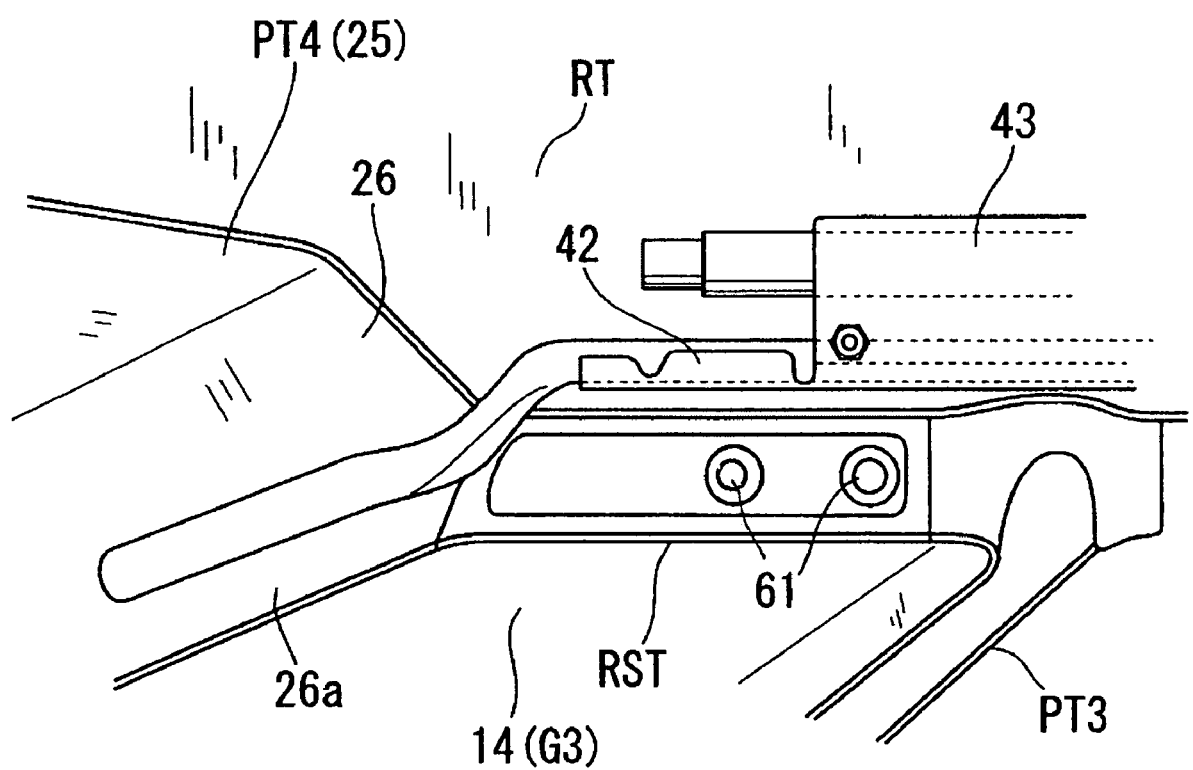
FIG. 43 shows a case in which Modified Example 1 of the first embodiment is applied to the fourth embodiment, and corresponds to FIG. 13.

Also, Modified Example 1 of the first embodiment is applicable in the fourth embodiment. This case is shown in FIG. 43. In this case, as shown in FIG. 42, the roof side trim RST may be formed as a single body with the rear pillar trim PT4. As shown in FIG. 42, when the roof side trim RST has been formed as a single body with the rear pillar trim PT4, the curtain air bag KB can be deployed in the vehicle cabin from between the outside end of the roof side trim RST in the widthwise direction of the vehicle and the side window glass G3, and in this case, it is preferable to adopt a setup in which when pressure has been received when the curtain air bag KB is expanded and deployed, catching from the roof side rail 32 of the catch protrusions 61 is released, and the roof side trim RST is displaced much downward (the roof side trim RST is formed as a single body with the rear pillar trim PT4, and therefore is not removed). Also, as shown in FIG. 14, when the roof side trim RST is formed independent from the other pillar trim as well, it is possible to adopt a configuration in which the curtain air bag KB is deployed in the vehicle cabin from between the outside end of the roof side trim RST in the widthwise direction of the vehicle and the side window glass G3.

Further, Modified Examples 4 and 5 of the first embodiment are applicable in the fourth embodiment.

The present invention was described above with respect to embodiments 1 to 4, but the invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein. For example, the invention encompasses cases of the sort described below.

In the first embodiment, the curtain air bag KB in a stored state, in the portion along the upper edge of the side window glass G3, may be set up so as to be positioned gradually to the outside in the widthwise direction of the vehicle from the front of the curtain air bag KB toward the rear (such that the separation distance from the side window glass G3 becomes smaller).

In the second embodiment, a configuration may be adopted in which the deployment direction of the curtain air bag KB in a stored state, in the portion along the upper edge of the side window glass G3, throughout approximately the entire length of the curtain air bag KB from the front end to the rear end thereof, is modified to gradually point to the outside in the widthwise direction of the vehicle toward the rear. In this case, it is possible to change the deployment direction as gently (gradually) as possible, which is preferable for insuring improved deployability of the curtain air bag KB.

In the third embodiment, in the rear pillar trim PT4, both the downward sloping portion 26c and the rear sloping portion 26d may be formed (yielding the state shown in FIG. 38 when viewed from above, and yielding the state shown in FIG. 40 when viewed from the front), and in this case, the advantages of having both the sloping portions 26c and 26d are obtained in combination. The location at which the deployment direction of the curtain air bag KB in a stored state is greatly changed may be in the portion along the upper edge of the side window glass G3, and in this case, it is possible to gradually change the deployment direction to point to the outside in the widthwise direction of the vehicle toward the rear, throughout approximately the entire length of the curtain air bag KB from the front end to the rear end thereof (in this case, it is possible to change the deployment direction as gently (gradually) as possible, which is preferable for insuring improved deployability of the curtain air bag KB).

Instead of the assist grip 36 shown in FIG. 13 and the like and provided as a vehicle body interior part, for example, an air conditioning duct or the like (whose opening in the vehicle cabin is formed in the roof trim RT) may be provided. The opening 53 may be for a microphone, air conditioning (blowing out conditioned air), ventilation for air freshness (opening for intake or exhaust), or the like, or the opening 53 may be ornamental with no relationship to vehicle body internal parts, and the position at which the opening 53 is formed can be appropriately chosen, such as for example the upper portion of the side face 25 in the rear pillar trim PT4.

The vehicle may also be a vehicle without a rear door. The side window glass to which the present invention is applied may be the first row side window glass G1 (particularly when there is not a second row or subsequent rear seat), or may be the second row side window glass G2 (particularly when there is no third row seat); the present invention is applicable to the side window glass if a curtain air bag in a stored state is provided along the rear edge of the side window glass to which the invention is applied. The curtain air bag may be a plurality of curtain air bags divided in the front-rear direction. The rear pillar trim PT4 is not limited to a case in which cross-sectional shape in the horizontal direction thereof is L-like; for example, the arc may be appropriately modified to an arc or the like. A configuration may be adopted in which the lower end of the expanded and deployed curtain air bag KB may be expanded in a shape broader in the widthwise direction of the vehicle than other portions throughout approximately the entire length of the curtain air bag KB, so that it is possible to further resist external force in the widthwise direction of the vehicle. The roof side trim RST may be formed as a single body with the middle pillar trim PT3. Of course, the object of the present invention is not limited to that expressly disclosed; the invention also tacitly encompasses those configurations expressed as substantially preferable or advantageous.

SUMMARY

As described above, the present invention provides a vehicle rear structure provided with a curtain air bag apparatus, the vehicle rear structure including a side window glass provided between a rear pillar positioned in the rear portion of the vehicle and a middle pillar positioned immediately to the front of the rear pillar; a curtain air bag apparatus including a curtain air bag in a stored state and fixed to the vehicle body in the vicinity of the side window glass, and an inflator for supplying gas pressure to the curtain air bag, wherein the curtain air bag, when expanded by receiving gas pressure from the inflator, is deployed inside the vehicle cabin so as to cover the side window glass along the side window glass; a soft roof trim that covers a roof panel from inside the vehicle cabin, the outside edge of the roof trim in the widthwise direction of the vehicle being positioned near the side window glass; a rear pillar trim that is harder than the roof trim, and covers the rear pillar from inside the vehicle cabin, a predetermined end edge being positioned in the immediate vicinity of the side window glass, the predetermined end edge being an end edge of the front of the rear pillar trim that is outside in the widthwise direction of the vehicle; and a middle pillar trim that is harder than the roof trim, and covers the middle pillar from inside the vehicle cabin; wherein the curtain air bag in a stored state is fixed to the vehicle body along the upper edge and the rear edge of the side window glass, and the portion of the curtain air bag in a stored state along the upper edge of the side window glass is positioned above the roof trim, and the portion of the curtain air bag in a stored state along the rear edge of the side window glass is positioned to the rear of the predetermined end edge, when the curtain air bag in a stored state has been expanded, the curtain air bag is deployed in the vehicle cabin while deforming the roof trim downward and deforming at least the upper portion of the predetermined end edge frontward, and the separation distance in the widthwise direction of the vehicle of the curtain air bag in a stored state from the side window glass, in the portion along the rear edge of the side window glass, is set to be less than, of the portion along the upper edge of the side window glass, the portion in the vicinity of the middle pillar trim.

With this configuration, the curtain air bag in a stored state, in the portion along the rear edge of the side window glass, is set up at a position far to the outside in the widthwise direction of the vehicle, so it is possible to smoothly expand and deploy the curtain air bag in the vehicle cabin while deforming the hard rear pillar trim well.

Also, it is preferable that the separation distance in the widthwise direction of the vehicle of the curtain air bag in a stored state from the side window glass, in the portion along the rear edge of the side window glass, is set to be less than that in the portion along the upper edge of the side window glass. With this configuration, it is possible to more adequately obtain the above effect.

Also, it is preferable that in the portion along the upper edge of the side window glass, the separation distance in the widthwise direction of the vehicle of the curtain air bag in a stored state from the side window glass is set to be less for the portion in the vicinity of the rear end than for the portion in the vicinity of the front end.

With this configuration, the curtain air bag in a stored state, in the portion in which the soft and easily deformed roof trim is present, is offset to the outside in the widthwise direction of the vehicle, and in comparison to a case in which, for example, this offset is performed in the vicinity of the rear edge of the side window glass, deployability of the curtain air bag is improved.

Also, it is preferable that the curtain air bag in a stored state is expanded and deployed in the vehicle cabin while deforming the roof trim downward from the location of the border of the middle pillar trim and the roof trim.

With this configuration, deployment of the curtain air bag in the vehicle cabin can be performed well in the vicinity of the hard middle pillar trim.

Also, it is preferable that the curtain air bag in a stored state, in the portion along the upper edge of the side window glass, is set up so as to be positioned gradually to the outside in the widthwise direction of the vehicle toward the rear.

With this configuration, in comparison to a case in which the curtain air bag in a stored state is abruptly offset to the outside in the widthwise direction of the vehicle in a portion that reaches the rear pillar trim, the deployability of the curtain air bag is improved.

Also, it is preferable that a vehicle body interior part fixed to the vehicle body is provided in the vicinity of the curtain air bag in a stored state disposed along the upper edge of the side window glass and to the outside in the widthwise direction of the vehicle, and the separation distance in the widthwise direction of the vehicle of the curtain air bag in a stored state from the side window glass is set to be less for the portion positioned to the outside of the vehicle body interior part in the widthwise direction of the vehicle than for the portion positioned to the front of the vehicle body interior part.

With this configuration, the deployability of the curtain air bag in a stored state is improved while preventing interference from the vehicle body interior part or the middle pillar trim.

Also, it is preferable that the deployment direction of the curtain air bag in a stored state disposed along the rear edge of the side window glass is set so that the curtain air bag is expanded toward the outside in the widthwise direction of the vehicle in the vicinity of the upper portion of the predetermined end edge.

With this configuration, the curtain air bag in a stored state provided along the rear edge of the side window glass is expanded and deployed while making contact with the side window glass as much as possible, so it is not necessary to greatly deform the hard rear pillar trim unnecessarily, and thus deployability of the curtain air bag is good.

Also, it is preferable that the upper portion of the predetermined end edge, viewed from above, is set up sloping so as to gradually be positioned to the rear toward the outside in the widthwise direction of the vehicle, or viewed from the front, is set up sloping so as to gradually be positioned downward toward the outside in the widthwise direction of the vehicle.

With this configuration, when the curtain air bag in a stored state provided along the rear edge of the side window glass is expanded and deployed, the area that makes contact with the hard rear pillar trim is reduced, and thus deployability of the curtain air bag is good.

Also, it is preferable that a specific portion of the rear pillar trim, the specific portion including the predetermined end edge, which receives pressing force from the curtain air bag during expansion and deployment, is formed with a cover portion set up so as to be more easily displaced toward the front than other portions.

With this configuration, it is possible to easily deform only the portion of the hard rear pillar trim that is pressed against due to expansion and deployment of the curtain air bag, and thus deployability of the curtain air bag is good.

Also, it is preferable that in the portion of the curtain air bag in a stored state along the rear edge of the side window glass, the separation distance of the curtain air bag from the side window glass is less for the lower portion of the curtain air bag than for the upper portion.

With this configuration, even when a specific seat has been positioned near the rear pillar trim, interference between an occupant sitting in the specific seat and the curtain air bag attempted to be expanded and deployed is prevented, and thus deployability of the curtain air bag is good.

Also, it is preferable that the curtain air bag, in a stored state, is provided pointing downward along the rear edge of the side window glass, while curving from the rear end of the upper edge of the side window glass to the upper end of the rear edge of the side window glass, and the curtain air bag is set up such that the position of the lower end of the portion of the curtain air bag along the rear edge of the side window glass is positioned in approximately the middle in the vertical direction of the rear edge of the side window glass.

With this configuration, the curtain air bag is expanded and deployed via only the upper portion of the predetermined end edge of the rear pillar trim, and thus deployability of the curtain air bag is good.

Also, it is preferable that the curtain air bag, in a stored state, is provided pointing downward along the rear edge of the side window glass, while curving from the rear end of the upper edge of the side window glass to the upper end of the rear edge of the side window glass, and the curtain air bag in a stored state is twisted in the portion that curves from the rear end of the upper edge of the side window glass to the upper end of the rear edge of the side window glass, and the direction of expansion and deployment of the curtain air bag is set to point approximately downward in the portion along the upper edge of the side window glass, and to point approximately outside in the widthwise direction of the vehicle in the portion along the rear edge of the side window glass.

With this configuration, curtain air bag in a stored state is twisted at the location of the border of the upper edge and the rear edge of the side window glass, and thus it is possible to obtain a setup for the deployment direction that is preferable for good deployability of the curtain air bag. Further, by employing the above twisting, in the portion from the upper edge to the rear edge of the side window glass, it is also possible to obtain a curve while reducing the stress due to deployment of the curtain air bag that acts on the upper end of the predetermined end edge in the rear pillar trim positioned in the vicinity of that portion.

Also, it is preferable that the curtain air bag is set up such that when the separation distance of the curtain air bag in a stored state from the side window glass in the widthwise direction of the vehicle is LA in the portion along the upper edge of the side window glass, LB in the portion along the rear edge of the side window glass, and LC in the portion that corresponds to the middle pillar trim, LC>LA>LB is satisfied.

With this configuration, offset from the front toward the rear of the curtain air bag in a stored state is obtained in steps toward the outside in the widthwise direction of the vehicle, and thus it is possible to insure good deployability.

Further, it is preferable to adopt the following sort of mode as a premise of the above configuration. That is, a configuration may be adopted in which the space between a left and right pair of the rear pillars is used for a rear opening that is opened or closed with a back door. In this case, it is possible to apply the present invention to a vehicle having a back door. Also, the rear pillars configure a left-right frame that frames the rear opening opened or closed with the back door, resulting in a comparatively large size (a large cross-section), so the rear pillar trim also has a large surface area. Thus, there is a high likelihood that the rear pillar trim will make contact with personal belongings inserted through the rear opening, but the rear pillar trim is hard, which is preferable for preventing damage due to contact with personal belongings.

Also, it is preferable that the curtain air bag in a stored state is set up so that the deployment direction of the curtain air bag changes between the portion along the upper edge of the side window glass and the predetermined end edge.

With this configuration, it is possible to improve the deployability of the curtain air bag in the periphery of the portion along the easily deformed roof trim while improving the deployability of the curtain air bag in the hard rear pillar trim portion.

Also, it is preferable that the curtain air bag in a stored state is set up so that the deployment direction of the curtain air bag in the portion along the rear edge of the side window glass points more to the outside in the widthwise direction of the vehicle than the deployment direction of the curtain air bag in the portion along the upper edge of the side window glass.

With this configuration, excessive deformation of the rear pillar trim necessary when deploying the curtain air bag is suppressed as much as possible, which is preferable for preventing damage to the rear pillar trim. Also, in the portion along the easily deformed roof trim, the deployment direction of the curtain air bag does not point much to the outside in the widthwise direction of the vehicle, so it is possible to deploy the curtain air bag between the occupant and the side window glass at an early stage.

Further, it is preferable that the curtain air bag in a stored state is set up so that the deployment direction in the vicinity of the rear end of the portion along the upper edge of the side window glass points more to the outside in the widthwise direction of the vehicle than the deployment direction in the vicinity of the front end of the portion along the upper edge of the side window glass.

With this configuration, while greatly changing the deployment direction between the front and rear of the portion along the upper edge of the side window glass, i.e. the portion where the soft roof trim, easily deformed during expansion and deployment of the curtain air bag, is positioned, it is possible to obtain good deployment of the curtain air bag while preventing damage to the rear pillar trim.

Also, in the above configuration, it is preferable that the curtain air bag in a stored state is set up so that the deployment direction in the portion along the rear edge of the side window glass points toward a vehicle body panel in the vicinity of the rear edge of the side window glass.

With this configuration, a large amount of pressure is prevented from acting directly on the side window glass when the curtain air bag, directed much to the outside in the widthwise direction of the vehicle, is expanded and deployed, which is preferable for preventing damage to the side window glass.

Also, in the above configuration, it is preferable that the curtain air bag, when expanded and deployed, is set up so as to have an expanded portion that enlarges in the widthwise direction of the vehicle between the predetermined end edge and the side window glass.

This configuration is preferable for effectively protecting an occupant seated in a specific seat, even when that specific seat has been positioned beside the side window glass.

Also, in the above configuration, it is preferable that the deployment direction of the curtain air bag in a stored state is changed by twisting the curtain air bag in a stored state.

With this configuration, by employing a twist it is possible to easily change the deployment direction.

Also, it is preferable that a roof side trim is provided between the side window glass and the roof trim, the roof side trim extending in the front-rear direction along the upper edge of the side window glass, and the rear end of the roof side trim is adjacent to the upper end of the front of the rear pillar trim, and when the curtain air bag in a stored state has been expanded, the curtain air bag is deployed in the vehicle cabin through the location of the border of the rear end of the roof side trim and the upper end of the front of the rear pillar trim.

With this configuration, the curtain air bag, in the roof side trim rear end portion, is easily deployed in the vehicle cabin through the position of the border of the rear end of the roof side trim and the front of the rear pillar trim, insuring good deployability of the curtain air bag.

Also, in the above configuration, it is preferable that when the curtain air bag in a stored state has been expanded, the curtain air bag is deployed in the vehicle by passing between the rear pillar trim and the side window glass, while deforming the front of the rear pillar trim toward the front.

With this configuration, the curtain air bag is deployed as much as possible from the outside in the widthwise direction of the vehicle, which is preferable for, for example, preventing interference between the expanding and deploying curtain air bag and the occupant seated in a seat provided near the side window glass.

Also, in the above configuration, it is preferable that a specific portion of the front of the rear pillar trim, the specific portion including the predetermined end edge which is the end edge to the outside in the widthwise direction of the vehicle, is formed with a cover portion set up so as to be more easily displaced toward the front than other portions.

With this configuration, the cover portion can easily be deformed toward the front, so it is possible to adequately satisfy both insurance of good deployability of the curtain air bag and prevention of damage to the rear pillar trim.

Further, it is preferable that the upper end of the cover portion is positioned further inside the vehicle cabin than the rear end of the roof side trim.

With this configuration, it is possible to prevent a situation in which the forward deformation of the cover portion is obstructed by the roof side trim.

Further, it is preferable that the position at which the roof side trim is installed to the vehicle body is only a position to the front of the position in approximately the middle in the front-rear direction of the vehicle body.

With this configuration, downward deformation of the rear end of the roof side trim and the vicinity thereof is as easy as possible, which is preferable for more reliably insuring good deployability of the curtain air bag.

Also, it is preferable that an opening for a vehicle interior part is formed in the rear pillar trim at a position separated from the upper portion of the predetermined end edge.

With this configuration, when the predetermined end edge has received pressure from the curtain air bag when expanding and deploying, the entire rear pillar trim is greatly deformed in a large range from the opening to the upper portion of the predetermined end edge, with the weakened vicinity of the opening as the center of that deformation, and a large local deformation of the predetermined end edge is prevented, and thus damage to the predetermined end edge is prevented. Also, the opening, when the curtain air bag is deployed, receives stress on the bottom side and front side from the expanding curtain air bag and is thus separated from the upper portion (for example, the upper end) of the predetermined end edge which has a large amount of deformation, so stress is suppressed from acting on the opening, and thus damage to the opening and the vicinity thereof can be prevented. Further, the rear pillar trim is easily deformed with the vicinity of the opening as the center of that deformation, which is preferable for insuring smooth deployment of the curtain air bag. In addition to the above, it is possible to effectively use a portion for a vehicle body interior part as the opening.

Also, in the above configuration, it is preferable that the rear pillar trim includes a wide front face extending in the widthwise direction of the vehicle, and the end edge of the front face in the widthwise direction of the vehicle is used as the predetermined end edge, a speaker is provided within the rear pillar trim as a vehicle body interior part, the speaker being set up at a position such that the speaker emits sound toward the front, and the speaker being disposed in the lower portion of the front face, and the opening for the speaker is formed in the lower portion of the front face corresponding to the position of the speaker.

With this configuration, the opening is for a speaker, i.e. for the passage of sound from a speaker, and the sound from the speaker is directed forward and diffused, which is suitable for an occupant of a front seat such as the driver's seat.

Also, in the above configuration, it is preferable that the vehicle body interior part is provided at a position that is in an upper and rear portion of the rear pillar trim, and in the rear pillar trim, the location of the opening formed corresponding to the location for providing the vehicle body interior part has less strength than other locations.

With this configuration, when the curtain air bag is expanded and deployed, the portion in front of the opening in the rear pillar trim is more largely formed, so that it is possible to more adequately satisfy prevention of damage to the rear pillar trim and smooth deployability of the curtain air bag. In particular, the vertical position of the opening has an upper position corresponding to the upper portion of the easily damaged predetermined end edge, so it is possible to expand and deploy the curtain air bag without excessively large deformation of the rear pillar trim.

Also, in the above configuration, it is preferable that the outside end of a specific seat, which is a rear seat, in the widthwise direction of the vehicle, is positioned near the rear pillar trim, a shoulder anchor for a seat belt of a specific seat is installed in the rear pillar within the rear pillar trim, and the opening is an elongated hole though which the seat belt passes.

With this configuration, an elongated seat belt hole can be effectively used as an opening.

The following sort of mode can be adopted as a premise of the above configuration. That is, a configuration may be adopted in which when the curtain air bag has been expanded, the curtain air bag is deployed in the vehicle cabin from between the outside end of the roof trim in the widthwise direction of the vehicle and the side window glass, while deforming the outside end of the roof trim in the widthwise direction of the vehicle downward. In this case, the roof trim is ordinarily constituted from soft material, so it is possible to smoothly expand and deploy the curtain air bag in the vehicle cabin while easily deforming the roof trim.

It is possible to adopt a configuration in which the curtain air bag, in a stored state, is provided pointing downward along the rear edge of the side window glass, while curving from the rear end of the upper edge of the side window glass to the upper end of the rear edge of the side window glass, and the curtain air bag is set up such that the position of the lower end of the portion of the curtain air bag in a stored state along the rear edge of the side window glass is positioned in approximately the middle in the vertical direction of the rear edge of the side window glass. In this case, the structure is one in which damage to the upper portion of the predetermined end edge of the rear pillar trim easily becomes a problem, but it is possible to prevent this damage.

It is also possible to adopt a configuration in which the space between a left and right pair of the rear pillars is used for a rear opening that is opened or closed with a back door. In this case, it is possible to apply the present invention to a vehicle having a back door. Also, the rear pillars configure a left-right frame that frames the rear opening opened or closed with the back door, resulting in a comparatively large size (a large cross-section), so the rear pillar trim also has a large surface area, and by effectively using this large surface area it is possible to deform the entire rear pillar trim to the extent possible, which is preferable for preventing the predetermined end edge from being much deformed locally, and thus damaged. Also, there is a high likelihood that the rear pillar trim will make contact with personal belongings inserted through the rear opening, but the rear pillar trim is formed from hard synthetic resin, which is preferable for preventing damage due to contact with personal belongings or the like.

This application is based on Japanese application serial nos. 2006-61669, 2006-61670, 2006-72265, and 2006-74224 filed in Japan Patent Office on Mar. 7, Mar. 7, Mar. 16, and Mar. 17, 2006, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should by construed as being included therein.

What is claimed is:

1. A vehicle rear structure of a vehicle body, the vehicle rear structure comprising:

a side window glass provided between a rear pillar positioned in a rear portion of the vehicle body and a middle pillar positioned immediately to a front of the rear pillar;

a curtain air bag apparatus comprising a curtain air bag in a stored state and fixed to the vehicle body in a vicinity of the side window glass, and an inflator for supplying gas pressure to the curtain air bag, wherein the curtain air bag, when expanded by receiving gas pressure from the inflator, is deployed inside a vehicle cabin so as to cover the side window glass along the side window glass;

a soft roof trim that covers a roof panel from inside the vehicle cabin, an outside edge of the roof trim in a widthwise direction of the vehicle being positioned near the side window glass;

a rear pillar trim that is harder than the roof trim, and covers the rear pillar from inside the vehicle cabin, a predetermined end edge being positioned in an immediate vicinity of the side window glass, the predetermined end edge being an end edge of a front of the rear pillar trim that is outward in the widthwise direction of the vehicle body; and a middle pillar trim that is harder than the roof trim, and covers the middle pillar from inside the vehicle cabin;

wherein the curtain air bag in a stored state is fixed to the vehicle body along an upper edge and a rear edge of the side window glass, and a portion of the curtain air bag in a stored state along the upper edge of the side window glass is positioned above the roof trim, and a portion of the curtain air bag in a stored state along the rear edge of the side window glass is positioned to the rear of the predetermined end edge, when the curtain air bag in a stored state has been expanded, the curtain air bag is deployed in the vehicle cabin while deforming the roof trim downward and deforming at least an upper portion of the predetermined end edge frontward, when the curtain air bag is in a stored state, a separation distance in the widthwise direction of the vehicle body of the curtain air bag from the side window glass, in the portion along the rear edge of the side window glass, is less than that of the portion of the curtain air bag along the upper edge of the side window glass in a vicinity of the middle pillar trim, and wherein the separation distance in the widthwise direction of the vehicle of the curtain air bag of the portion along the upper edge of the side window glass in a stored state from the side window glass is set to be less for the portion in the vicinity of the rear end than for the portion in the vicinity of the front end.

2. The vehicle rear structure provided with a curtain air bag apparatus according to claim 1, wherein the separation distance in the widthwise direction of the vehicle of the curtain air bag in a stored state from the side window glass, in the portion along the rear edge of the side window glass, is set to be less than that in the portion along the upper edge of the side window glass.

3. The vehicle rear structure provided with a curtain air bag apparatus according to claim 1, wherein the curtain air bag in a stored state is expanded and deployed in the vehicle cabin while deforming the roof trim downward from the location of the border of the middle pillar trim and the roof trim.

4. The vehicle rear structure provided with a curtain air bag apparatus according to claim 1, wherein the deployment direction of the curtain air bag in a stored state disposed along the rear edge of the side window glass is set so that the curtain air bag is expanded toward the outside in the widthwise direction of the vehicle in the vicinity of the upper portion of the predetermined end edge.

5. The vehicle rear structure provided with a curtain air bag apparatus according to claim 1, wherein the upper portion of the predetermined end edge, viewed from above, is set up sloping so as to gradually be positioned to the rear toward the outside in the widthwise direction of the vehicle, or viewed from the front, is set up sloping so as to gradually be positioned downward toward the outside in the widthwise direction of the vehicle.

6. The vehicle rear structure provided with a curtain air bag apparatus according to claim 1, wherein the curtain air bag is set up such that when the separation distance of the curtain air bag in a stored state from the side window glass in the widthwise direction of the vehicle is LA in the portion along the upper edge of the side window glass, LB in the portion along the rear edge of the side window glass, and LC in the portion that corresponds to the middle pillar trim, LC>LA>LB is satisfied.

7. The vehicle rear structure provided with a curtain air bag apparatus according to claim 1, wherein the curtain air bag, when expanded and deployed, is set up so as to have an expanded portion that enlarges in the widthwise direction of the vehicle between the predetermined end edge and the side window glass.

8. A vehicle rear structure of a vehicle body, the vehicle rear structure comprising:
  a side window glass provided between a rear pillar positioned in a rear portion of the vehicle body and a middle pillar positioned immediately to a front of the rear pillar;
  a curtain air bag apparatus comprising a curtain air bag in a stored state and fixed to the vehicle body in a vicinity of the side window glass, and an inflator for supplying gas pressure to the curtain air bag, wherein the curtain air bag, when expanded by receiving gas pressure from the inflator, is deployed inside a vehicle cabin so as to cover the side window glass along the side window glass;
  a soft roof trim that covers a roof panel from inside the vehicle cabin, an outside edge of the roof trim in a widthwise direction of the vehicle being positioned near the side window glass;
  a rear pillar trim that is harder than the roof trim, and covers the rear pillar from inside the vehicle cabin, a predetermined end edge being positioned in an immediate vicinity of the side window glass, the predetermined end edge being an end edge of a front of the rear pillar trim that is outward in the widthwise direction of the vehicle body; and
  a middle pillar trim that is harder than the roof trim, and covers the middle pillar from inside the vehicle cabin;
  wherein the curtain air bag in a stored state is fixed to the vehicle body along an upper edge and a rear edge of the side window glass, and a portion of the curtain air bag in a stored state along the upper edge of the side window glass is positioned above the roof trim, and a portion of the curtain air bag in a stored state along the rear edge of the side window glass is positioned to the rear of the predetermined end edge,
  when the curtain air bag in a stored state has been expanded, the curtain air bag is deployed in the vehicle cabin while deforming the roof trim downward and deforming at least an upper portion of the predetermined end edge frontward,
  when the curtain air bag is in a stored state, a separation distance in the widthwise direction of the vehicle body of the curtain air bag from the side window glass, in the portion along the rear edge of the side window glass, is less than that of the portion of the curtain air bag along the upper edge of the side window glass in a vicinity of the middle pillar trim, and
  wherein the curtain air bag in a stored state, in the portion along the upper edge of the side window glass, is positioned gradually to the outside in the widthwise direction of the vehicle toward the rear.

9. The vehicle rear structure provided with a curtain air bag apparatus according to claim 8, wherein the separation distance in the widthwise direction of the vehicle of the curtain air bag in a stored state from the side window glass, in the portion along the rear edge of the side window glass, is set to be less than that in the portion along the upper edge of the side window glass.

10. The vehicle rear structure provided with a curtain air bag apparatus according to claim 8, wherein the curtain air bag in a stored state is expanded and deployed in the vehicle cabin while deforming the roof trim downward from the location of the border of the middle pillar trim and the roof trim.

11. A vehicle rear structure of a vehicle body, the vehicle rear structure comprising:
  a side window glass provided between a rear pillar positioned in a rear portion of the vehicle body and a middle pillar positioned immediately to a front of the rear pillar;
  a curtain air bag apparatus comprising a curtain air bag in a stored state and fixed to the vehicle body in a vicinity of the side window glass, and an inflator for supplying gas pressure to the curtain air bag, wherein the curtain air bag, when expanded by receiving gas pressure from the inflator, is deployed inside a vehicle cabin so as to cover the side window glass along the side window glass;
  a soft roof trim that covers a roof panel from inside the vehicle cabin, an outside edge of the roof trim in a widthwise direction of the vehicle being positioned near the side window glass;
  a rear pillar trim that is harder than the roof trim, and covers the rear pillar from inside the vehicle cabin, a predetermined end edge being positioned in an immediate vicinity of the side window glass, the predetermined end edge being an end edge of a front of the rear pillar trim that is outward in the widthwise direction of the vehicle body; and a middle pillar trim that is harder than the roof trim, and covers the middle pillar from inside the vehicle cabin;

wherein the curtain air bag in a stored state is fixed to the vehicle body along an upper edge and a rear edge of the side window glass, and a portion of the curtain air bag in a stored state along the upper edge of the side window glass is positioned above the roof trim, and a portion of the curtain air bag in a stored state along the rear edge of the side window glass is positioned to the rear of the predetermined end edge, when the curtain air bag in a stored state has been expanded, the curtain air bag is deployed in the vehicle cabin while deforming the roof trim downward and deforming at least an upper portion of the predetermined end edge frontward, when the curtain air bag is in a stored state, a separation distance in the widthwise direction of the vehicle body of the curtain air bag from the side window glass, in the portion along the rear edge of the side window glass, is less than that of the portion of the curtain air bag along the upper edge of the side window glass in a vicinity of the middle pillar trim, and wherein an assist grip fixed to the vehicle body is provided in the vicinity of the curtain air bag in a stored state disposed along the upper edge of the side window glass and to the inside in the widthwise direction of the vehicle, and the separation distance in the widthwise direction of the vehicle of the curtain air bag in a stored state from the side window glass is set to be less for the portion positioned to the outside of the assist grip in the widthwise direction of the vehicle than for the portion positioned to the front of the assist grip.

12. The vehicle rear structure provided with a curtain air bag apparatus according to claim 11, wherein a specific portion of the rear pillar trim, the specific portion including the predetermined end edge, which receives pressing force from the curtain air bag during expansion and deployment, is formed with a cover portion set up so as to be more easily displaced toward the front than other portions.

13. A vehicle rear structure of a vehicle body, the vehicle rear structure comprising:

a side window glass provided between a rear pillar positioned in a rear portion of the vehicle body and a middle pillar positioned immediately to a front of the rear pillar;

a curtain air bag apparatus comprising a curtain air bag in a stored state and fixed to the vehicle body in a vicinity of the side window glass, and an inflator for supplying gas pressure to the curtain air bag, wherein the curtain air bag, when expanded by receiving gas pressure from the inflator, is deployed inside a vehicle cabin so as to cover the side window glass along the side window glass;

a soft roof trim that covers a roof panel from inside the vehicle cabin, an outside edge of the roof trim in a widthwise direction of the vehicle being positioned near the side window glass;

a rear pillar trim that is harder than the roof trim, and covers the rear pillar from inside the vehicle cabin, a predetermined end edge being positioned in an immediate vicinity of the side window glass, the predetermined end edge being an end edge of a front of the rear pillar trim that is outward in the widthwise direction of the vehicle body; and a middle pillar trim that is harder than the roof trim, and covers the middle pillar from inside the vehicle cabin;

wherein the curtain air bag in a stored state is fixed to the vehicle body along an upper edge and a rear edge of the side window glass, and a portion of the curtain air bag in a stored state along the upper edge of the side window glass is positioned above the roof trim, and a portion of the curtain air bag in a stored state along the rear edge of the side window glass is positioned to the rear of the predetermined end edge, when the curtain air bag in a stored state has been expanded, the curtain air bag is deployed in the vehicle cabin while deforming the roof trim downward and deforming at least an upper portion of the predetermined end edge frontward, when the curtain air bag is in a stored state, a separation distance in the widthwise direction of the vehicle body of the curtain air bag from the side window glass, in the portion along the rear edge of the side window glass, is less than that of the portion of the curtain air bag along the upper edge of the side window glass in a vicinity of the middle pillar trim, and wherein in the portion of the curtain air bag in a stored state along the rear edge of the side window glass, a separation distance of the curtain air bag from the side window glass is less for the lower portion of the curtain air bag than for the upper portion.

14. The vehicle rear structure provided with a curtain air bag apparatus according to claim 13, wherein the curtain air bag, in a stored state, is provided pointing downward along the rear edge of the side window glass, while curving from the rear end of the upper edge of the side window glass to the upper end of the rear edge of the side window glass, and the curtain air bag in a stored state is twisted in the portion that curves from the rear end of the upper edge of the side window glass to the upper end of the rear edge of the side window glass, and the direction of expansion and deployment of the curtain air bag is set to point approximately downward in the portion along the upper edge of the side window glass, and to point approximately outside in the widthwise direction of the vehicle in the portion along the rear edge of the side window glass.

15. The vehicle rear structure provided with a curtain air bag apparatus according to claim 13, wherein the curtain air bag is set up such that when the separation distance of the curtain air bag in a stored state from the side window glass in the widthwise direction of the vehicle is LA in the portion along the upper edge of the side window glass, LB in the portion along the rear edge of the side window glass, and LC in the portion that corresponds to the middle pillar trim, LC>LA>LB is satisfied.

16. A vehicle rear structure of a vehicle body, the vehicle rear structure comprising:

a side window glass provided between a rear pillar positioned in a rear portion of the vehicle body and a middle pillar positioned immediately to a front of the rear pillar;

a curtain air bag apparatus comprising a curtain air bag in a stored state and fixed to the vehicle body in a vicinity of the side window glass, and an inflator for supplying gas pressure to the curtain air bag, wherein the curtain air bag, when expanded by receiving gas pressure from the inflator, is deployed inside a vehicle cabin so as to cover the side window glass along the side window glass;

a soft roof trim that covers a roof panel from inside the vehicle cabin, an outside edge of the roof trim in a widthwise direction of the vehicle being positioned near the side window glass;

a rear pillar trim that is harder than the roof trim, and covers the rear pillar from inside the vehicle cabin, a predetermined end edge being positioned in an immediate vicinity of the side window glass, the predetermined end edge being an end edge of a front of the rear pillar trim that is outward in the widthwise direction of the vehicle body; and a middle pillar trim that is harder than the roof trim, and covers the middle pillar from inside the vehicle cabin;

wherein the curtain air bag in a stored state is fixed to the vehicle body along an upper edge and a rear edge of the side window glass, and a portion of the curtain air bag in a stored state along the upper edge of the side window glass is positioned above the roof trim, and a portion of the curtain air bag in a stored state along the rear edge of the side window glass is positioned to the rear of the predetermined end edge, when the curtain air bag in a stored state has been expanded, the curtain air bag is deployed in the vehicle cabin while deforming the roof trim downward and deforming at least an upper portion of the predetermined end edge frontward, when the curtain air bag is in a stored state, a separation distance in the widthwise direction of the vehicle body of the curtain air bag from the side window glass, in the portion along the rear edge of the side window glass, is less than that of the portion of the curtain air bag along the upper edge of the side window glass in a vicinity of the middle pillar trim, wherein the curtain air bag, in a stored state, is provided pointing downward along the rear edge of the side window glass, while curving from the rear end of the upper edge of the side window glass to the upper end of the rear edge of the side window glass, and the curtain air bag is set up such that the position of the lower end of the portion of the curtain air bag along the rear edge of the side window glass is positioned in approximately the middle in the vertical direction of the rear edge of the side window glass.

17. A vehicle rear structure of a vehicle body, the vehicle rear structure comprising:

a side window glass provided between a rear pillar positioned in a rear portion of the vehicle body and a middle pillar positioned immediately to a front of the rear pillar;

a curtain air bag apparatus comprising a curtain air bag in a stored state and fixed to the vehicle body in a vicinity of the side window glass, and an inflator for supplying gas pressure to the curtain air bag, wherein the curtain air bag, when expanded by receiving gas pressure from the inflator, is deployed inside a vehicle cabin so as to cover the side window glass along the side window glass;

a soft roof trim that covers a roof panel from inside the vehicle cabin, an outside edge of the roof trim in a widthwise direction of the vehicle being positioned near the side window glass;

a rear pillar trim that is harder than the roof trim, and covers the rear pillar from inside the vehicle cabin, a predetermined end edge being positioned in an immediate vicinity of the side window glass, the predetermined end edge being an end edge of a front of the rear pillar trim that is outward in the widthwise direction of the vehicle body; and a middle pillar trim that is harder than the roof trim, and covers the middle pillar from inside the vehicle cabin;

wherein the curtain air bag in a stored state is fixed to the vehicle body along an upper edge and a rear edge of the side window glass, and a portion of the curtain air bag in a stored state along the upper edge of the side window glass is positioned above the roof trim, and a portion of the curtain air bag in a stored state along the rear edge of the side window glass is positioned to the rear of the predetermined end edge, when the curtain air bag in a stored state has been expanded, the curtain air bag is deployed in the vehicle cabin while deforming the roof trim downward and deforming at least an upper portion of the predetermined end edge frontward, when the curtain air bag is in a stored state, a separation distance in the widthwise direction of the vehicle body of the curtain air bag from the side window glass, in the portion along the rear edge of the side window glass, is less than that of the portion of the curtain air bag along the upper edge of the side window glass in a vicinity of the middle pillar trim, wherein the curtain air bag in a stored state is set up so that the deployment direction of the curtain air bag changes between the portion along the upper edge of the side window glass and the predetermined end edge; and wherein the deployment direction of the curtain air bag in a stored state is changed by twisting the curtain air bag in a stored state.

18. The vehicle rear structure provided with a curtain air bag apparatus according to claim 17, wherein the curtain air bag in a stored state is set up so that the deployment direction of the curtain air bag in the portion along the rear edge of the side window glass points more to the outside in the widthwise direction of the vehicle than the deployment direction of the curtain air bag in the portion along the upper edge of the side window glass.

19. The vehicle rear structure provided with a curtain air bag apparatus according to claim 17, wherein the curtain air bag in a stored state is set up so that the deployment direction in the vicinity of the rear end of the portion along the upper edge of the side window glass points more to the outside in the widthwise direction of the vehicle than the deployment direction in the vicinity of the front end of the portion along the upper edge of the side window glass.

20. The vehicle rear structure provided with a curtain air bag apparatus according to claim 17, wherein the curtain air bag in a stored state is set up so that the deployment direction in the portion along the rear edge of the side window glass points toward a vehicle body panel in the vicinity of the rear edge of the side window glass.

21. The vehicle rear structure provided with a curtain air bag apparatus according to claim 17, wherein the curtain air bag, when expanded and deployed, is set up so as to have an expanded portion that enlarges in the widthwise direction of the vehicle between the predetermined end edge and the side window glass.

22. A vehicle rear structure of a vehicle body, the vehicle rear structure comprising:

a side window glass provided between a rear pillar positioned in a rear portion of the vehicle body and a middle pillar positioned immediately to a front of the rear pillar;

a curtain air bag apparatus comprising a curtain air bag in a stored state and fixed to the vehicle body in a vicinity of the side window glass, and an inflator for supplying gas pressure to the curtain air bag, wherein the curtain air bag, when expanded by receiving gas pressure from the inflator, is deployed inside a vehicle cabin so as to cover the side window glass along the side window glass;

a soft roof trim that covers a roof panel from inside the vehicle cabin, an outside edge of the roof trim in a widthwise direction of the vehicle being positioned near the side window glass;

a rear pillar trim that is harder than the roof trim, and covers the rear pillar from inside the vehicle cabin, a predetermined end edge being positioned in an immediate vicinity of the side window glass, the predetermined end edge being an end edge of a front of the rear pillar trim that is outward in the widthwise direction of the vehicle body; and a middle pillar trim that is harder than the roof trim, and covers the middle pillar from inside the vehicle cabin;

wherein the curtain air bag in a stored state is fixed to the vehicle body along an upper edge and a rear edge of the side window glass, and a portion of the curtain air bag in a stored state along the upper edge of the side window glass is positioned above the roof trim, and a portion of the curtain air bag in a stored state along the rear edge of the side window glass is positioned to the rear of the predetermined end edge, when the curtain air bag in a stored state has been expanded, the curtain air bag is deployed in the vehicle cabin while deforming the roof trim downward and deforming at least an upper portion of the predetermined end edge frontward, when the curtain air bag is in a stored state, a separation distance in the widthwise direction of the vehicle body of the curtain air bag from the side window glass, in the portion along the rear edge of the side window glass, is less than that of the portion of the curtain air bag along the upper edge of the side window glass in a vicinity of the middle pillar trim, wherein an opening for a vehicle body interior part is formed in the rear pillar trim at a position separated from the upper portion of the predetermined end edge wherein the rear pillar trim includes a wide front face extending in the widthwise direction of the vehicle, and the end edge of the front face in the widthwise direction of the vehicle is used as the predetermined end edge, a speaker is provided within the rear pillar trim as the vehicle body interior part, the speaker being set up at a position such that the speaker emits sound toward the front, and the speaker being disposed in the lower portion of the front face, and the opening for the speaker is formed in the lower portion of the front face corresponding to the position of the speaker.

23. The vehicle rear structure provided with a curtain air bag apparatus according to claim 22, wherein the vehicle body interior part is provided at a position that is in an upper and rear portion of the rear pillar trim, and in the rear pillar trim, the location of the opening formed corresponding to the location for providing the vehicle interior part has less strength than other locations.

24. The vehicle rear structure provided with a curtain air bag apparatus according to claim 22, wherein the outside end of a specific seat, which is a rear seat, in the widthwise direction of the vehicle, is positioned near the rear pillar trim, a shoulder anchor for a seat belt of the specific seat is installed in the rear pillar within the rear pillar trim, and the opening is an elongated hole though which the seat belt passes.

* * * * *